(12) United States Patent
Profaca et al.

(10) Patent No.: US 8,616,678 B2
(45) Date of Patent: *Dec. 31, 2013

(54) MULTIPLE MONOCHROMATIC PRINT CARTRIDGE PRINTING SYSTEM

(75) Inventors: Mark Profaca, Balmain (AU); Julian Paul Kolodko, Balmain (AU); William John Stacey, Balmain (AU); Stephen John Sleijpen, Balmain (AU); Craig Donald Strudwicke, Balmain (AU); Neil Fyfe Edwards, Balmain (AU); Lance Thomas Brown, Balmain (AU); Toby Desmond Oste, Balmain (AU); Eric Patrick O'Donnell, Balmain (AU); Peter John Morley Sobey, Balmain (AU); David Bernardi, Balmain (AU); James Andrew, Balmain (AU)

(73) Assignee: Zamtec Ltd, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/273,223

(22) Filed: Oct. 14, 2011

(65) Prior Publication Data

US 2012/0092419 A1 Apr. 19, 2012

Related U.S. Application Data

(60) Provisional application No. 61/393,361, filed on Oct. 15, 2010.

(51) Int. Cl.
 *B41J 2/165* (2006.01)
 *B41J 2/16* (2006.01)
(52) U.S. Cl.
 USPC .................. 347/32; 347/22; 347/29; 347/33; 347/49

(58) Field of Classification Search
 USPC .................... 347/49, 22, 29, 32, 33
 See application file for complete search history.

(56) References Cited

U.S. PATENT DOCUMENTS

| 3,689,153 | A | * | 9/1972 | Suzuki ........................... 355/89 |
| 3,935,603 | A | | 2/1976 | Bryant |
| 5,096,236 | A | * | 3/1992 | Thony ............................ 292/32 |
| 5,563,638 | A | | 10/1996 | Osborne |
| 5,610,640 | A | * | 3/1997 | Anderson et al. ................ 347/32 |
| 5,860,640 | A | * | 1/1999 | Marohl et al. ............ 269/289 R |
| 6,224,186 | B1 | * | 5/2001 | Johnson et al. ................. 347/28 |
| 2006/0132519 | A1 | | 6/2006 | Kovacs |
| 2008/0238987 | A1 | * | 10/2008 | Kojima .......................... 347/32 |
| 2011/0057990 | A1 | | 3/2011 | Heo et al. |

FOREIGN PATENT DOCUMENTS

WO WO 2011/031264 A1 3/2011

* cited by examiner

*Primary Examiner* — Matthew Luu
*Assistant Examiner* — Alexander D Shenderov
(74) *Attorney, Agent, or Firm* — Cooley LLP

(57) ABSTRACT

A color ink printing system, includes a plurality of print head cartridges, each extending across a direction of print media propagation and spaced apart along the direction of print media propagation; a print head chassis for supporting the plurality of print head cartridges, the print head chassis actuable between a printing position, a transition position, and a maintenance position; a maintenance chassis for supporting a plurality of maintenance cradles, the maintenance chassis actuable between a storage position and an operational position; and a platen on which the print media is supported and propagated. Each of the plurality of print head cartridges is held stationary with respect to a platen on which print media is propagated to effect printing on the print media. Each of the plurality of print head cartridges is a monochrome print head cartridge ejecting a fluid different to the remaining plurality of print head cartridges.

5 Claims, 40 Drawing Sheets

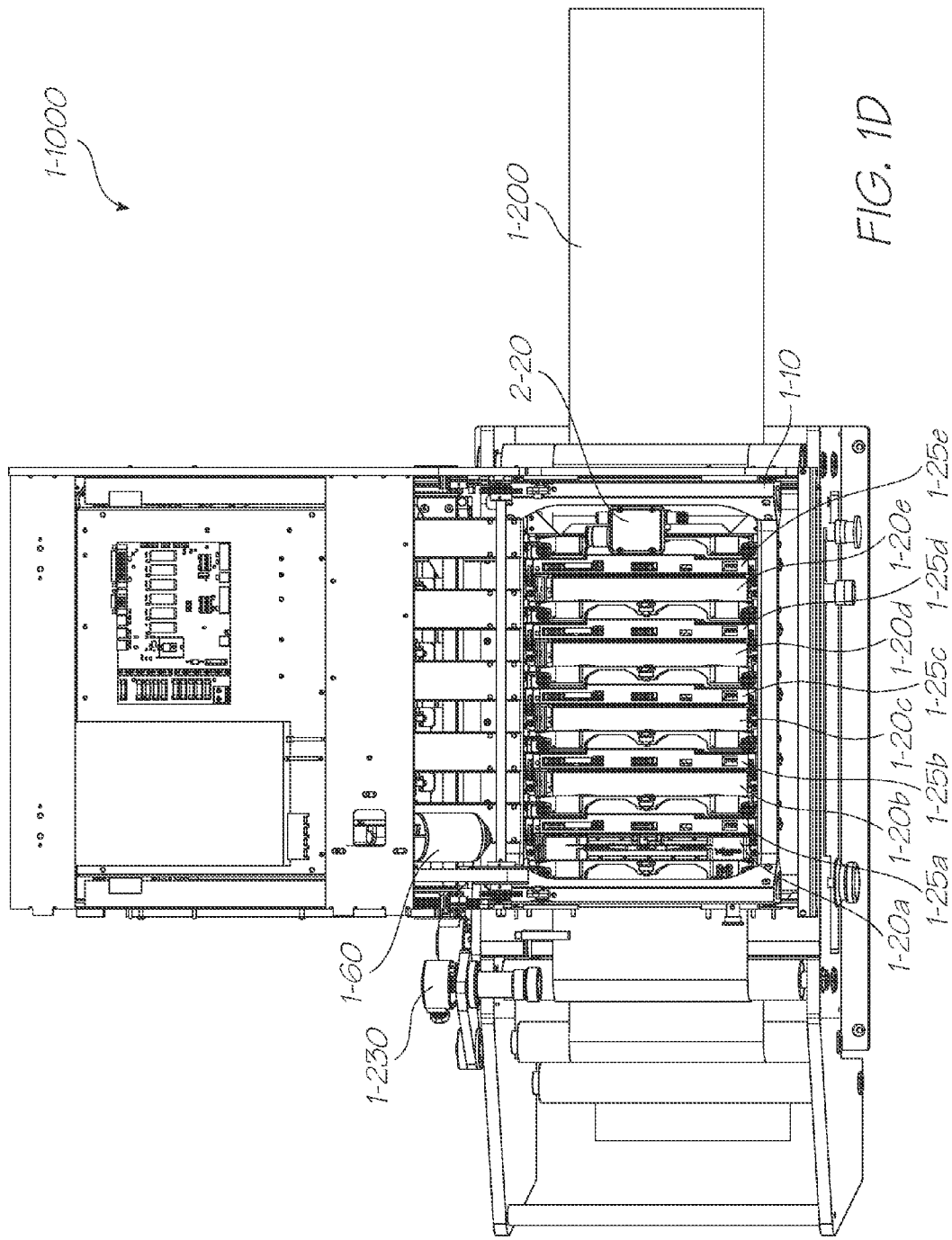

MULTIPLE MONOCHROMATIC PRINT CARTRIDGE PRINTING SYSTEM

TECHNICAL FIELD

The present disclosure is directed to a colour ink jet printing system employing a plurality of pagewidth print head cartridges.

CO-PENDING APPLICATIONS

The following applications have been filed by the Applicant simultaneously with the present application:

| HHP001US | HHP003US | HHP004US | HHP005US | HHP006US |
|----------|----------|----------|----------|----------|

The disclosures of these co-pending applications are incorporated herein by reference. The above applications have been identified by their filing docket number, which will be substituted with the corresponding application number, once assigned.

BACKGROUND

An ink jet print head cartridge designed to provide full colour prints conventionally has a plurality of nozzle rows, one nozzle row for printing each of the colours Cyan, Magenta, Yellow, and Black. Conventional print head cartridges having this arrangement are operated such that each nozzle row partially contributes to the printing of each line on a page. Put differently, each full colour line that is printed on the page receives ink from every nozzle row of the print head cartridge.

For example, in printing a colour image, one or more nozzles of a Cyan nozzle row of the print head cartridge prints the Cyan coloured dots that are needed for a first line on the page. Subsequently, one or more nozzles of a Magenta nozzle row of the print head cartridge prints the Magenta coloured dots that are needed for this same first line on the page, followed like wise by one or more nozzles in the Yellow row and the Black row of the print head. In this manner, the first line of the page receives ink from each of the C, M, Y and K nozzle rows of the one print head cartridge, whereby all necessary colours for that first full colour line of the page are reproduced.

In the past, ink jet printing systems employed a scanning type print head cartridge in which a print head cartridge that is significantly narrower than a width of the page (often 1 or 2 nozzles wide, but many nozzles tall) is scanned/moved across the width of the page to eject ink to all necessary positions on the page. Such systems have had a reputation of being slower than other methods of printing, such as a laser printing system.

To address the speed disadvantage of scanning type ink jet printing systems, pagewidth ink jet printing systems employing a print head cartridge that is stationary, and which spans an entire width of the print media onto which an image is being printed, have been developed. The printing speeds of such pagewidth ink jet printing systems are comparable with those of laser printing systems. However, it would be desirable if the printing speeds of such pagewidth ink jet print systems could be still further increased without compromising on print quality.

SUMMARY

According to a first embodiment of the present disclosure, a colour ink printing system comprises a plurality of print head cartridges, each extending across a direction of print media propagation and spaced apart along the direction of print media propagation; a print head chassis for supporting the plurality of print head cartridges, the print head chassis actuable between a printing position, a transition position, and a maintenance position; and a maintenance chassis for supporting a plurality of maintenance cradles, the maintenance chassis actuable between a storage position and an operational position. Each of the plurality of print head cartridges is held stationary with respect to a platen on which print media is propagated to effect printing on the print media. Each of the plurality of print head cartridges is a monochrome print head cartridge ejecting a fluid different to the remaining plurality of print head cartridges.

In one aspect of the first embodiment, the print head chassis is supported on a platen in the printing position.

In another aspect of the first embodiment, the print head chassis in the printing position is supported from a pair of gantries suspended above a platen.

In another aspect of the first embodiment, the print head chassis is supported by the maintenance chassis in the maintenance position.

In another aspect of the first embodiment, the printing position of the print head chassis is lower than the maintenance position of the print head chassis.

In another aspect of the first embodiment, the maintenance position of the print head chassis is lower than the transition position of the print head chassis.

In another aspect of the first embodiment, when in the storage position the maintenance chassis is retracted from out of a footprint of the print head chassis.

In another aspect of the first embodiment, when in the operational position, the maintenance chassis is positioned under a footprint of the print head chassis.

In another aspect of the first embodiment, the print head chassis includes pin bushes at each corner thereof.

In another aspect of the first embodiment, the maintenance chassis includes positioning pins protruding from each corner thereof, each positioning pin adapted to be received in a pin bush of the print head chassis.

In another aspect of the first embodiment, one of the pin bushes of the print head chassis defines a circular-conical depression for receiving therein a positioning pin of the maintenance chassis.

In another aspect of the first embodiment, the circular-conical depression allows no degree of freedom for movement of the positioning pin within the pin bush in a horizontal plane.

In another aspect of the first embodiment, one of the pin bushes of the print head chassis defines a oval-conical depression for receiving therein a positioning pin of the maintenance chassis.

In another aspect of the first embodiment, the oval-conical depression allows one degree of freedom for movement of the positioning pin within the pin bush in a horizontal plane.

In another aspect of the first embodiment, the printing system further comprises the platen on which the print media is supported and propagated.

In another aspect of the first embodiment, the platen comprises positioning pins protruding respectively from corners thereof, each positioning adapted to be received in a pin bush of the print head chassis.

In another aspect of the first embodiment, each positioning pin of the platen is mechanically engaged with a cam, and the cam is mechanically engaged with an adjusting knob, whereby a height of protrusion of the positioning pins from the plate is adjustable.

In another aspect of the first embodiment, each positioning pin is supported on a spring and biased by the spring to protrude from a surface of the platen, and the platen includes a clamping arrangement arranged around each positioning pin to clamp each positioning pin at a desired protruding height from the surface of the platen.

In another aspect of the first embodiment, the print head chassis comprises a plurality of supporting arms extending upwards from each corner of the print head chassis.

In another aspect of the first embodiment, each supporting arm includes a positioning pin extending downwards towards the print head chassis.

In another aspect of the first embodiment, each supporting arm includes a pin height adjuster for adjusting an extension of each positioning pin towards the print head chassis.

In another aspect of the first embodiment, the printing system further comprises a mounting frame attached to a main body of the printing system, the mounting frame including a plurality of pin bushes, and wherein the mounting frame is adapted to couple with a gantry suspended above the platen.

In another aspect of the first embodiment, the plurality of positioning pins of the supporting arms are adapted to be respectively received in the plurality of pin bushes of the mounting frame.

In another aspect of the first embodiment, one of the pin bushes of the mounting frame defines a circular-conical depression for receiving therein a positioning pin of the support arms.

In another aspect of the first embodiment, the circular-conical depression allows no degree of freedom for movement of the positioning pin within the pin bush in a horizontal plane.

In another aspect of the first embodiment, one of the pin bushes of the mounting frame defines a oval-conical depression for receiving therein a positioning pin of the support arms.

In another aspect of the first embodiment, the oval-conical depression allows one degree of freedom for movement of the positioning pin within the pin bush in a horizontal plane.

In another aspect of the first embodiment, the printing system further comprises a scissor guide for attaching the print head chassis to a main body of the printing system; and a lift mechanism mechanically engaged with the scissor guide, wherein the scissor guide and lift mechanism effect linear movement of the print head chassis between the printing position, maintenance position, and transition position.

In another aspect of the first embodiment, each print head cartridge includes a modular printhead made up of a plurality of print head tiles arranged end to end.

In another aspect of the first embodiment, each print head tile defines plural rows of ink ejection nozzles, whereby the print head is made up of a plurality of the print head tiles defines plural rows of ink ejection nozzles.

In another aspect of the first embodiment, the plural rows of ink ejection nozzles of each print head cartridge all eject ink of the same colour.

In another aspect of the first embodiment, the plural rows of ink ejection nozzles of one print head cartridges eject ink of a first colour that is different to a colour of ink ejected by the plural rows of ink ejection nozzles of another print head cartridge.

In another aspect of the first embodiment, one or more print head cartridges include a plurality of ventilation slits defined in the vicinity of the print head tiles, each ventilation slit having applied thereto a suction force for sucking ink aerosol particles away from the print head tiles.

In another aspect of the first embodiment, the one or more print head cartridges each include a ventilation outlet adapted to engage with an aerosol transport means for transporting ink aerosol particles away from the print head cartridges.

In another aspect of the first embodiment, the aerosol transport means is connected to an ink aerosol tank, the ink aerosol tank including therein an aerosol filter.

In another aspect of the first embodiment, the printing system further comprises a suction device connected to the ink aerosol tank, the suction device providing the suction force to the plurality of ventilation slits.

In another aspect of the first embodiment, the aerosol transport means includes a plurality of hoses, each hose connecting a ventilation outlet each of the one or more print head cartridges to an input port of the ink aerosol tank.

In another aspect of the first embodiment, the aerosol transport means includes a common transport rail, and a plurality of connectors connecting the ventilation outlets of the one or more print head cartridges to the common transport rail, the common transport rail being further connected at one end thereof to the ink aerosol tank.

In another aspect of the first embodiment, each maintenance cradle includes a capper and a cleaner.

In another aspect of the first embodiment, the maintenance chassis includes a sub-frame on which the plurality of maintenance cradles are supported, and the maintenance chassis further includes a motor attached to the sub-frame, the motor operable to linearly translate the sub-frame within the maintenance chassis.

In another aspect of the first embodiment, the sub-frame is linearly translated within the maintenance chassis to align one of the capper or the cleaner with respective print head cartridges.

In another aspect of the first embodiment, the capper is provided adjacent to the cleaner, in the direction of print media propagation, and the sub-frame is linearly translated in the direction of print media propagation to align one of the capper or the cleaner with respective print head cartridges.

In another aspect of the first embodiment, the cleaner includes a first roller of a fluid absorptive material, the first roller for wiping a print head of a respective print head cartridge.

In another aspect of the first embodiment, the cleaner includes a second roller of a hard material, the second roller for pressing against the first roller to squeeze out ink absorbed into the first roller.

In another aspect of the first embodiment, the cleaner includes a wiper blade for scraping the second roller of ink squeezed from the first roller.

In another aspect of the first embodiment, each maintenance cradle includes a sump into which the cleaner and capper drain.

In another aspect of the first embodiment, the sump has a sloping floor.

In another aspect of the first embodiment, the sump includes a drain hole at a lower end of the sloping floor.

In another aspect of the first embodiment, the maintenance chassis defines an ink collection channel along one side thereof, the ink collection channel for receiving ink from each of the drain holes of the plurality of maintenance cradles.

In another aspect of the first embodiment, the printing system further comprises a waste ink collector into which the ink collection channel of the maintenance chassis drains, via a channel outlet provided at an end of the ink collection channel.

In another aspect of the first embodiment, the waste ink collector is a flat tray.

In another aspect of the first embodiment, the flat tray has a footprint covering at least the locus of movement of the channel outlet as the maintenance chassis is actuated between the storage position and the operational position.

In another aspect of the first embodiment, the flat tray has a thickness, and is positioned, such that a bottom of the flat tray is not lower than a print head of the print head cartridges when in the printing position.

According to a second embodiment of the disclosed invention, a printing method, comprises the steps of: receiving a colour image and separating the colour image into a plurality of distinct colour planes; dithering a first distinct colour plane to obtain dot data for the first distinct colour plane; dithering a second distinct colour plane to obtain dot data for the second distinct colour plane; providing the dot data for the first distinct colour plane to a first print head cartridge for printing by a plurality of nozzle rows of the first print head cartridge; and providing the dot data for the second distinct colour plane to a second print head cartridge positioned downstream from the first print head cartridge in a direction of print media propagation, the dot data for the second distinct colour plane for printing by a plurality of nozzle rows of the second print head cartridge.

In another aspect of the second embodiment, the method further comprises a step of adding a delay to the dot data for the second distinct colour plane, the delay compensating for the spatial separation of the second print head cartridge from the first print head cartridge.

In another aspect of the second embodiment, the method further comprises a step of vertically shifting the dot data for the first distinct colour plane by one or more nozzle rows in a direction of print media propagation, to advance and delay printing of the first distinct colour plane by the first print head cartridge by one or more nozzle rows, wherein a physical misalignment of the first print head cartridge in a direction of print media propagation with respect to the second print head cartridge is compensated.

In another aspect of the second embodiment, the method further comprises a step of vertically shifting the dot data for the second distinct colour plane by one or more nozzle rows in a direction of print media propagation, to advance and delay printing of the second distinct colour plane by the second print head cartridge by one or more nozzle rows, wherein a physical misalignment of the second print head cartridge in a direction of print media propagation with respect to the first print head cartridge is compensated.

In another aspect of the second embodiment, the method further comprises a step of reordering the dot data for the first distinct colour plane to account for the physical separation of a first of the plurality of nozzle rows of the first print head cartridge from a last of the plurality of nozzle rows of the first print head cartridge.

In another aspect of the second embodiment, the method further comprises a step of reordering the dot data for the second distinct colour plane to account for the physical separation of a first of the plurality of nozzle rows of the second print head cartridge from a last of the plurality of nozzle rows of the second print head cartridge.

In another aspect of the second embodiment, the method further comprises further comprising a step of horizontally shifting the dot data for the first distinct colour plane by one or more dot pitches in a direction normal to a propagation of print media, wherein a wobbling of the print media in a direction normal to the propagation of print media is compensated.

In another aspect of the second embodiment, the method further comprises a step of horizontally shifting the dot data for the second distinct colour plane by one or more dot pitches in a direction normal to a propagation of print media, wherein a wobbling of the print media in a direction normal to the propagation of print media is compensated.

According to a third embodiment of the disclosed invention, a printing method comprises the steps of: receiving a colour image and separating the colour image into a plurality of distinct colour planes; separating each distinct colour plane into a plurality of fake colour planes; arranging the plurality of fake colour planes corresponding to one distinct colour plane into a fake colour image logically comprised of a composite of fake colour planes; and presenting the fake colour image to a multi-coloured print engine of a print head cartridge having a plurality of nozzle rows for printing.

In another aspect of the third embodiment, the method further comprises a step of separating the fake colour image in the multi-coloured print engine to obtain the fake colour planes, generating print data for each fake colour plane, and sending the print data for a first fake colour plane to a first nozzle row of the print head cartridge and sending the print data for a second fake colour plane to a second nozzle row of the print head cartridge different to the first nozzle row.

In another aspect of the third embodiment, the method further comprises a step of increasing a speed of print media propagation past the print head cartridge to prevents dots printed by the second nozzle row from landing on dots printed by the first nozzle row.

According to a fourth embodiment of the disclosed invention, a method for aligning a plurality of print head cartridges arranged in a printing system along a print media propagation path, where each print head cartridge has a plurality of print head tiles arranged end-to-end to span a width of the print media propagation path, comprises the steps of: selecting a first print head cartridge as a reference print head cartridge; printing a first plurality of Vernier patterns using the reference print head cartridge, each of the first plurality of Vernier patterns corresponding to a print head tile of the reference print head cartridge; printing a second plurality of Vernier patterns over the first plurality of Vernier patterns using a second print head cartridge; and determining, from an interference pattern generated from the printing of the second plurality of Vernier patterns over the first plurality of Vernier patterns, a distance of separation along the print media propagation path of each of the plurality of print head tiles of the second print head cartridge from corresponding print head tiles of the reference print head cartridge.

DESCRIPTION OF DRAWINGS

FIG. 1D is a top plan view of a printing system according to the disclosed invention.

FIGS. 21 and 21A illustrate a printing system according to a third embodiment of the disclosed invention.

DETAILED DESCRIPTION

Overview

Figure 1A:
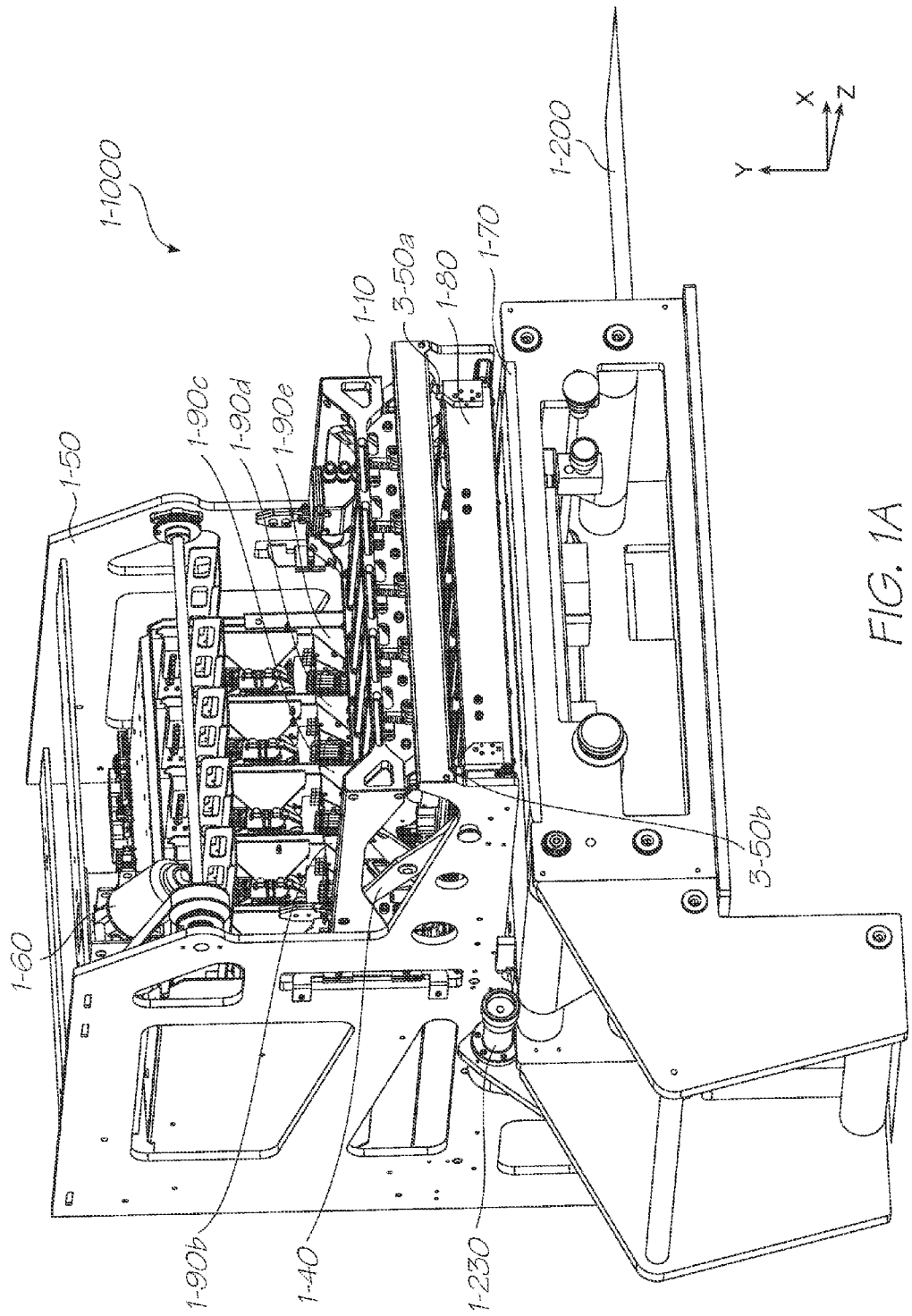
FIG. 1A is a front perspective view of a printing system according to the disclosed invention, in the transition position.

One solution for increasing the printing speed of a pagewith colour ink jet printing system is to increase the number of pagewidth colour print head cartridges present in the printer. A mere provision of multiple pagewidth colour print head cartridges does not, however, necessarily obtain desired, expected, or acceptable results. The inventors of the present invention have found that simply employing multiple pagewidth colour print head cartridges to print what a single pagewidth colour print head cartridge would print results in a printed image of substantially compromised quality. The issues involved in utilizing multiple pagewidth colour print head cartridges are described below.

A pagewidth colour print head cartridge may be thought of as comprising a number of logical rows of nozzles, each for ejecting dots of a specific colour, for example Cyan, Magenta, Yellow, Black, or a spot colour (e.g. Khaki). For the purposes of this description, it is assumed that a pagewidth colour print head cartridge has 5 logical rows, one for each of the above mentioned colours. At a given instant during the printing of a full colour image on a sheet of print media, an operation of the pagewidth colour print head cartridge can be thought of as a first logical row (e.g. Magenta) of the print head cartridge printing a first line of Magenta dots, a second logical row (e.g. Cyan) printing a second line of Cyan dots in close vicinity to the first line, a third logical row (e.g. Yellow) printing a third line of Yellow dots in close vicinity to the first and second lines, and so forth.

At a subsequent instant, the operation of the pagewidth colour print head cartridge can be thought of as the first logical row (e.g. Magenta) printing a new line of dots overlapping the second line of dots (e.g. Cyan) printed by the second logical row in the previous instant. The second logical row (e.g. Cyan) printing a new line of dots overlapping the third line of dots (e.g. Yellow) printed by the third logical row in the previous instant, and so forth. Ultimately, by the time the print media is propagated a distance equivalent to the footprint of the five logical rows of nozzles, there will be printed on the print media five (or more) lines of full colour dots and four (or more) lines of partial colour dots.

In a system that employs, for example, 5 pagewidth colour print head cartridges positioned across the print media and one after the other along a direction of print media propagation, a speed at which the print media is propagated is increased such that the five logical rows of a single printhead cartridge do not ejects dots on top of each other. Instead, a first pagewidth colour print head cartridge prints five lines of different colours (e.g. Black, Cyan, Magenta, Yellow, and Khaki), and a latter (downstream) pagewidth colour printhead cartridge does the same but is configured to eject its dots on top of the five lines of different colours ejected by the first pagewidth colour print head. In this manner, a full colour image is printed at a speed 5 times faster than if only one pagewidth colour print head cartridge is used.

However, the inventors of the present invention found that a system employing 5 pagewidth colour print head cartridges operated in the above described manner causes printing defects that are extremely difficult to compensate for. These defects are described as follows.

In a system utilizing multiple pagewidth colour print head cartridges positioned across the print media and one after the other along a direction of print media propagation, it is inevitable that a certain amount of misalignment between the print head cartridges will occur. One of such misalignments is a misalignment in the distance separating colour print head cartridges (i.e. a pitch/spacing interval).

If the system is set up such that each colour print head cartridge should be exactly 8 cm from neighbouring print head cartridges, significant printing defects are observed when this ideal is not exactly met. Since it is expected in such a system for a first print head cartridge to print a first group of 5 lines, each line of a different colour, and a second print head cartridge to later print another group of 5 lines, again each line being of a different colour, over the first group of 5 lines, it can be appreciated that a misalignment of just one row in the distance separating the first and second print head cartridges results in all 5 lines being printed with the wrong mix of colours.

For example, if the logical rows of the second print head cartridge were one row too far from the first print head cartridge, the first line of dots printed by the second print head cartridge would overlap with the second lines of dots printed by the first print head cartridge, the second line of dots printed by the second print head cartridge would overlap with the third line of dots printed by the first print head cartridge (instead of the second line), the third line of dots printed by the second print head cartridge would overlap with the fourth line of dots printed by the first print head cartridge (instead of the third line), and so on up to the last line of dots printed by the second print head cartridge overlapping with nothing (instead of the last line printed by the first print head cartridge).

This problem is exponentially exacerbated the greater the number of print head cartridges being used. In a system utilizing 5 pagewidth print head colour cartridges, this problem becomes extremely complicated and difficult to compensate for. One print head cartridge may be too close to a neighbour on one side, and also too close to a neighbour on another side, the neighbouring print head cartridge may likewise be misaligned from its neighbours, and so forth.

Moreover, pagewidth print head cartridges are generally made up of a number of individual print head tiles arranged end-to-end to span the width of the pagewidth print head cartridge. It is again inevitable that one or more print head tiles may not exactly line up with the rest of the print head tiles making up the pagewidth print head cartridge. One or more print head tiles may for example be relatively higher or lower than the rest of the print head tiles. Accordingly, one print head tile may be too near a print head tile of a neighbouring print head cartridge, while another print head tile may be too far from the neighbouring print head cartridge. It can be appreciated that the possible combinations for the plurality of print head tiles of one print head cartridge to be too near/far from those of neighbouring print head cartridges, which could themselves be too near/far from other neighbouring print head cartridges, is large.

Other misalignments stem from the fact that pagewidth print head cartridges are rarely perfectly straight. Variations in the fabrication of the pagewidth print head cartridges commonly result in print head cartridges being slightly bowed in a random direction. Hence, not only may a line of dots printed by a print head cartridge be slightly bowed in a random direction, a distance separating the logical rows of one print head cartridge from those of neighbouring print head cartridges may vary depending on which part of the row a nozzle is in. The nozzles in the middle of a logical row may be at the ideal separation from the logical row of a neighbouring print head cartridge, but the nozzles at the ends of the logical row may be too near or too far. How near or how far the logical rows of neighbouring print head cartridges are to each other depends on the amount of bowing of each print head cartridge, and the direction/orientation of the bowing of the print head cartridge and its neighbours.

Still further misalignments between print head cartridges occur due to thermal expansion and contraction in the print head cartridges themselves, and also in the structure supporting the print head cartridges. Thermal expansion, as well as causing other types of misalignment, also causes misalignment in the distance separating a logical row of a print head cartridge from a logical row of a neighbouring print head cartridge.

Since each pagewidth colour print head cartridge prints one line of each colour, each pagewidth colour print head cartridge can be thought of as partially contributing to the printing of each monochrome image that makes up the full colour image (a full colour image is a superposition of a plurality of monochrome images). Each monochrome image is therefore printed in portions, and can be considered a patchwork of portions pieced together. Each portion exhibits the misalignments specific to the print head cartridge that printed that portion. Accordingly, it can be appreciated that each monochrome image is itself an image exhibiting great variation in dot placement, including variation caused by the different degrees and directions of bowing of each print head cartridge, the distance separating each print head cartridge, and also a lateral (side-to-side) misalignment of the print head cartridges.

With each monochrome image exhibiting great variation in dot placement, and with the variation being different amongst monochrome images, and indeed, different even amongst portions of the same monochrome image, a full colour image resultant from a compositing of the monochrome images over each other exhibits significant visual defects. After taking into account the chance of misalignment in the distance separating logical rows of different print head cartridges, the chance of misalignment of individual print head tiles making up a print head cartridge, the bowing of print head cartridges, the effect of thermal expansion on the print head cartridges, and the fact that each monochrome image is misaligned differently depending on which portion of the monochrome image is being considered, the chances of perfectly overlapping as many as 5 or more dots of different colours on top of each other is slim.

The inventors have found that a colour image printed using a system employing 5 pagewidth colour print head cartridges exhibits an obvious interference pattern.

For the above reasons, the present invention utilizes multiple pagewidth monochrome print head cartridges. By using multiple pagewidth monochrome print head cartridges instead of multiple pagewidth colour print head cartridges, every line of each monochrome image that makes up a full colour image is printed by one specific pagewidth print head cartridge. Accordingly, any visible errors (e.g. bowing, misalignment between print head tiles, etc.) caused by imperfect alignment of the components making up the print head cartridge, such as print head tiles, are less objectionable because they are consistent throughout each monochrome image. In essence, 5 full and visually acceptable monochrome images are printed. It is then necessary only to align the monochrome image (i.e. 22-image, M-image, Y-image, K-image, Spot-image) printed by each pagewidth monochrome print head cartridge such that each monochrome image substantially overlaps the others, to produce the full colour image. This is compared to a system utilizing 5 pagewidth colour print head cartridge which each partially contribute to the printing of all 5 monochrome images, resulting in none of the 5 monochrome images being visually acceptable due to the significant variations and misalignments described above, and then trying to compensate and correct each of the 5 monochrome images as well as align them on top of each other.

It is accepted that each monochrome image may not perfectly align with every other monochrome image, resulting in, for example, at a certain point on the page, a "cyan" dot not landing exactly on top of a "magenta" dot, causing a slight localised colour error. However, this loss of print quality resulting from localised imperfect colour placement is perceptually far less visible than the loss of print quality resulting from the printing of self-inconsistent monochrome images caused by printing each monochrome image using 5 different print heads.

The employment of multiple print head cartridges introduces structural and mechanical complexities such as how such multiple print head cartridges should be supported, how to effect maintenance and cleaning for the multiple print head cartridges, how to maintain consistent tolerances and spacing between the print head cartridges and the print media, how to correct for misalignment between the multiple print head cartridges, and the like. Solutions to these issues used in a single print head cartridge (SPHC) printing system do not necessarily lend themselves as solutions for a multiple print head cartridge (MPHC) printing system. Moreover, some of these issues simply do not exist in SPHC printing systems.

For example, in a SPHC printing system, a maintenance and cleaning mechanism may be attached in close proximity to a print head of the print head cartridge, such that the maintenance and cleaning mechanism and/or print head can be easily actuated into position when necessary to clean/maintain the print head. In a MPHC system, however, such a solution would result in a substantial increase in the mechanical density of components in and around the print head cartridges, which in turns results in a need for higher tolerances, better cooling/ventilation, and/or a larger overall footprint of the system.

Moreover, any movement of print heads in a MPHC printing system has to take into consideration pre- and post-movement alignment of the print head cartridges with respect to other print head cartridges, and further with respect to a platen of the printing system. If one print head cartridge is moved for the reason of, for example, cleaning and maintenance, it must be considered if the print head cartridge can be moved back to exactly the same position it was in before movement. In consideration of the fact that cleaning and maintenance is a relatively regular event, and that this event is performed for each print head cartridge, it becomes easy to appreciate the exponential increase in complexity as compared to an SPHC system. Misalignments of one print head cartridge with respect to other print head cartridges introduces printing defects which clearly do not occur in a SPHC printing system.

Mechanical Structure

First Embodiment

FIGS. 1A to 1D illustrate a printing system 1-1000 according to a first embodiment of the present invention. The printing system 1-1000 has a print head chassis 1-10 for holding multiple print head cartridges 1-20*a*, 1-20*b*, 1-20*c*, 1-20*d*, 1-20*e* (see FIG. 1D) and corresponding print head controller modules 1-25*a*, 1-25*b*, 1-25*c*, 1-25*d*, 1-25*e*. For purposes of clarity, the figures illustrate only one print head cartridge 1-20*a*. However, reference numerals 1-20*b*, 1-20*c*, 1-20*d*, and 1-20*e* are used to indicate where the remaining print head cartridges are located.

In the illustrated embodiment, five print head cartridges 1-20*a-e* are provided in the printing system 1-1000. Each print head cartridge 1-20*a-e* spans a width of the print media 1-200. The five print head cartridges 1-20*a-e* are positioned one after another along a direction of print media propagation, that is, in the X-direction as indicated by the axes in FIG. 1A.

Each print head cartridge 1-20*a-e* is connected to respective monochrome ink supply modules 1-90*a*,1-90*b*,1-90*c*,1-90*d*, 1-90*e*. Each print head cartridge 1-20*a-e* prints ink of a single colour/property only. This is in contrast to a SPHC printing system, and a scanning-type printing system, in which one print head cartridge ejects inks of multiple colours. In one exemplary embodiment, each print head cartridge 1-20*a-e* prints one of Cyan, Magenta, Yellow, Black, and a spot colour (e.g. Khaki), however, any combination of colours may be printed by the print head cartridges 1-20*a-e*.

It should be understood that the disclosed invention is not limited to only five print head cartridges, and may comprise any number from two or more print head cartridges. Further, for simplicity and conciseness of description, while the fluids ejected by the print head cartridges 1-20*a-e* are referred to herein as "inks", it is to be understood that the terms "ink" and "inks" refer to any fluid that may be ejected by the print head cartridges 1-20*a-e* including a fixative, a glue or other bonding substance, fluidic semiconductor material, and the like. Similarly, while the inks are referred to as having a "colour", it is to be understood that the term "colour" is used to refer broadly to the properties of the fluids ejected by the print head cartridges 1-20*a-e*, rather than strictly to a colour in the human visible spectrum.

Accordingly, and as already alluded to above, a fixative may be referred to as an "ink" in the present disclosure, and may also be referred to as having a "colour" in the sense that the fixative has a property that distinguishes it from the other inks. It follows that a print head cartridge that receives monochromatic ink refers to a print head cartridge that receives ink/fluid of only one colour/property", such as cyan ink, magenta ink, yellow ink, black ink, infrared ink, a fixative, a glue, a semiconductor material in fluid state, and so forth.

Figure 12:
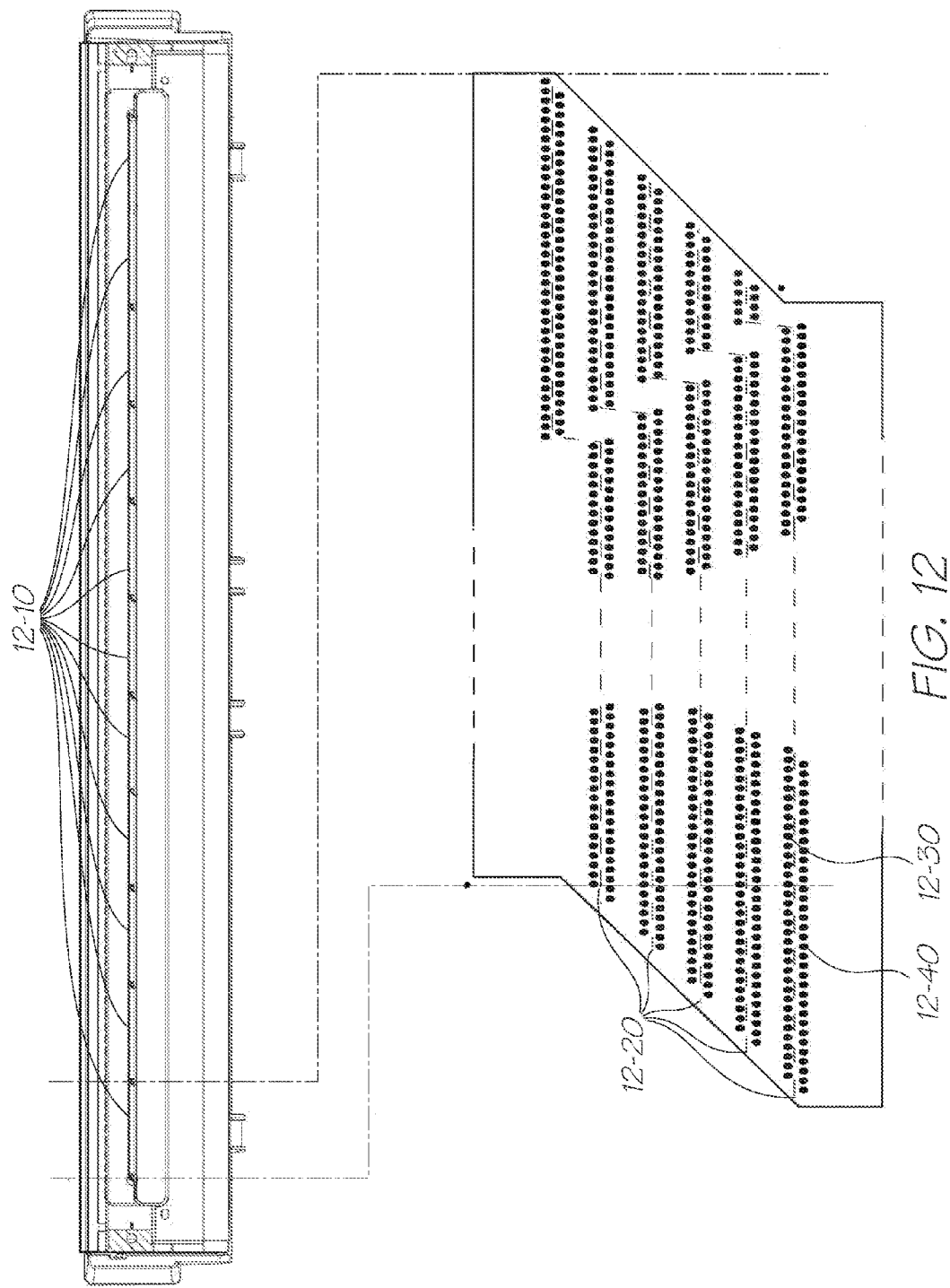
FIG. 12 is a plan view of a print head cartridge, schematically illustrating an arrangement of nozzle and nozzle rows on a print head tile.

The print head cartridges 1-20*a-e* are stand-alone cartridges that are individually removable from the print head chassis 1-10. A print head cartridge 1-20 is illustrated in greater detail in FIG. 12. The print head cartridge 1-20 comprises a plurality of print head tiles 12-10 arranged end-to-end along a length (i.e. Z-axis of FIG. 1A) of the print head cartridge. FIG. 12 illustrates 11 print head tiles 12-10 arranged end-to-end to form the page width print head cartridge 1-20 however it should be understood that more or less than 11 print head tiles may be employed, as necessary to span a width of the print media 1-200.

Each print head tile 12-10 has a plurality of logical rows 12-20. In FIG. 12, each print head tile 12-10 is illustrated with 5 logical rows 12-20, however a lesser or greater number of logical rows may be provided. Each logical row 12-20 is divided into a pair of sub-rows 12-30, 12-40, which sub-rows are offset with respect to each other along a length (i.e. Z-axis of FIG. 1A) of the print head cartridge 1-20. The first sub-row 12-30 of each row 12-20 prints odd numbered dots for a line on a page, whilst the second sub-row 12-40 prints even numbered dots for the same line on the page, or vice versa. Whilst FIG. 12 shows one logical row 12-20 as being comprised of two adjacent sub-rows 12-30, 12-40, a logical row may in fact be comprised of any even dot printing sub-row 12-30 and any odd dot printing sub-row 12-40, not necessarily adjacent to each other The print head cartridges 1-20*a-e* are spaced from each other along a width of the printing system 1-1000 (i.e. X-axis of FIG. 1A), that is, along a direction of print media propagation. Compared to the size of the dots printed by the print head cartridges 1-20*a-e*, the spacing between the print head cartridges 1-20*a-e* is very large, and measured in standard units of length (i.e. mm, cm, inches, etc.). In one embodiment, the print head cartridges 1-20*a-e* are spaced at 8 cm intervals from each other.

The print head chassis 1-10 is attached via scissor guide 1-40 to the printer main frame 1-50. The scissor guide 1-40 and a lift mechanism 1-60, together with a pair of wires (not shown) interconnecting the scissor guide 1-40 and the lift mechanism 1-60 actuate the print head chassis 1-10 between a printing position, a transition position, and a maintenance position.

FIG. 1A illustrates the printing system 1-1000 while in the transition position. In the transition position, the print head chassis 1-10 is held at a height, relative to the platen 1-70, that allows for the maintenance chassis 1-80 to be maneuvered under the print head chassis 1-10 without being interfered with by the print head chassis 1-10. In particular, the transition position allows the maintenance chassis 1-80 to retract to and from a storage position under the ink supply modules 1-90*a-e*, and an operational position under the print head chassis 1-10.

Figure 1B:
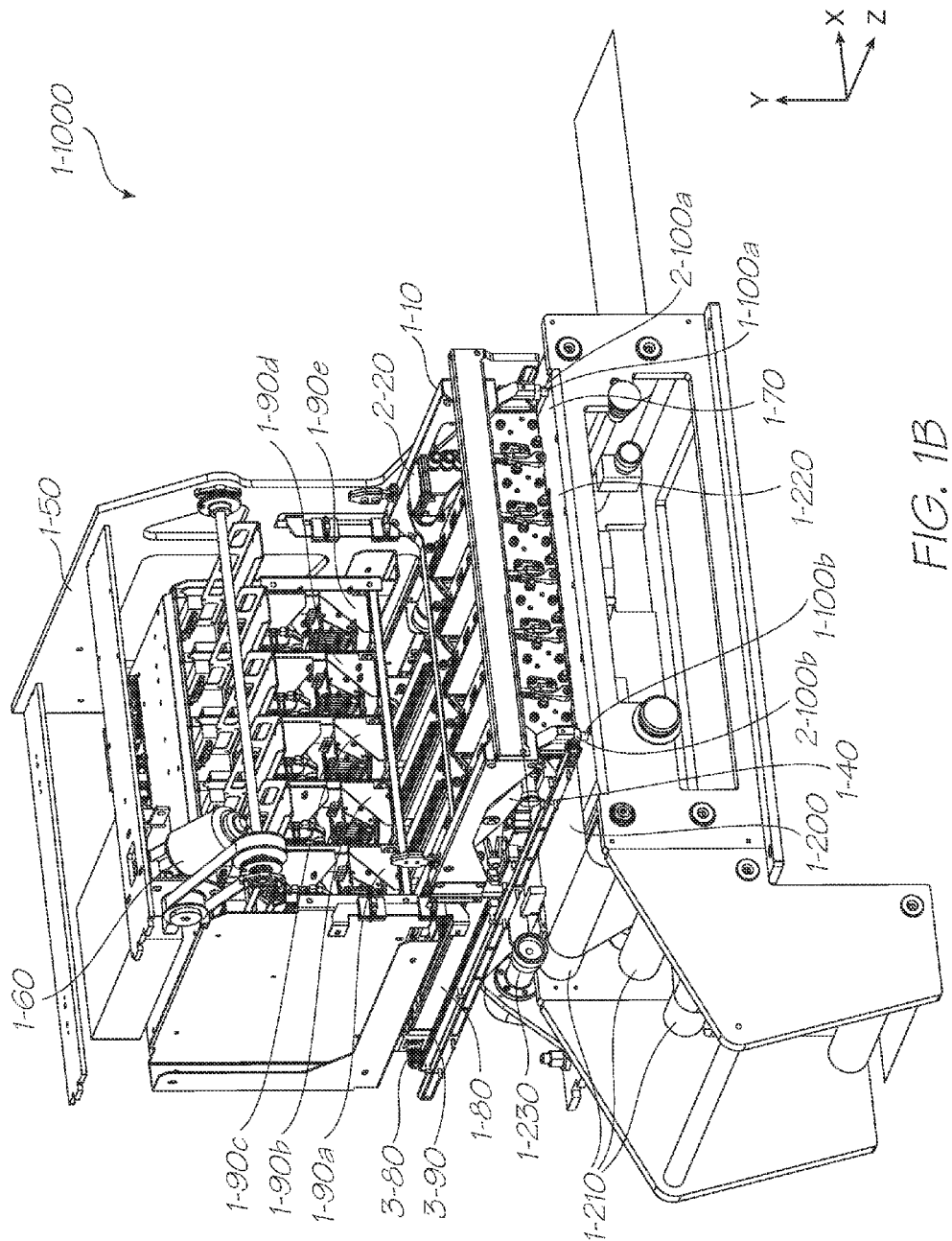
FIG. 1B is a front perspective view of a printing system according to the disclosed invention, in a printing position.

FIG. 1B illustrates the printing system 1-1000 while in the printing position. In FIG. 1B, the printer main frame 1-50 is illustrate with one side thereof removed, to more clearly show the components housed therein. In the printing position, the print head chassis 1-10 is positioned in close proximity to the platen 1-70 to enable printing by the print head cartridges 1-20*a-e* onto the print media 1-200 propagating across the platen 1-70.

Figure 1C:
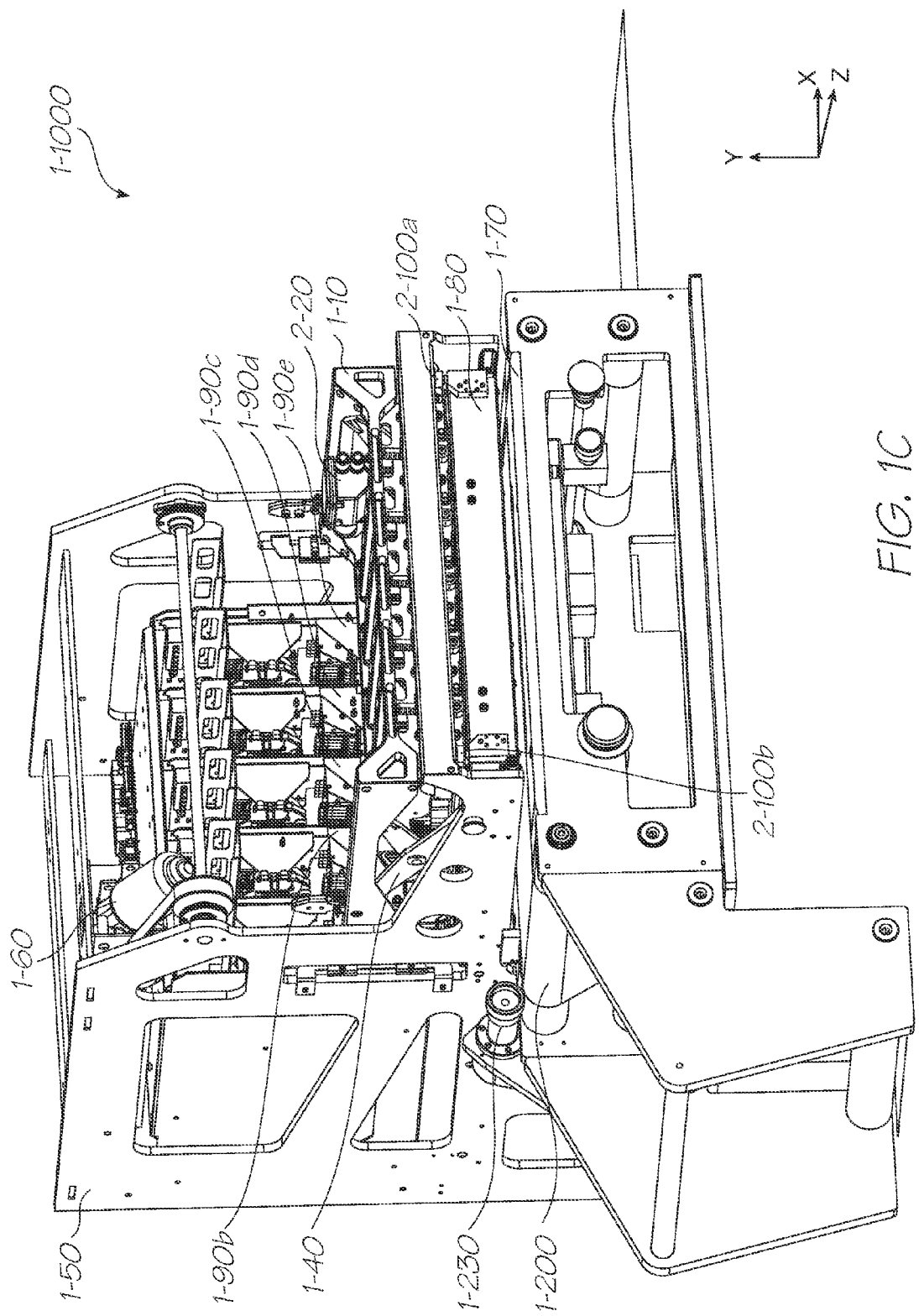
FIG. 1C is a front perspective view of a printing system according to the disclosed invention, in a maintenance position.

FIG. 1C illustrates the printing system 1-1000 while in the maintenance position. In the maintenance position, the print head chassis 1-10 is positioned some distance above the platen 1-70, and the maintenance chassis 1-80 is positioned in an operational position interposed between the platen 1-70 and the print head chassis 1-10. In the maintenance position, the print head 1-10 is supported by the maintenance chassis 1-80.

Figure 8A:
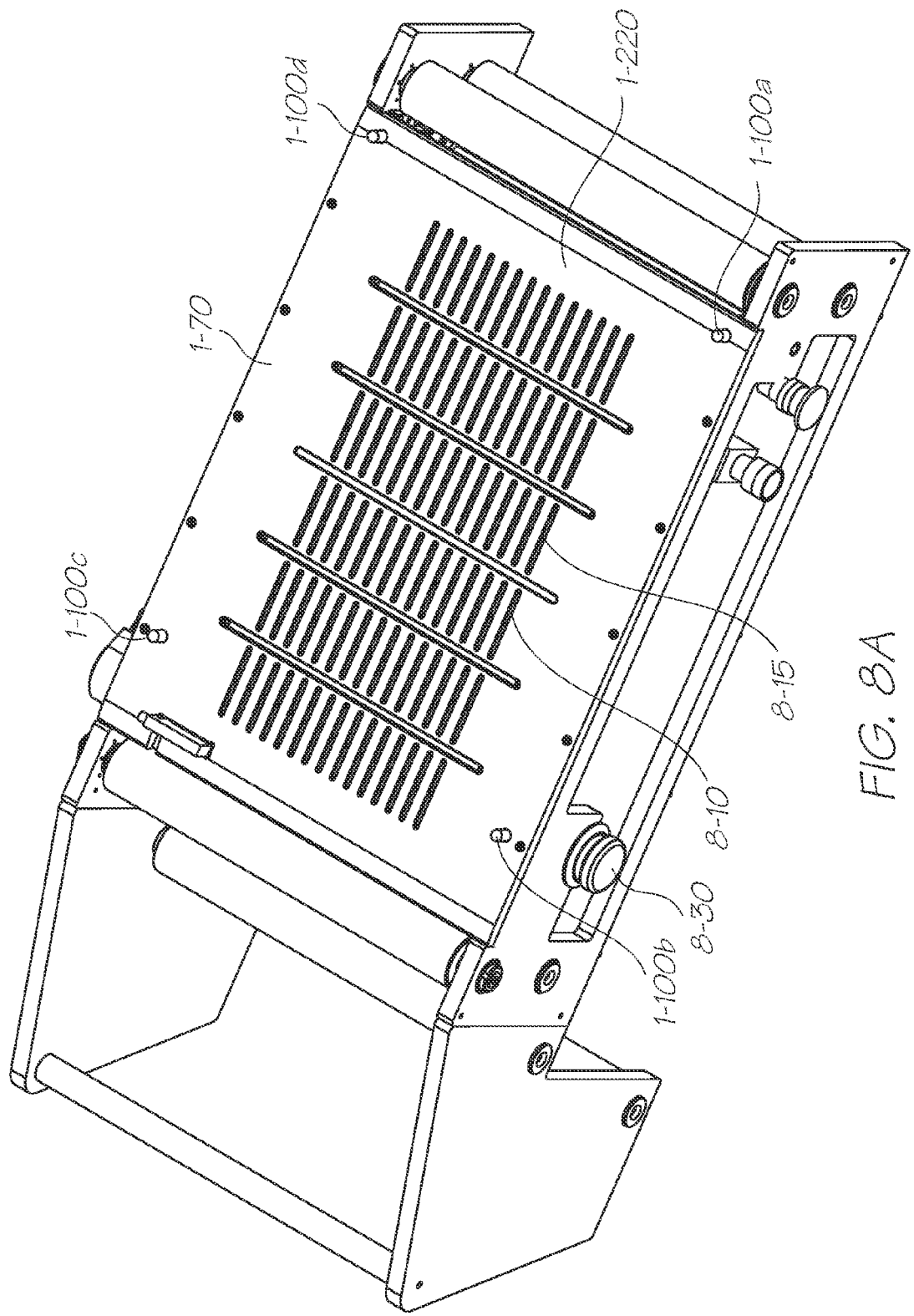
FIG. 8A is a top perspective view of a platen assembly.

In one aspect of the present invention, the platen 1-70 is part of the printing system 1-1000. In other aspects, however, the printing system 1-1000 does not include the platen 1-70, and the platen 1-70 is instead configured and designed by a third party and/or an end-user. In the first embodiment, however, the platen 1-70 is provided with positioning pins 1-100*a*, 1-100*b*, 1-100*c*, 1-100*d* (see also FIG. 8A) which couple with pin bushes 2-100*a*, 2-100*b*, 2-100*c*, 2-100*d* on an underside of the print head chassis 1-10 (see also FIG. 2B). The positioning pins 1-100*a*, 1-100*b*, 1-100*c*, 1-100*d*, as illustrated in FIG. 8A, preferably have a rounded, dome head which facilitates more accurate coupling and positioning with the pin bushes 2-100*a*, 2-100*b*, 2-100*c*, 2-100*d*. The platen 1-70 includes a source of the print media 1-200, and a feed mechanism 1-210 for feeding the print media 1-200 across a printing surface 1-220 of the platen 1-70. An encoder wheel 1-230 is included with the platen 1-70 for measuring a speed of the print media 1-200 as it is propagated across the platen 1-70. The speed measured by the encoder wheel 1-230 is used to time and synchronize an operation of the print head cartridges 1-20*a-e*.

Figure 2A:
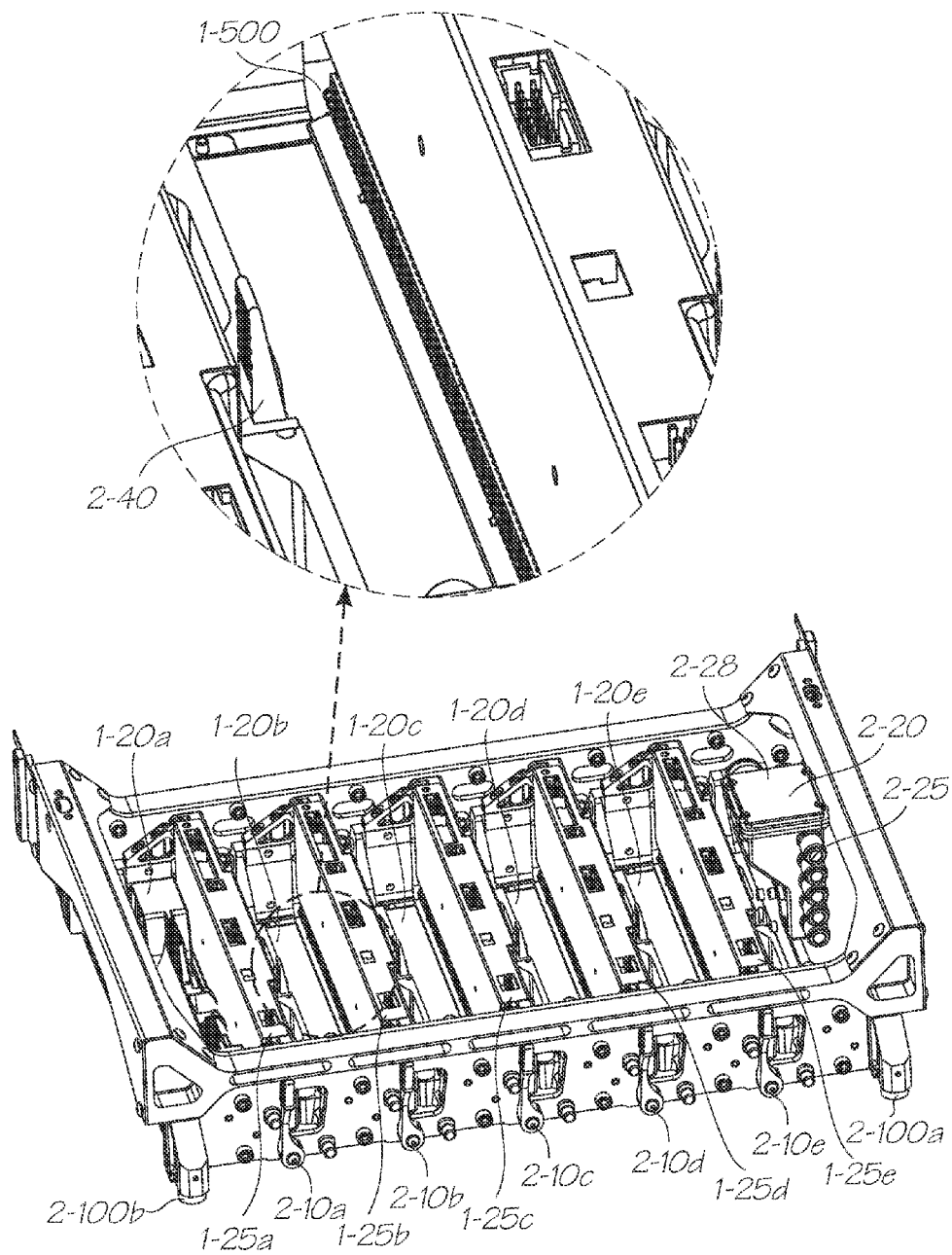
FIG. 2A is a top perspective view of a print head chassis.
Figure 2B:
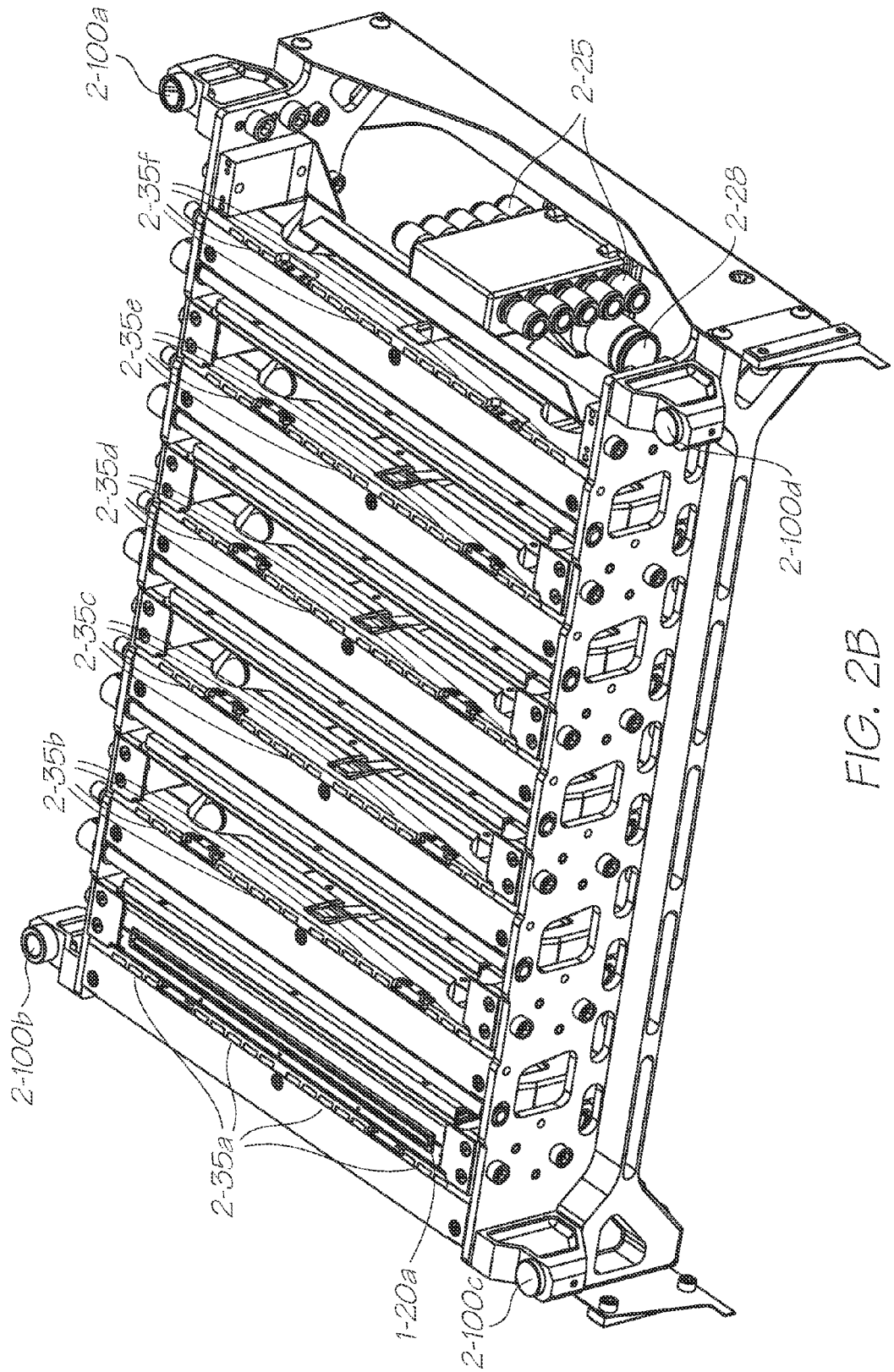
FIG. 2B is a bottom perspective view of a print head chassis.

FIGS. 2A and 2B illustrate in greater detail the print head chassis 1-10 and the print head cartridges 1-20*a-e*. In FIGS. 2A and 2B, only one printhead cartridge 1-20*a* is again shown for purposes of clarity.

As shown in FIG. 2A, the print head controller modules 1-25*a-e*, and the print head cartridges 1-20*a-e* are equally spaced apart in the print head chassis 1-10. Each print head cartridge 1-20*a-e* is removably engaged with the print head chassis 1-10 via corresponding locking tabs 2-40.

The print head controller modules 1-25*a-e* are engaged with the print head chassis 1-10 so as to be pivotable towards and away from a respective print head cartridge 1-20*a-e* through actuation of respective locking mechanisms 2-10*a*, 2-10*b*, 2-10*c*, 2-10*d*, 2-10*e*. Each print head controller module 1-25*a-e* electrically engages with a respective print head cartridge 1-20*a-e* by pivoting towards the respective print head cartridge 1-20*a-e* such that a row of electrical connectors 1-500 (see detailed cutout) on each print head controller module 1-25*a-e* pushes against the respective print head cartridge 1-20*a-e*. Each print head controller module 1-25*a-e* is locked in electrical engagement with respective print head cartridges 1-20*a-e* by locking mechanisms 2-10*a*, 2-10*b*, 2-10*c*, 2-10*d*, and 2-10*e*.

Figure 2C:
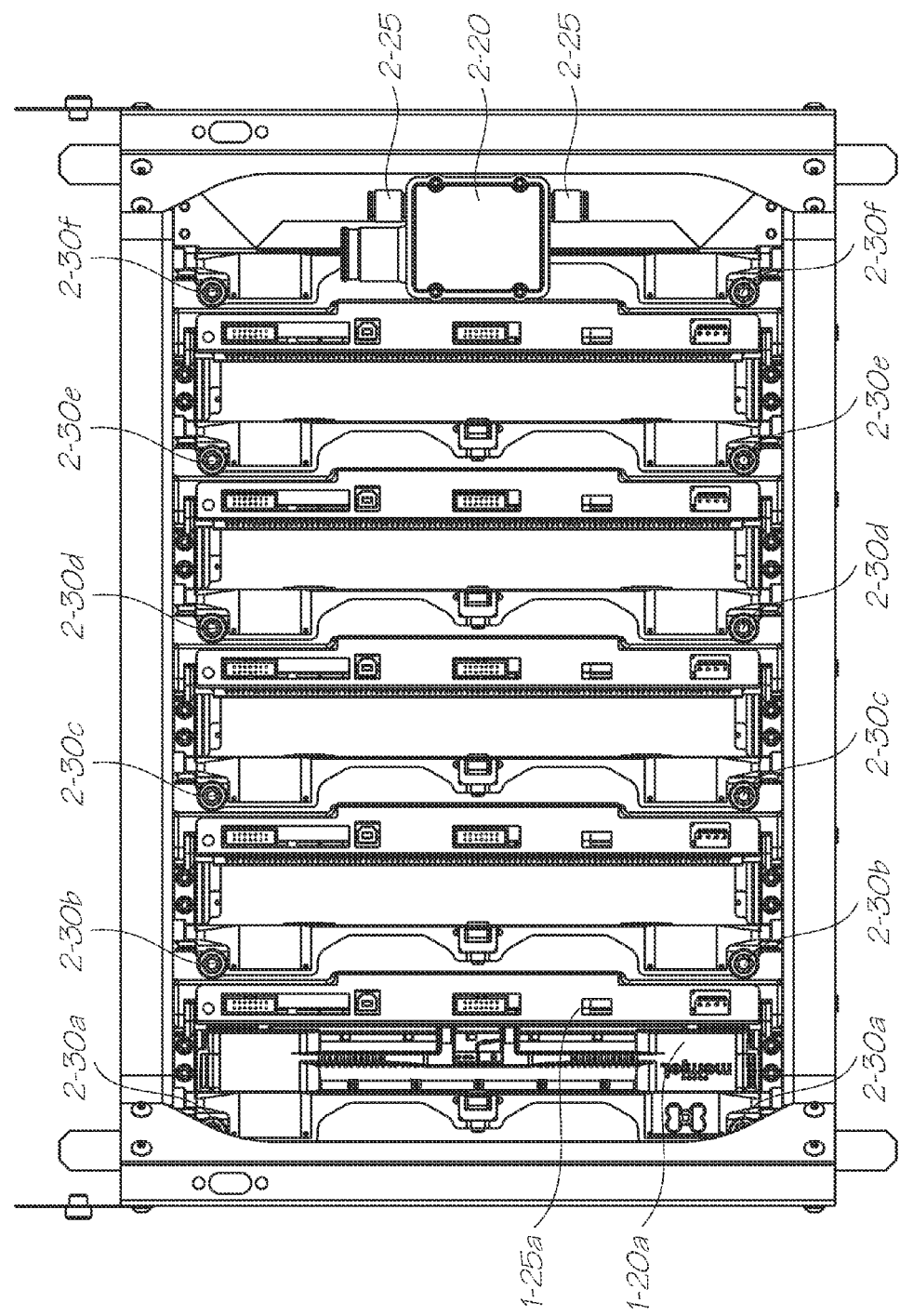
FIG. 2C is a top plan view of a print head chassis.

In an aspect of the print head chassis 1-10, an ink aerosol filter 2-20 is provided at one end of the chassis to collect and filter aerosol particles of ink arising from each print head cartridge 1-20*a-e*. The ink aerosol filter 2-20 is connected via hoses (not shown) to ventilation outlets 2-30*a*, 2-30*b*, 2-30*c*, 2-30*d*, 2-30*e*, 2-30*f* (see also FIG. 2C) respectively connected to suction slits 2-35*a*, 2-35*b*, 2-35*c*, 2-35*d*, 2-35*e*, 2-35*f* (see FIG. 2B) provided in the vicinity of each print head cartridge 1-20*a-e*.

The aerosol filter 2-20 includes inlet ports 2-25 to which the hoses from respective ventilation outlets 2-30*a*, 2-30*b*, 2-30*c*, 2-30*d*, 2-30*e*, 2-30*f* connect, and an outlet port 2-28 which preferably connects to a further filter such as a HEPA filter, and then to a suction device.

Pin bushes 2-100*a*, 2-100*b*, 2-100*c*, 2-100*d* are provided on each of the four bottom corners of the print head chassis 1-10. Pin bushes 2-100*a*, 2-100*b*, 2-100*c*, 2-100*d* support the print head chassis 1-10 (as described in greater detail below), and further provide an aligning feature for ensuring proper alignment of the print head chassis 1-10 with the maintenance chassis 1-80 and, in the first embodiment, the platen 1-70.

Figure 3A:
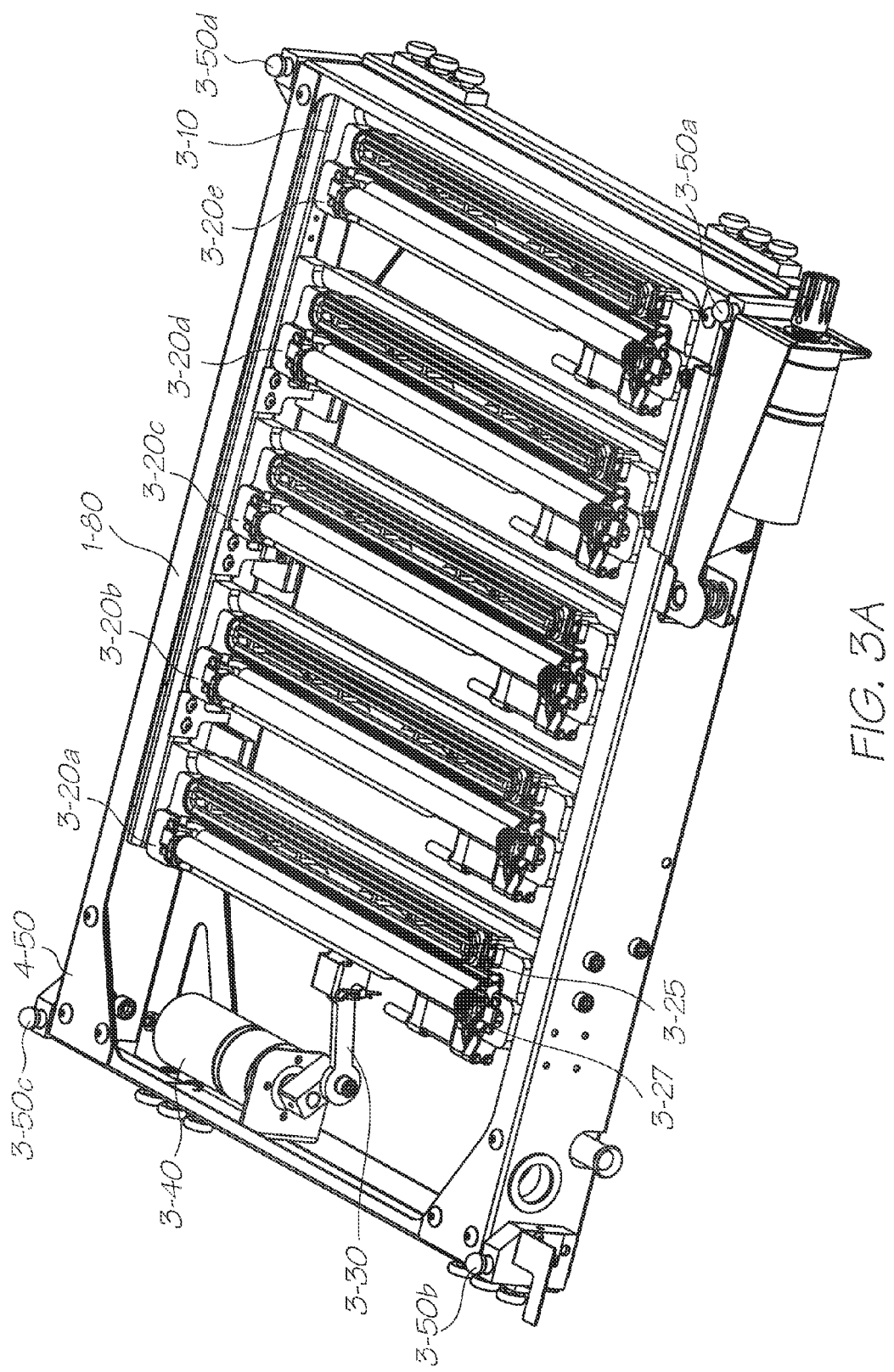
FIG. 3A is a top perspective view of a maintenance chassis.
Figure 3B:
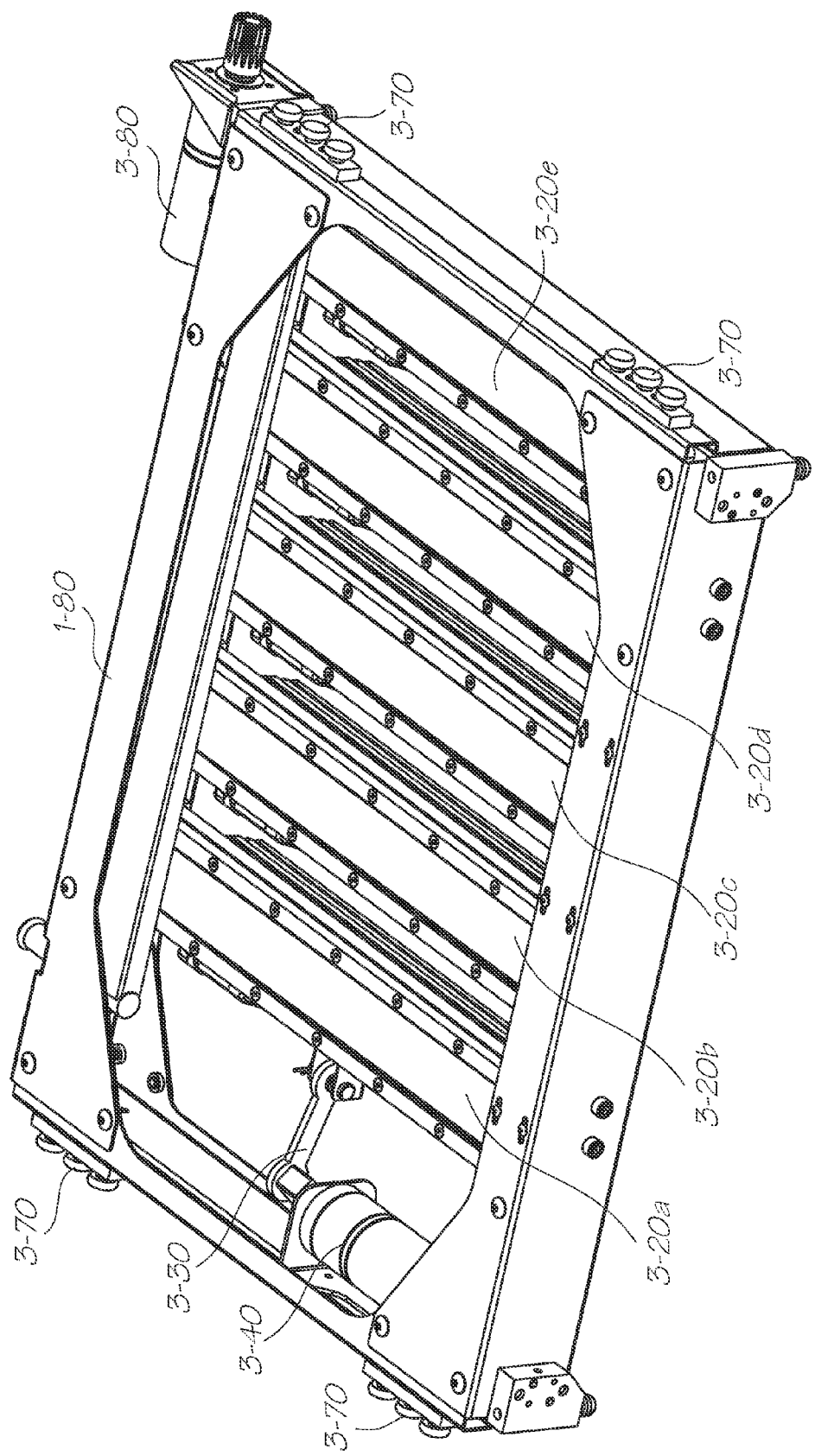
FIG. 3B is a bottom perspective view of a maintenance chassis.

FIGS. 3A and 3B illustrate the maintenance chassis 1-80 in greater detail. The maintenance chassis 1-80 includes print head maintenance cradles 3-20*a*, 3-20*b*, 3-20*c*, 3-20*d*, 3-20*e*. Each print head maintenance cradle includes a capper 3-25 and a cleaner 3-27. The capper 3-25 provides the function of sealing a print head of a print head cartridge 1-20*a-e* when the print head cartridge is not in used, and to also serve as a spittoon in which ink from the print head cartridge is ejected for priming and cleaning purposes. Positioning pins 3-50*a*, 3-50*b*, 3-50*c*, 3-50*d* are provided at each corner of the maintenance chassis 1-80. Positioning pins 3-50*a*, 3-50*b*, 3-50*c*, 3-50*d* are similar to the positioning pins 1-100*a*, 1-100*b*, 1-100*c*, 1-100*d* on the platen 1-70 in that they are for coupling with pin bushes 2-100*a*, 2-100*b*, 2-100*c*, 2-100*d* provided on an underside of the print head chassis 1-10. The positioning pins 3-50*a*, 3-50*b*, 3-50*c*, 3-50*d* preferably have a rounded, dome head.

The maintenance chassis 1-80 includes a maintenance chassis sub-frame 3-10 (see also FIG. 4A) on which the print head maintenance cradles 3-20*a-e* are supported, and a maintenance chassis main frame 4-50 within which the maintenance chassis sub-frame 3-10 resides. The maintenance chassis sub-frame 3-10 is movable within the maintenance chassis main frame 4-50. A sub-frame movement mechanism 3-40 (see FIG. 3A) is provided on the maintenance chassis main frame 4-50 and connected to the maintenance chassis sub-frame 3-10 by a connection member 3-30 to effect movement of the maintenance chassis sub-frame 3-10, and hence the print head maintenance cradles 3-20*a-e*, with respect to the maintenance chassis main frame 4-50. The maintenance chassis sub-frame 3-10 is moved with respect to the maintenance chassis main frame 4-50 to allow either the capper 3-25 or the cleaner 3-27 to be aligned with the print head cartridges 1-20*a-e*.

Figure 4A:
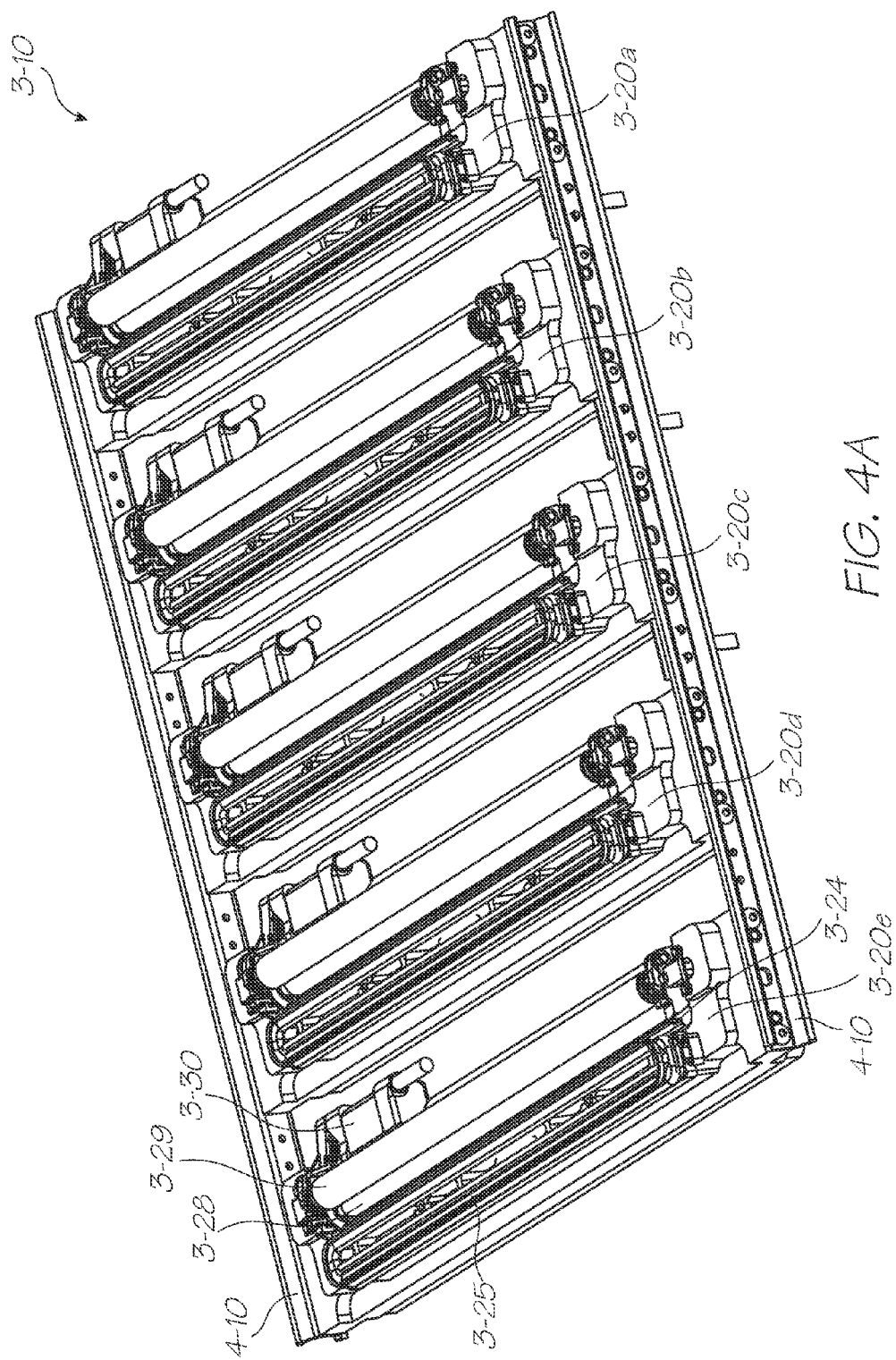
FIG. 4A is a top perspective view of a maintenance chassis sub-frame.
Figure 4B:
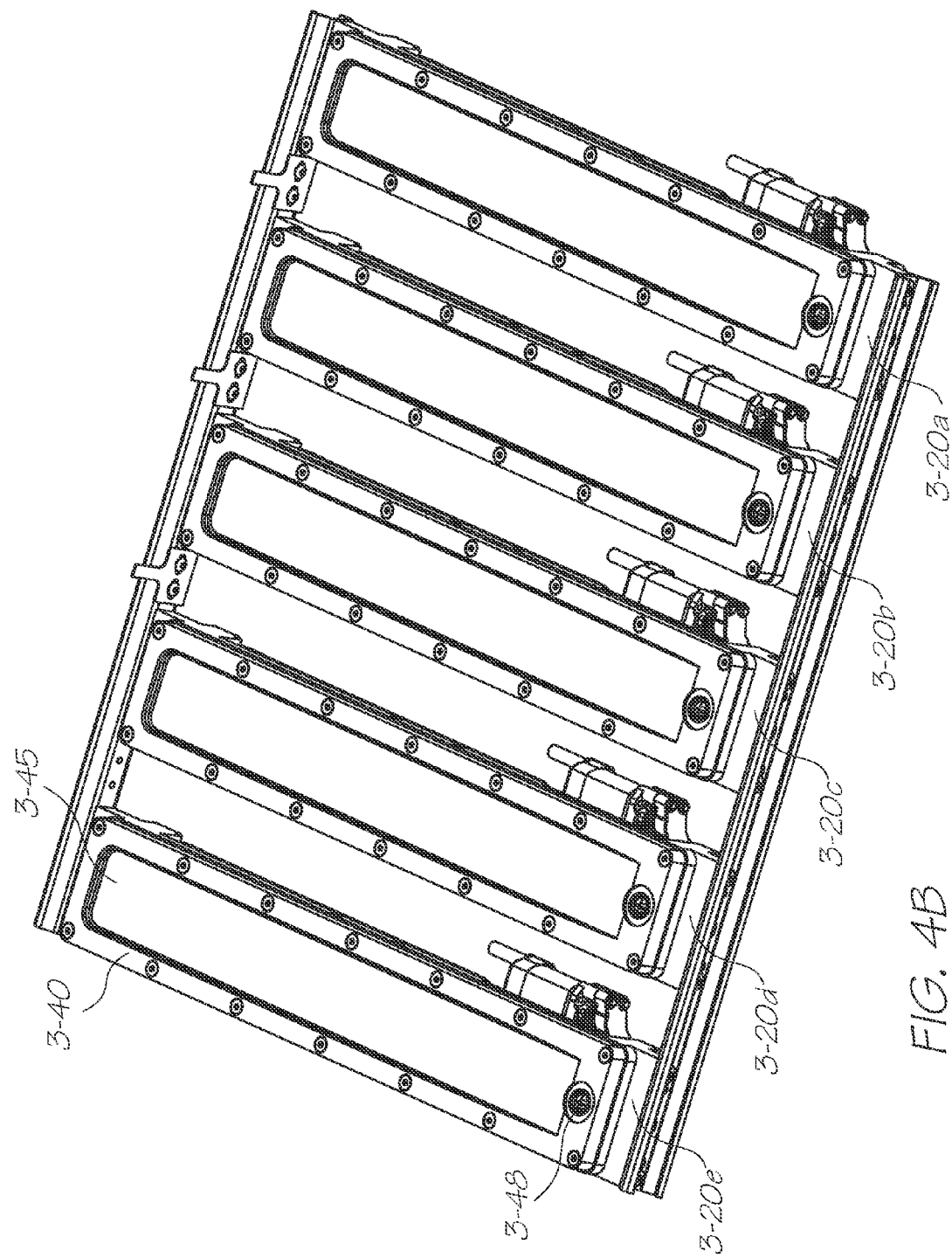
FIG. 4B is a bottom perspective view of a maintenance chassis sub-frame.
Figure 4C:
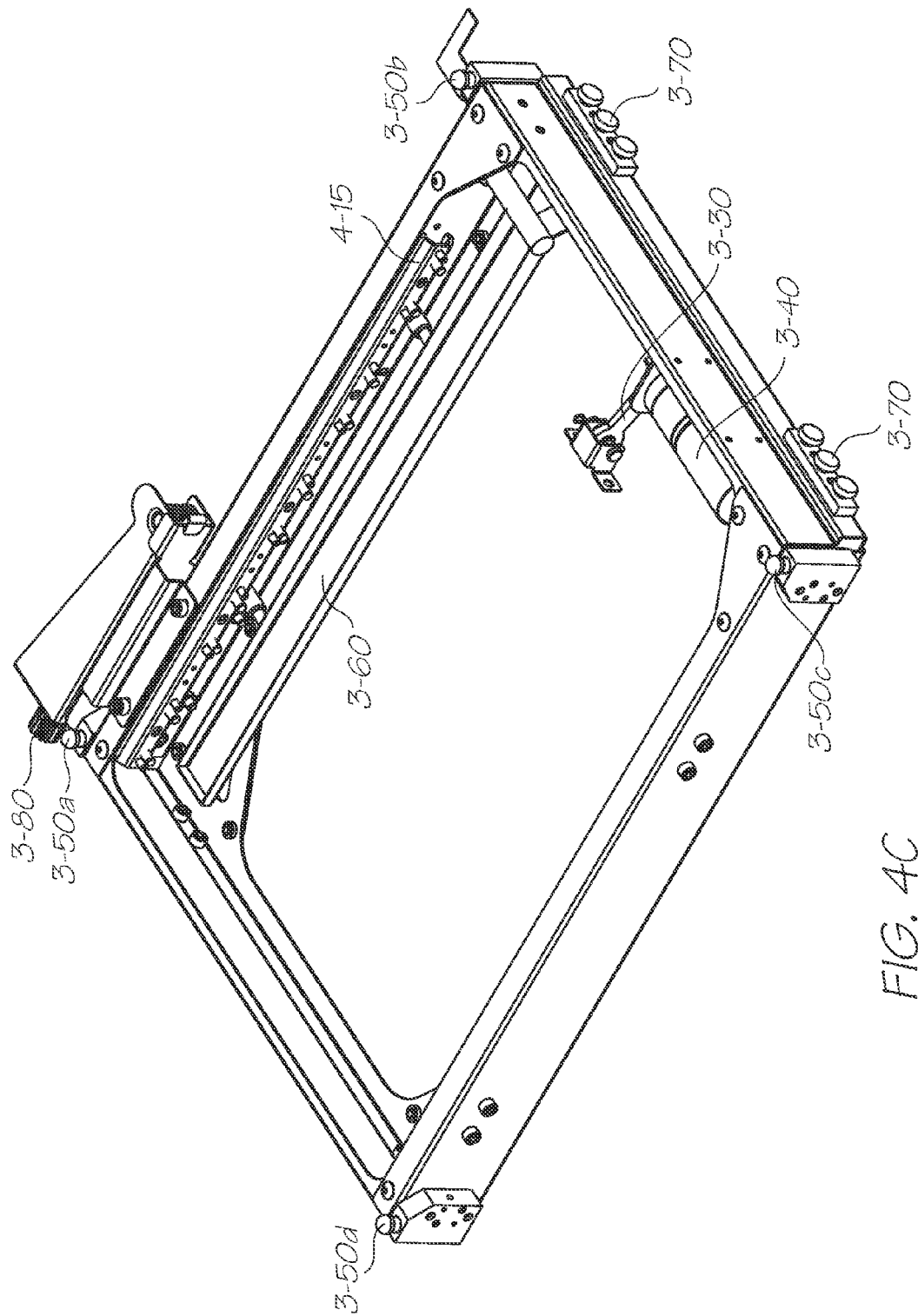
FIG. 4C is a top perspective view of a maintenance chassis main frame.

FIGS. 4A and 4B illustrates the maintenance chassis sub-frame 3-10 in greater detail. FIG. 4C illustrates the maintenance chassis main frame 4-50 in greater detail. The maintenance chassis sub-frame 3-10 has a pair of rails 4-10 which engage with rail supports 4-15 of the maintenance chassis main frame 4-50 allowing the maintenance chassis sub-frame 3-10 to slide within the maintenance chassis main frame 4-50. Each print head maintenance cradle 3-20*a-e* is supported between the pair of rails 4-10, and spaced equally apart with a pitch matching that of the spacing between the print head cartridges 1-20*a-e*, as required to either clean or cap the print head cartridges 1-20*a-3*.

Figure 5A:
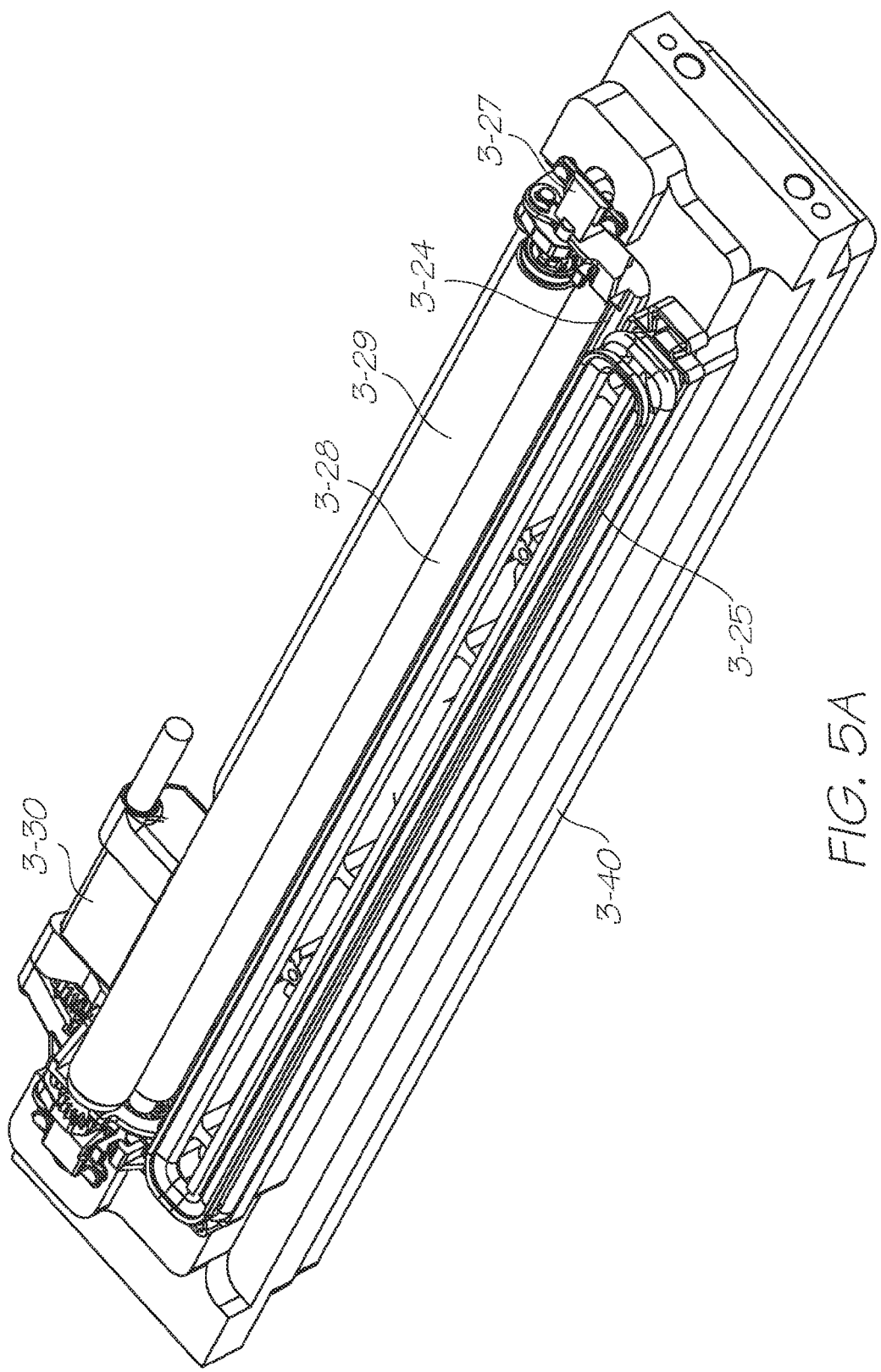
FIG. 5A is a top perspective view of a maintenance cradle.

As best shown in FIG. 5A, the cleaner 3-27 includes a first roller 3-29 of a microfiber material and a second roller 3-28 made of stainless steel or other suitable hard material. The first roller 3-29 provides the function of wiping a print head and wicking ink therefrom, whilst the second roller 3-28 serves the function of pressing against the first roller 3-29 to cause ink soaked thereinto to be squeezed out. A wiper blade 3-24 is also included in each print head maintenance cradle 3-20a-e to scrape from the second roller 3-28 any ink that is squeezed out from the first roller 3-29.

Figure 5B:
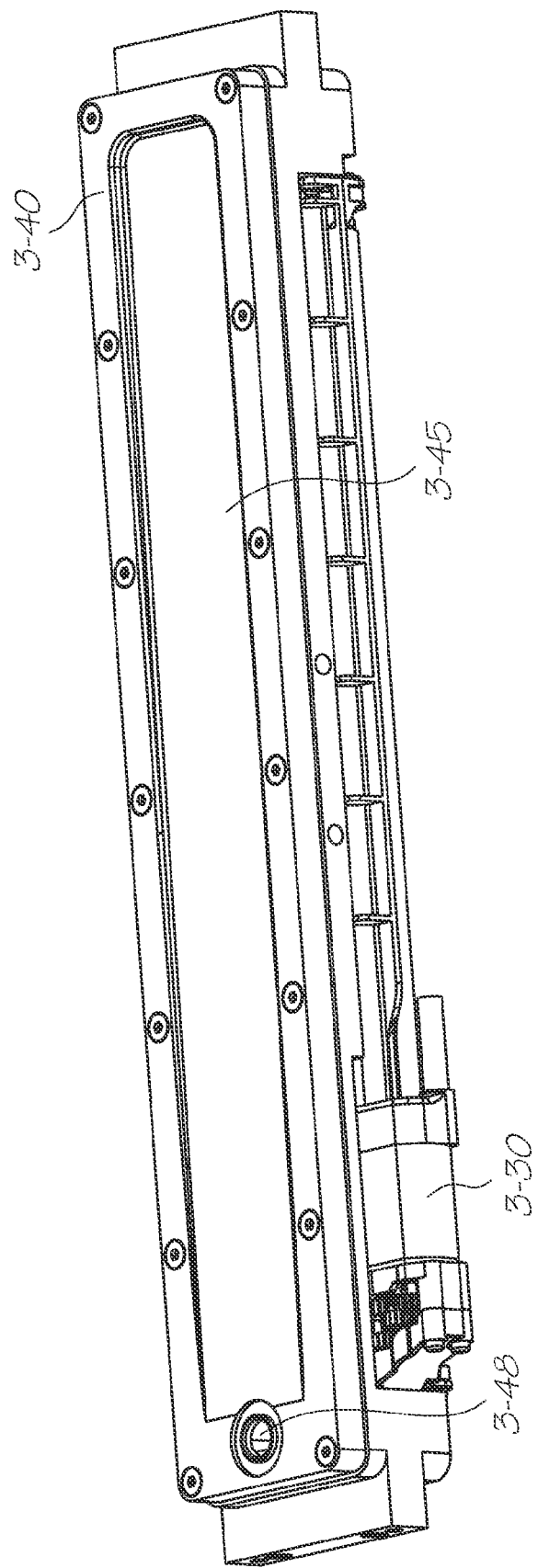
FIG. 5B is a bottom perspective view of a maintenance cradle.

Each print head maintenance cradle 3-20a-e further includes a roller driver 3-30 for driving the first and second rollers 3-28, 3-29, and a sump 3-40 for collecting ink received by the cleaner 3-27 and the capper 3-25. The sump 3-40 has a sloping floor 3-45 (see FIG. 5B) having a lowest point at one end of the maintenance cradle 3-20a-e. As shown in FIG. 5B, the floor of the sump 3-40 has a drain hole 3-48 from which ink collected in the sump drains. The drain holes 3-48 of each maintenance cradle 3-20a-e drain into an ink collection channel 3-60 (see FIG. 4C) provided along one side of the maintenance chassis main frame 4-50. The ink collection channel 3-60 connects with a series of channels provided in the printer main frame 1-50 to empty into a waste ink tank 6-30 (see FIG. 6).

The maintenance chassis 1-80 is provided with rollers 3-70 (see FIG. 4C) on two opposing sides of the chassis. The rollers 3-70 allow the maintenance chassis 1-80 to extend and retract between a storage position (as shown in FIG. 1B) and an operational position (as shown in FIGS. 1A and 1C). A motor 3-80 attached to the maintenance chassis main frame 4-50 engages with a toothed rack 3-90 on the printer main frame 1-50 to translate the maintenance chassis 1-80 between the storage position and the operational position.

Figure 6:
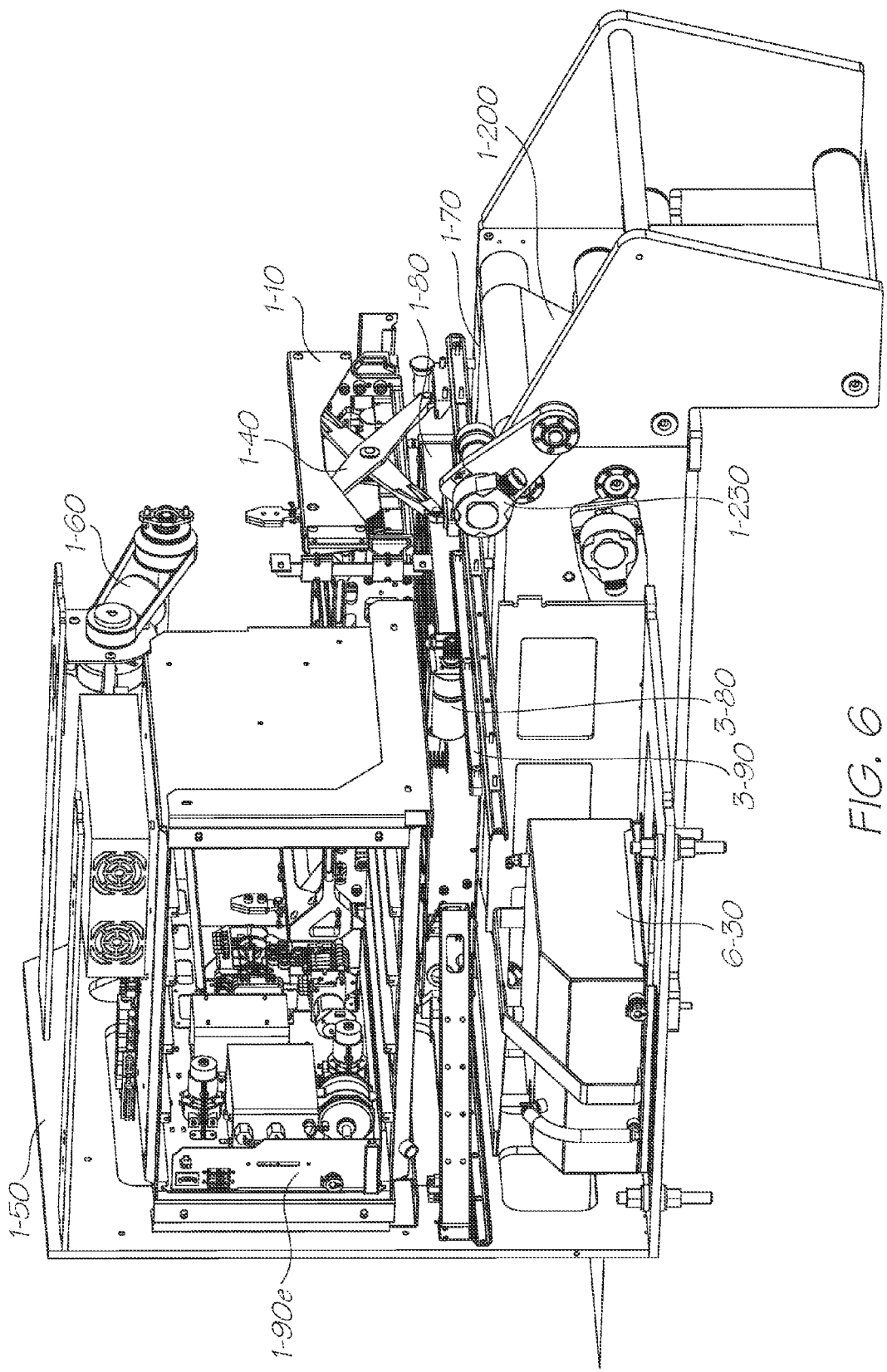
FIG. 6 is a rear perspective view of a printing system according to the disclosed invention.

FIG. 6 provides a view of the printing system 1-1000 from the rear. For clarity of illustration, all but one ink blade 1-90e is removed from respective ink blade docking slots. The maintenance chassis 1-80 is also shown transitioning to an operational position under the print head chassis 1-10.

The waste ink tank 6-30 is secured to a floor of the main chassis 1-50. As previously described, the waste ink tank 6-30 stores ink received by the capper 3-25 as a result of a purging or priming operation, and ink received by cleaner 3-27 as a result of cleaning the print head cartridges 1-20a-e.

Each ink blade 1-90a-e is slidable in a rearward direction (i.e. negative Z-direction of axis on FIG. 1A) to remove the ink blade from the main chassis 1-50. In this manner, convenient exchanging of ink blades to change a colour to be printed by a particular print head is facilitated.

Figure 7:
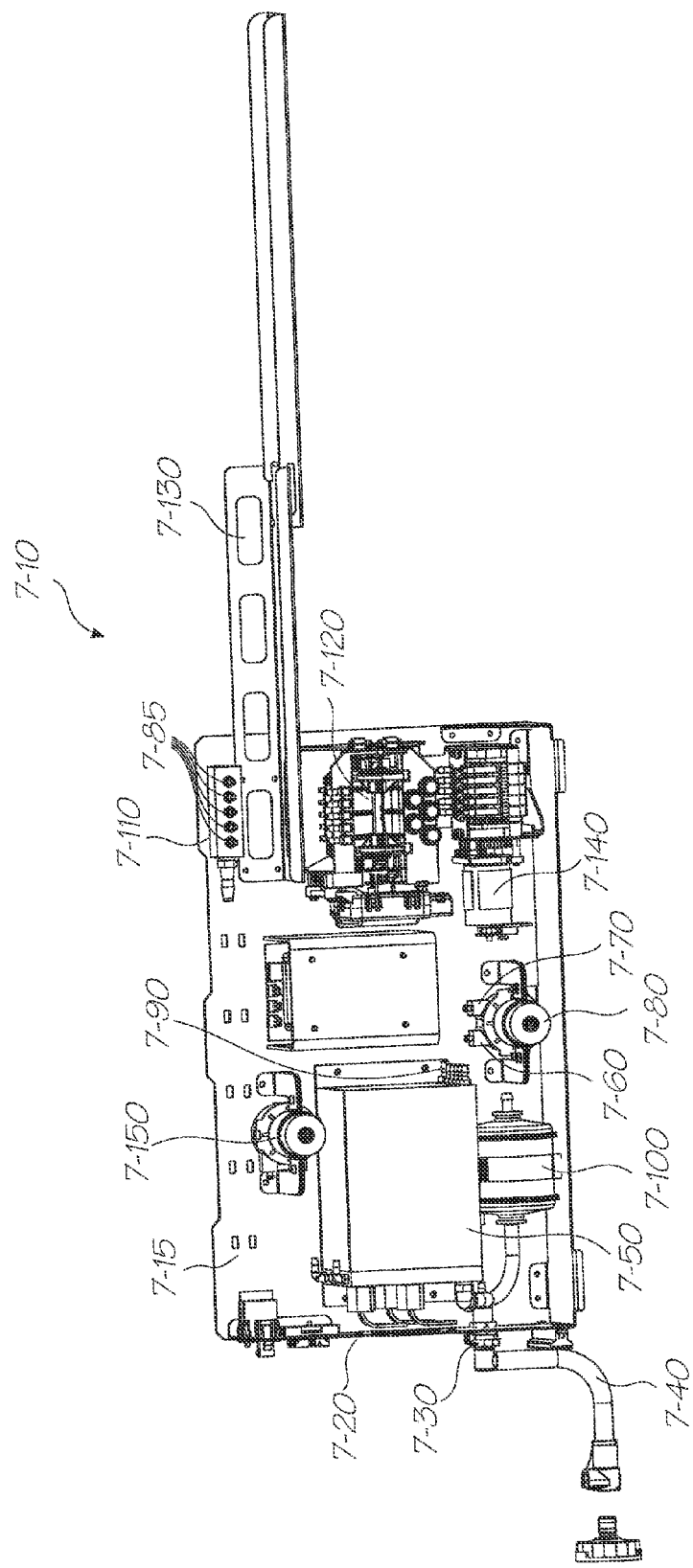
FIG. 7 is a plan view of an ink blade.

FIG. 7 illustrates one of the ink blades 1-90a-e in greater detail. For purposes of FIG. 7, the ink blade depicted is given reference numeral 7-10. The ink blade 7-10 is provided as a blade chassis 7-15 on which the components of the ink blade 7-10 are mounted and supported. The blade chassis 7-15 defines a back plate 7-20 on which an ink inlet 7-30 is provided. The ink inlet 7-30 receives ink from an external bulk ink source (not shown) via an inlet hose 7-40 and communicates the ink to an input 7-60 of a bulk ink pump 7-80. An output 7-70 of the bulk ink pump 7-80 connects to a bulk ink input 7-90 of an intermediate reservoir 7-50.

An ink filter 7-100 is provided downstream from the intermediate reservoir 7-50 and connects to an ink manifold 7-110. The ink manifold 7-110 is connected to a pinch valve 7-120, which in turn communicates ink to the print head. A hose carrier 7-130 is provided to support the hoses (not shown) connecting the pinch valve 7-120 to the print head. Return hoses (not shown) for returning ink from the print head to the intermediate reservoir 7-50 may also be supported on the hose carrier 7-130. The return hoses (not shown) from the print head connect to a printing ink pump 7-140, which in turn connects back to the intermediate reservoir 7-50. The printing ink pump 7-140 is down stream from the print head and essentially sucks in through the print head, as opposed to pushing ink to the print head. A negative pressure pump 7-150 is further provided to maintain a negative pressure in the intermediate reservoir 7-50.

The ink manifold 7-110 defines a plurality of outlets 7-85 which all connect ultimately to a single print head cartridge 1-20a, 1-20b, 1-20c, 1-20d, or 1-20e. In this manner, each print head cartridge 1-20a-e is supplied with ink from a single ink blade 7-10, and hence monochromatically supplied with ink of a single colour. The colour of ink supplied to a print head cartridge 1-20a-e is changeable by replacing the ink blade 7-10 connected thereto, and performing a suitable re-priming process to flush existing ink from the print head cartridge 1-20a-e and priming the print head cartridge 1-20a-e with new ink. Although, preferably, an entire print head cartridge 1-20a-e is replaced when exchanging ink blades 7-10, whereby the colours printed by the printing system 1-1000 may be rapidly changed to suit different print jobs.

Figure 8B:
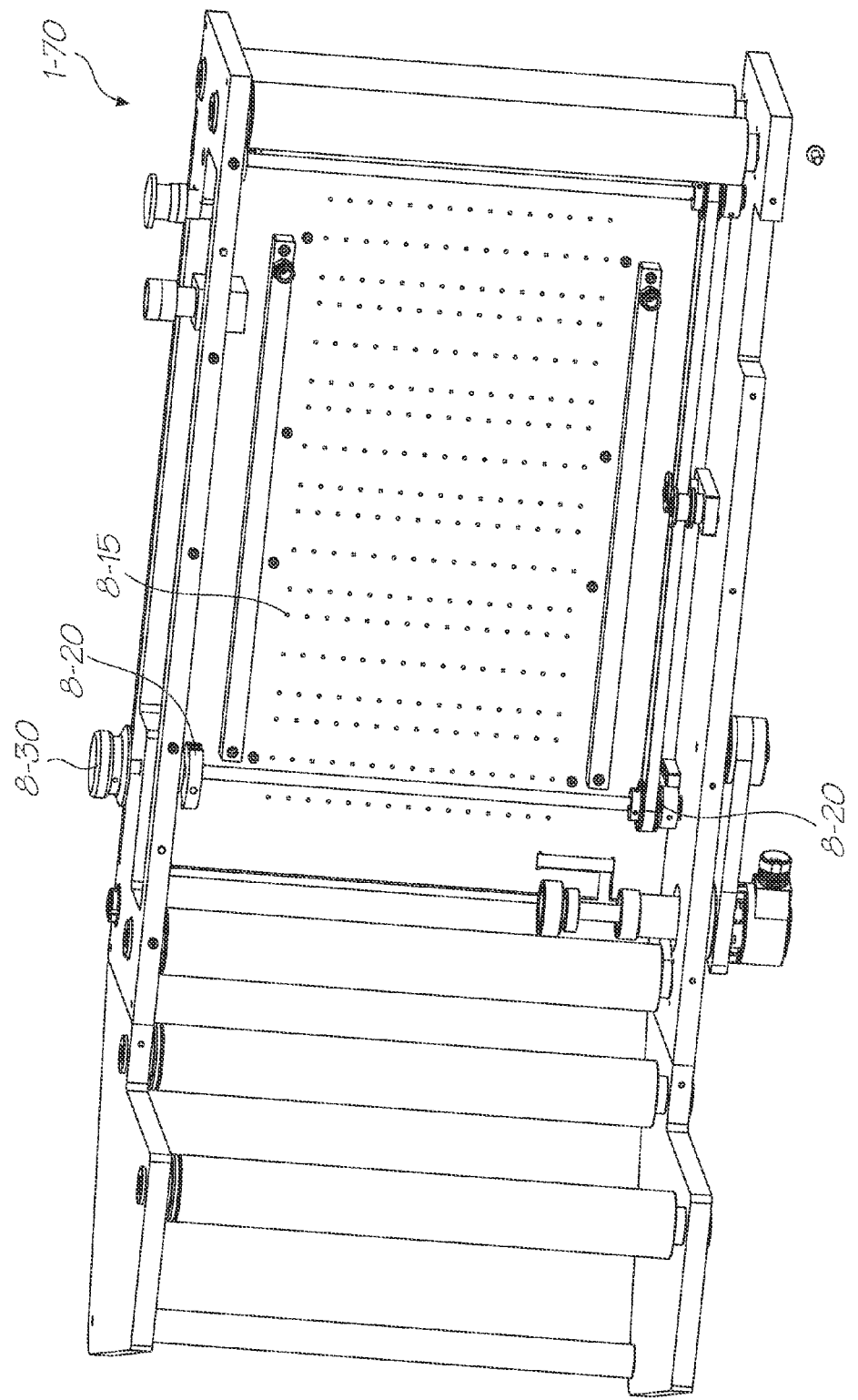
FIG. 8B is a bottom perspective view of a platen assembly.

FIGS. 8A and 8B show front and rear perspective views, respectively, of the platen 1-70. As previously described, the platen 1-70 is part of the printing system 1-1000 in some aspects. In other aspects, the platen 1-70 is provided by a third party or the end user, and configured to work with the printing system 1-70.

The platen 1-70 is a vacuum platen and allows the provision of a suction force through the platen surface 1-220 to assist in maintaining a print media 1-200 traversing across the surface 1-220 of the platen 1-70 flat against the surface 1-220. The surface 1-220 of the platen 1-70 defines depressions 8-10. Suction holes 8-15 are defined in each depression 8-10, which pass through the surface 1-220 of the platen 1-70 to an opposite side. A vacuum box may be attached to an underside of the platen 1-70, in which one or more suction devices are provided to generate a suction force downwards through the platen 1-70.

The positioning pins 1-100a, 1-100b, 1-100c, 1-100d are supported on an adjustment cam system 8-20, which allows for the height of the positioning pins 1-100a, 1-100b, 1-100c, 1-100d to be adjusted via adjustment knob 8-30.

Figure 9:
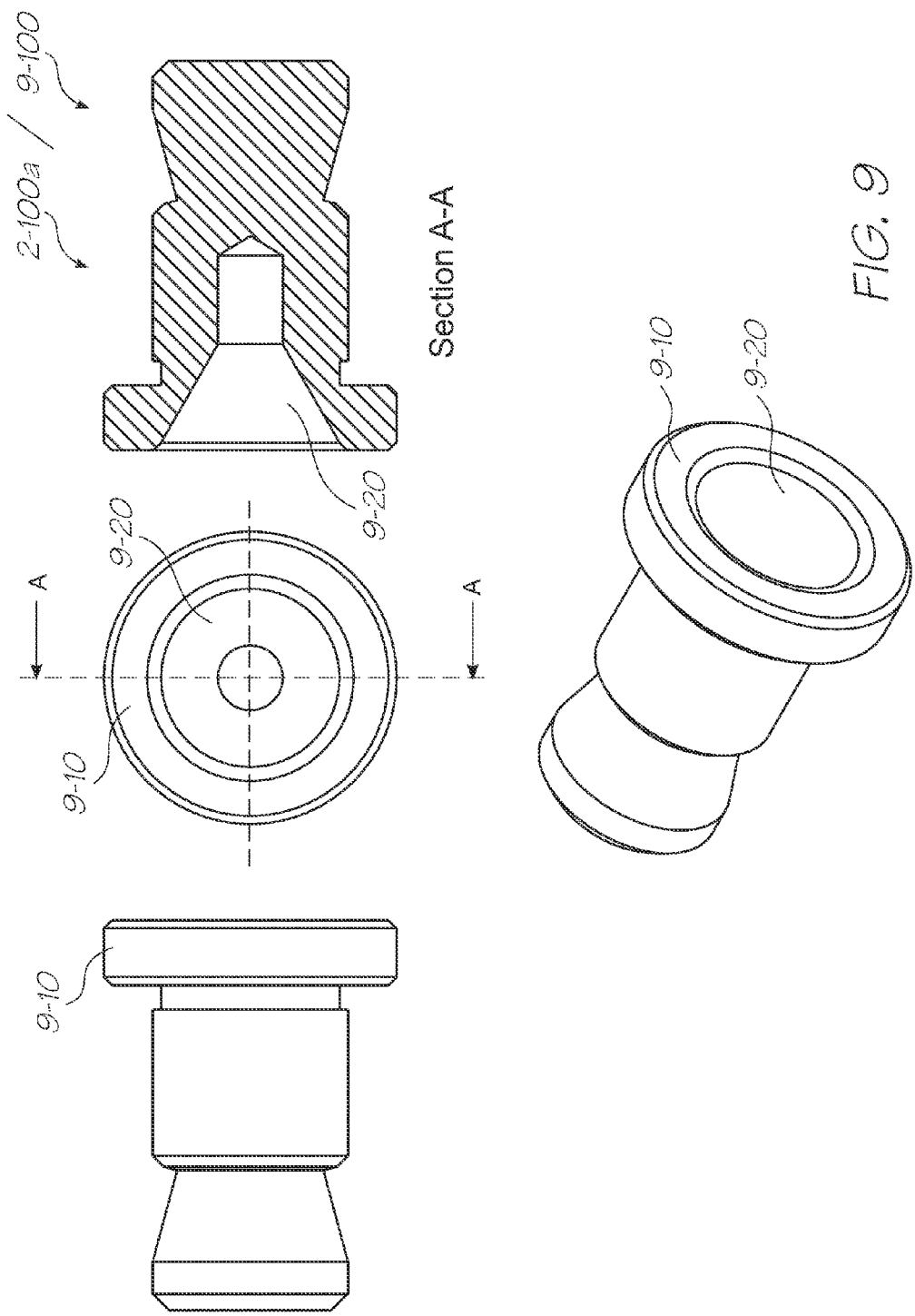
FIG. 9 is a compilation view of a location bush.
Figure 10:
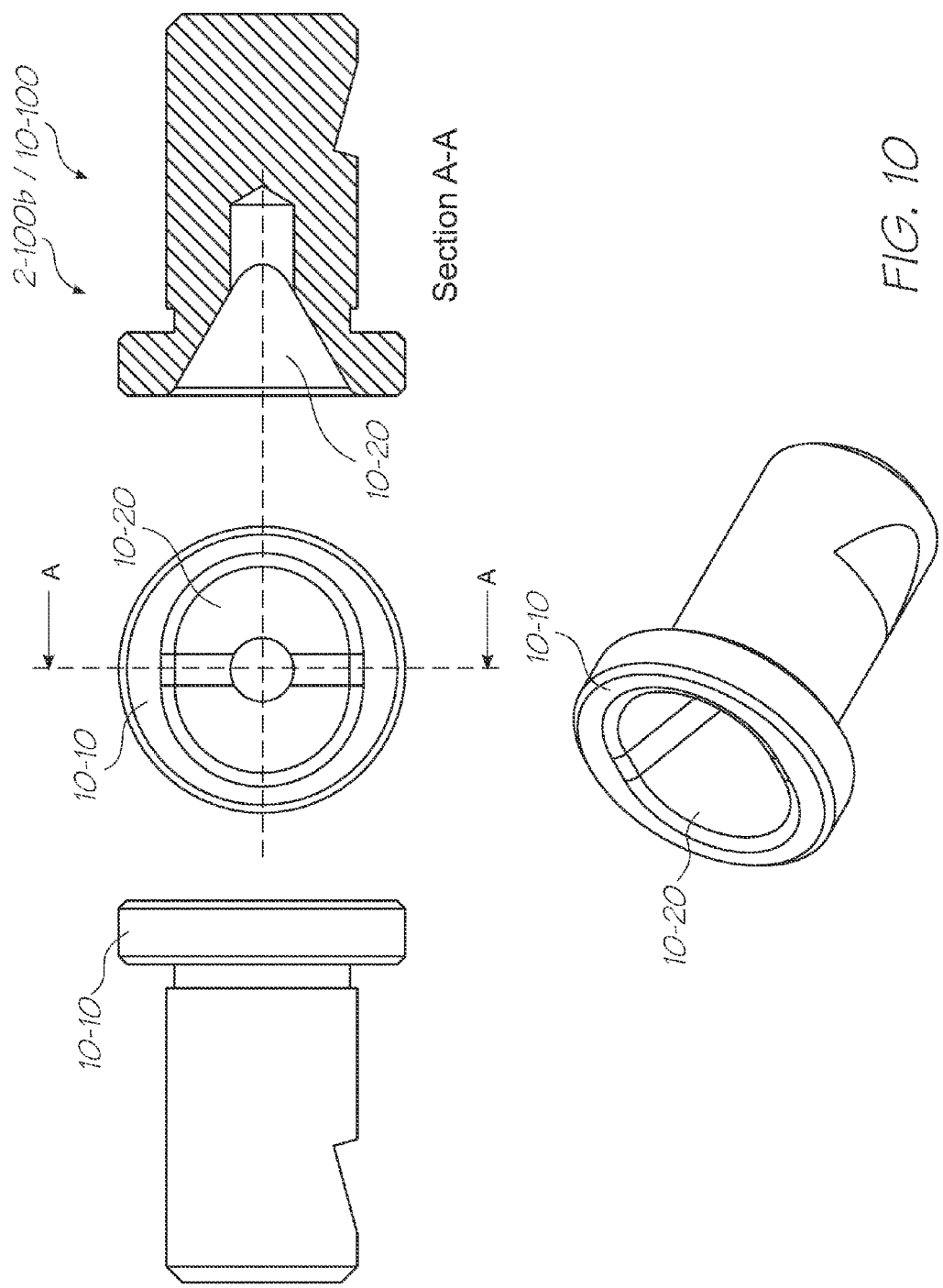
FIG. 10 is a compilation view of a slotted location bush.
Figure 11:
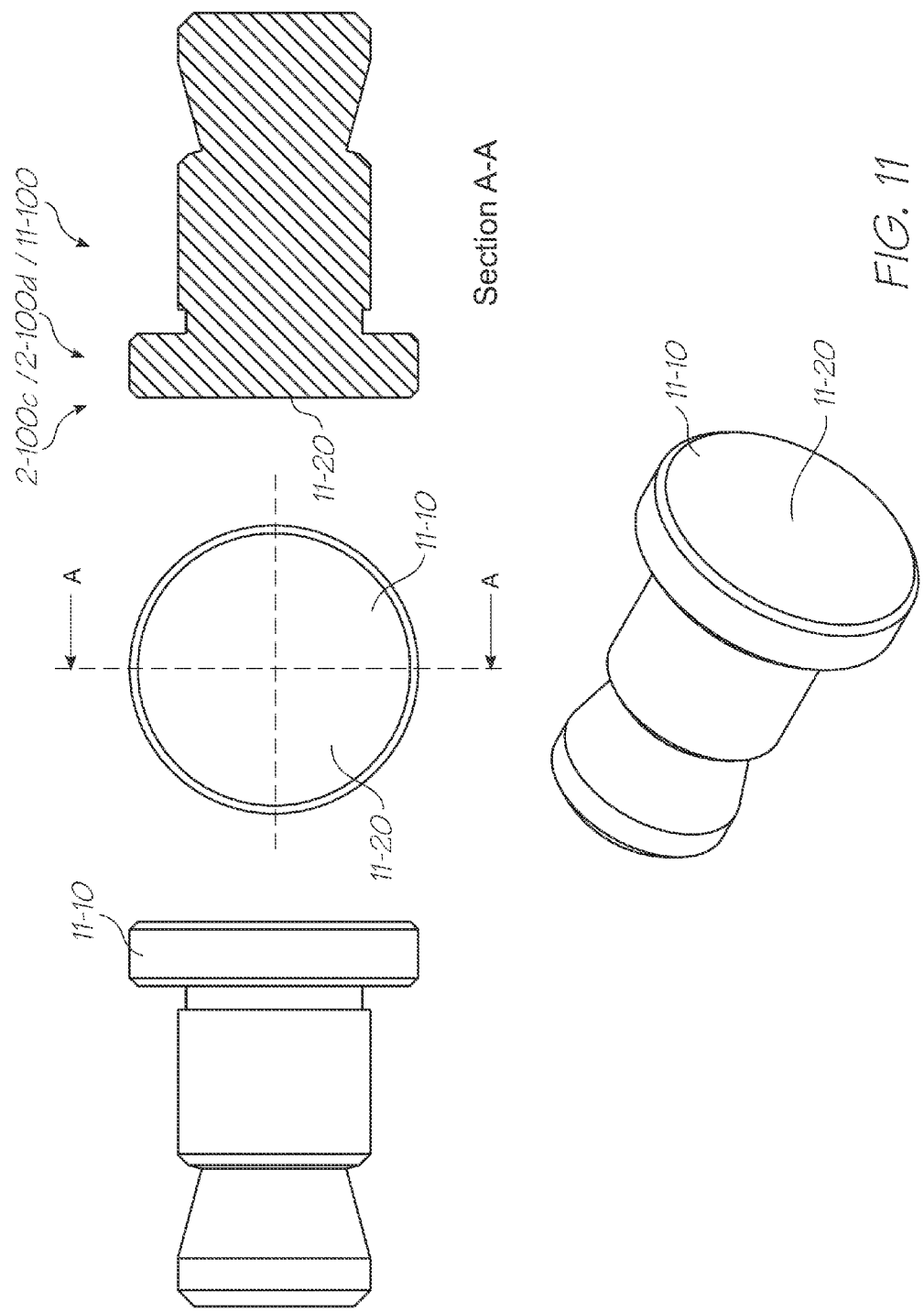
FIG. 11 is a compilation view of a flat pin bush.

FIGS. 9, 10, and 11 illustrate in detail the pin bushes 2-100a, 2-100b, 2-100c, 1-120d located on an underside of the print head chassis 1-10.

Pin bush 2-100a located at a front-right under-corner of the print head chassis 1-10 when in an operative position is a location bush having a shape and configuration as illustrated in FIG. 9. For convenience of reference, the location bush illustrated in FIG. 9 is given the reference numeral of 9-100. The location bush 9-100 has a circular head 9-10. The circular head 9-10 defines a circular-conical depression 9-20. The circular-conical depression 9-20 is adapted to receive positioning pins 1-100a and 3-50a therein. Due to the circular-conical configuration of the depression 9-20 and the rounded head of positioning pins 1-100a and 3-50a, the pins 1-100a and 3-50a always couple with the location bush 9-100 in a consistent and exact engagement.

Pin bush 2-100b located at a front-left under-corner of the print head chassis 1-10, when in an operative position, is a slotted location bush having a shape and configuration as illustrated in FIG. 10. For convenience of reference, the location bush illustrated in FIG. 10 is given the reference numeral of 10-100. The slotted location bush 10-100 has a circular head 10-10. The circular head 10-10 defines an oval-conical depression 10-20. The oval-conical depression 10-20 is adapted to receive positioning pins 1-100b and 3-50b therein. The oval-conical configuration of the depression 10-20 allows one degree of freedom for the pins 1-200b and 3-50b received therein. The axis of freedom is in the X-direction of FIG. 1A, that is, parallel to the width of the printing system 1-1000 (i.e. parallel to a direction of print media propagation).

The slotted location bush 10-100, allows the front-left corner of the print head chassis 1-10 one degree of freedom along the X-axis of FIG. 1A, that is along the direction parallel to a width of the printing system 1-1000 (i.e. parallel to a direction of print media propagation), but consistently aligns the corner along the Z-axis, that is, normal to a width of the printing system 1-1000 (i.e. normal to a direction of print media propagation). This allows for some degree of variation in the manufacture and/or location of the pins 1-100b and 3-50b and the pin bush 2-100b. In this manner, consistent and stable support of the print head chassis 1-20 and the maintenance chassis 1-80 is less sensitive to the exactness of manufacture and location of the positioning pins 1-100b and 3-50b, and the pin bush 2-100b.

The location bush 10-100, which allows for no freedom of movement in the X-Y plane for the positioning pins 1-100a and 3-50a received therein, hence determines the base/reference location of the print head chassis 1-10 with respect to the platen 1-70 and the maintenance chassis 1-80. Together with the slotted location bush 10-100, which allows freedom of movement along the X axis but not the Z axis, and combined with the fact that the print head chassis 1-10 is a rigid structure, consistent alignment of the print head chassis 1-10 in the X-Z plane is achieved. The remaining two corners of the print head chassis 1-10 and the maintenance chassis 1-80 are positioned with respect to the positioning determined by the location bush 9-100 and slotted location bush 10-100.

The pin bushes 2-100c and 2-100d located at a rear-left and rear-right under-corners of the print head chassis 1-10 are flat pin bushes having a shape and configuration as illustrated in FIG. 11. For convenience of reference, the flat pin bushes illustrated in FIG. 11 is given the reference numeral of 11-100. The flat pin bush 11-100 has a circular head 11-10, but unlike the location bush 9-100 and the slotted location bush 10-100, does not have a depression defined into a top of the head 11-10. Instead, the head 11-10 presents a solid, flat surface 11-20. The head 11-10 of the flat pin bush 11-100 used on the print head chassis as rear-left and rear-right bushes 2-100c, 2-100d may be formed with a flat head as opposed to a depression because further positioning of the print head chassis 1-10 with respect to the platen 1-70 or to the maintenance chassis 1-80 is not necessary. The location bush 9-100 and the slotted location bush 10-100 provide all necessary alignment of the print head chassis 1-10 with respect to the platen 1-70 and the maintenance chassis 1-80.

Second Embodiment

Figure 20:
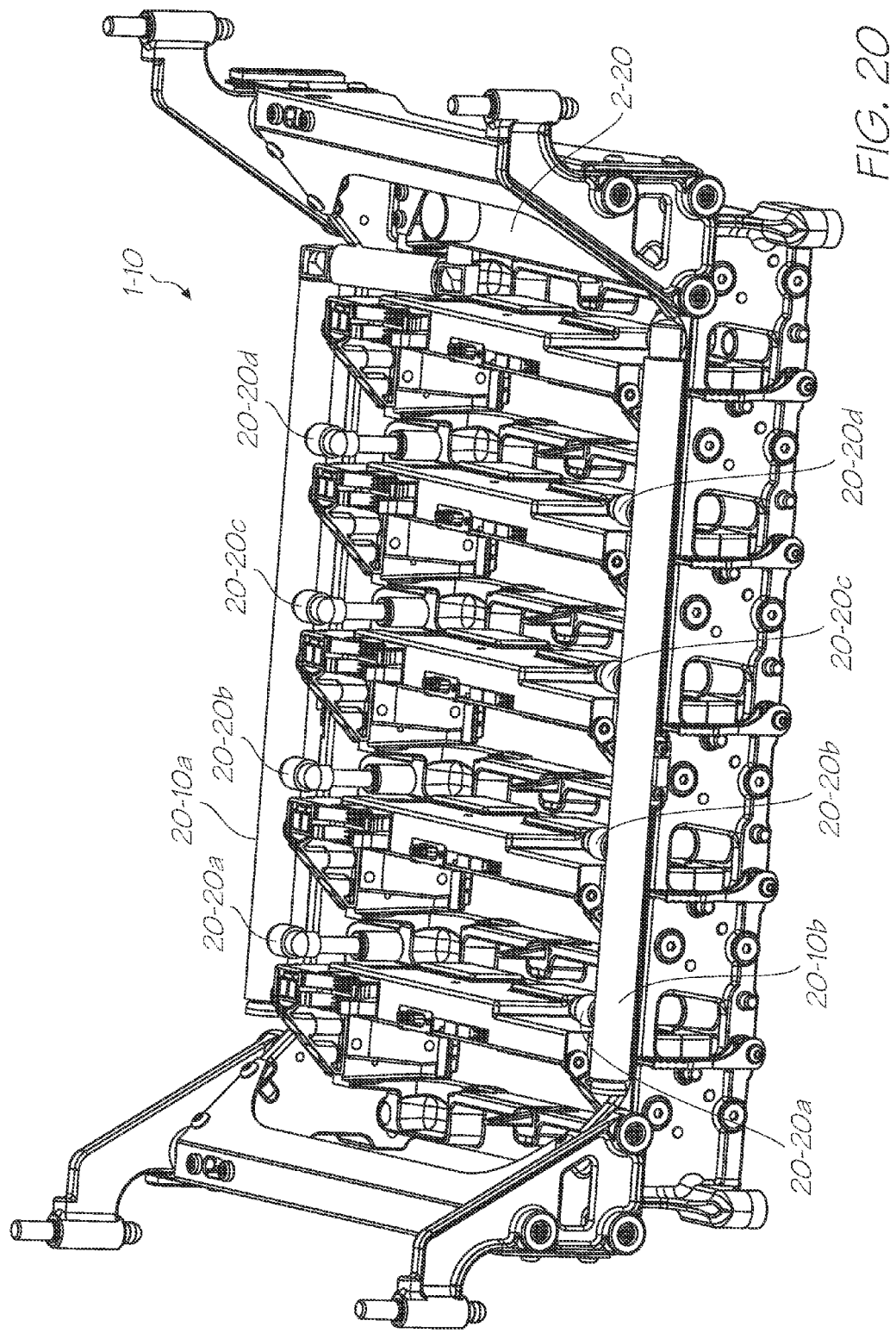
FIG. 20 illustrates a print head chassis having an aerosol extraction system according to a second embodiment of the disclosed invention.

FIG. 20 illustrates a print head chassis 1-10 according to a second embodiment of the present invention. In the second embodiment, the ventilation outlets 2-30a, 2-30b, 2-30c, 2-30d (see FIG. 2C) feed into a pair of common aerosol extraction rails 20-10a, 20-10b via connectors 20-20a, 20-20b, 20-20c, 20-20d. The common aerosol extraction rails 20-10a, 20-10b feed into the aerosol filter 2-20.

The use of the common aerosol extraction rails 20-10a, 20-10b eliminates the need for individual hoses connecting each of the ventilation outlets 2-30a, 2-30b, 2-30c, 2-30d, 2-30e, 2-30f to the aerosol filter 2-20. The print head chassis 1-10 is rendered less cluttered, and permits easier user access to and manipulation of the elements supported in the print head chassis 1-10. Moreover, ventilation of the print head chassis 1-10 is noticeably improved.

Third Embodiment

Figure 21:
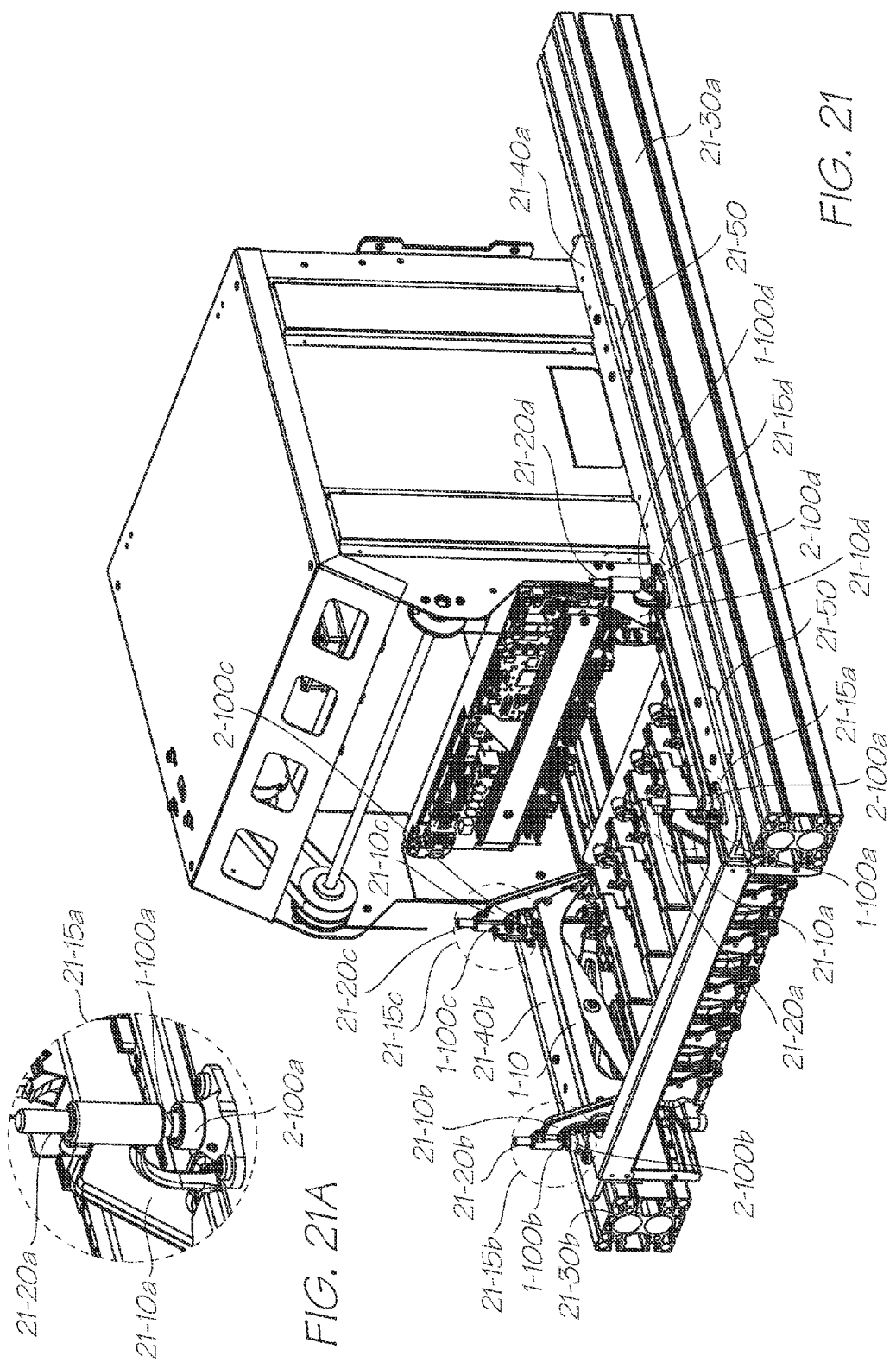

FIGS. 21 and 21A illustrates a third embodiment of the present invention. In the third embodiment, the print head chassis 1-10 is provided with support arms 21-10a, 21-10b, 21-10c, 21-10d. Support arms 21-10a, 21-10b, 21-10c, 21-10d are attached respectively at each corner of the print head chassis 1-10.

Each support arm 21-10a, 21-10b, 21-10c, 21-10d is respectively fixed to a corner of the print head chassis 1-10 and extends above the print head chassis 1-10 in a crane-like manner, so as to overhang the edges of the print head chassis 1-10. Each support arm 21-10a, 21-10b, 21-10c, 21-10d defines a support fixture 21-15a, 21-15b, 21-15c, 21-15d at which there is provided a positioning pin 1-100a, 1-100b, 1-100c, 1-100d. The positioning pins 1-100a, 1-100b, 1-100c, 1-100d are each engaged with pin height adjusters 21-20a, 21-20b, 21-20c, 21-20d which adjust the amount by which each positioning pin 1-100a, 1-100b, 1-100c, 1-100d protrudes from the support fixtures 21-15a, 21-15b, 21-15c, 21-15d.

In the third embodiment, the print head chassis 1-10 is supported from a pair of gantries 21-30a, 21-30b via the positioning pins 1-100a, 1-100b, 1-100c, 1-100d of the support arms 21-10a, 21-10b, 21-10c, 21-10d. The gantries 21-30a, 21-30b are provided running above and across the platen 1-70 to provide a framework suspended over the platen 1-70 upon which the printing system 1-1000 is supported The gantries 21-30a, 21-30b may be provided as part of the printing system 1-1000, or may be provided by $3^{rd}$ party providers to suit specific requirements.

The printing system 1-1000 of the third embodiment includes a mounting frame 21-40a, 21-40b secured to the printer main frame 1-50. Each mounting frame 21-40a, 21-40b includes a pair of pin bushes 2-100a, 2-100b, 2-100c, 2-100d. The pin bushes 2-100a, 2-100b, 2-100c, 2-100d provided on each mounting frame 21-40a, 21-40b are identical to those used in the first embodiment. The mounting frame 21-40a, 21-40b allows the printing system 1-1000 to be supported on the gantries 21-30a, 21-30b, for example by way of a complementary ridge and groove coupling between the mounting frame 21-40a, 21-40b and the gantries 21-30a, 21-30b.

Similar also to the first embodiment is the use of a first pin bush with a circular-conical depression 9-20 as one of the pin bushes, the use of a second pin bush with an oval-conical depression 10-20 as a second of the pin bushes, and the use of flat pin bushes with no depression as the third and fourth of the pin bushes.

The pin bushes 2-100a, 2-100b, 2-100c, 2-100d provided on the mounting frame 21-40a, 21-40b of each gantry 21-30a, 21-30b receive the positioning pins 1-100a, 1-100b, 1-100c, 1-100d of the support arms 21-10a, 21-10b, 21-10c, 21-10d in like manner to that described in the first embodiment to provide consistent and stable support for the print head chassis 1-10 with respect to the platen 1-70. Pin height adjuster 21-20a, 21-20b, 21-20c, 21-20d allow the amount by which each positioning pin 1-100a, 1-100b, 1-100c, 1-100d protrudes to be adjusted, thereby allowing the height of the print head chassis 1-10 with respect to the platen 1-70 to be adjusted.

In the first embodiment, the print head chassis 1-10 is supported on positioning pins protruding upwards from the platen 1-70. Having positioning pins protruding from the platen 1-70 restricts the width of the print media upon which the printing system 1-1000 can print, since any print media that is used must fit within the bounds of the protruding positioning pins.

In contrast, the third embodiment supports the print head chassis 1-10 from gantries that are suspended above the platen 1-70. In this manner, the platen 1-70 is free of protrusions which limit the width of the print media passing thereon. The printing system 1-1000 of the third embodiment therefore supports printing on print media of any width.

The third embodiment allows for the use of multiple printing systems 1-1000 arranged on a plurality of gantries to span a wide-format print media web. Each gantries 21-30a, 21-30a is provided with a pair of positioning grooves 21-50a, 21-50b which respectively couple with a corresponding ridge on the mounting frames 21-40a, 21-40b of two adjacent printing systems 1-1000. In this manner, multiple printing systems 1-1000 are arranged side-by-side, and preferably offset with each other, across a width of the print media to enable printing on a wide-format print media.

The third embodiment therefore allows print media of any width to be employed, requiring only sufficient printing systems 1-1000 to be modularly arranged to span the width of the print media on an appropriate gantry framework.

Fourth Embodiment

Figure 22:
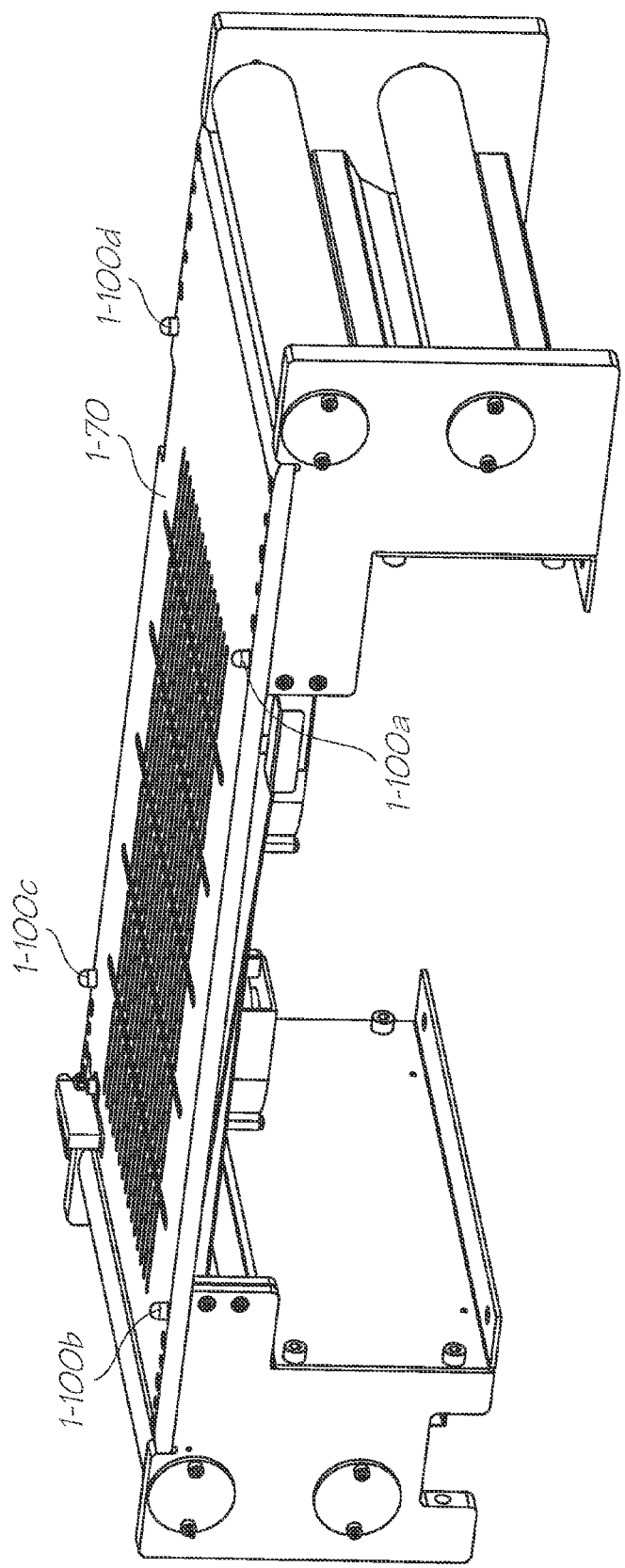
FIGS. 22 to 24 illustrate a platen according to a fourth embodiment of the disclosed invention.
Figure 23:
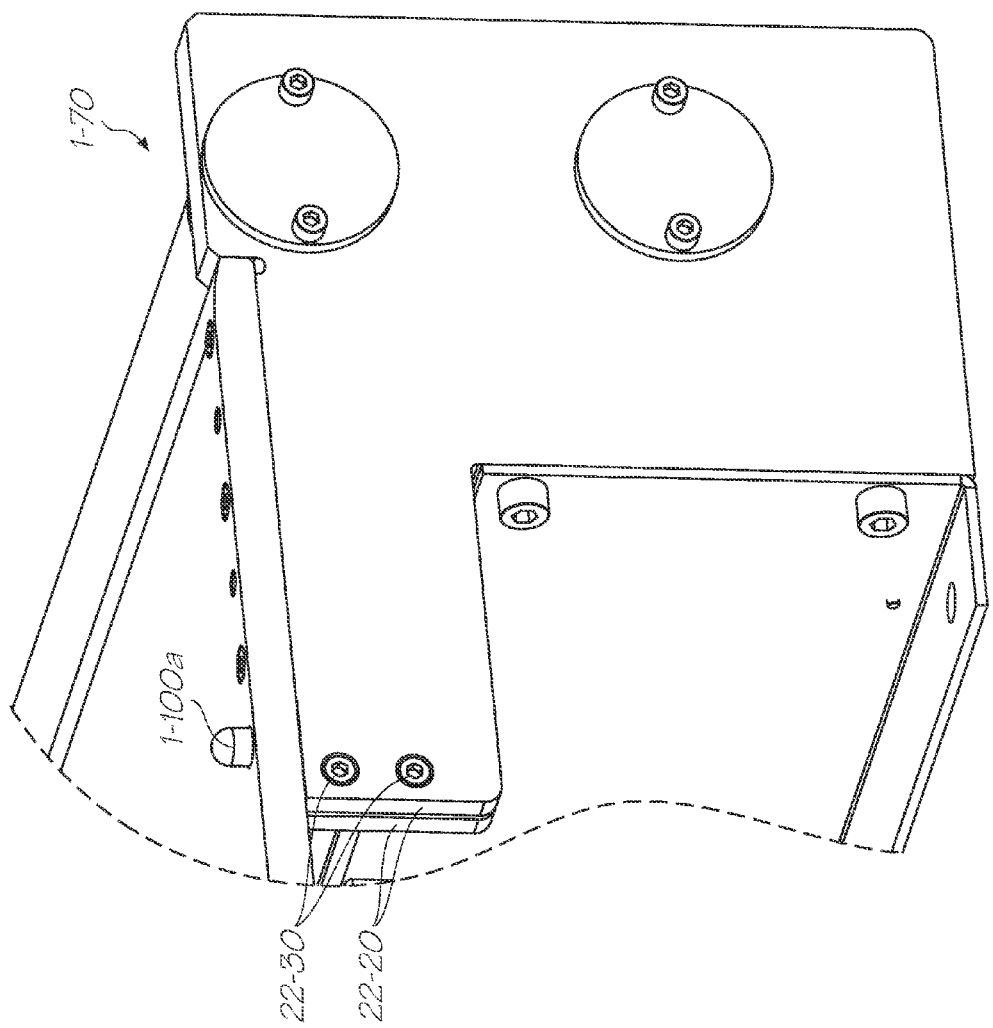
Figure 24:
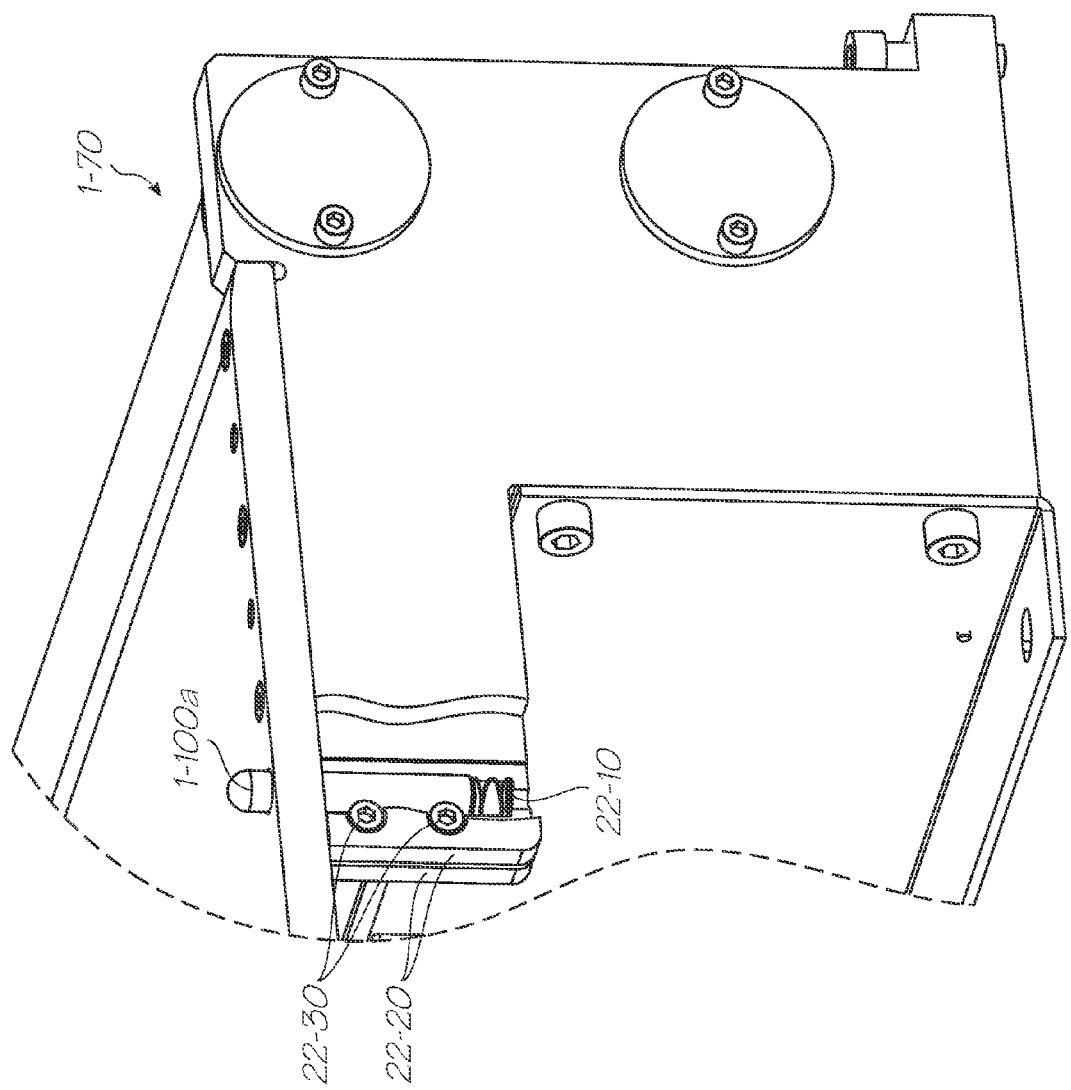

FIGS. 22 to 24 illustrate a platen 1-70 according to a fourth embodiment of the present invention. The platen 1-70 of the fourth embodiment utilizes springs 22-10 (see FIG. 24) to bias positioning pins 1-100a, 1-100b, 1-100c, 1-100d upwards, and utilizes clamping plates 22-20 and clamping screws 22-30 to clamp the positioning pins 1-100a, 1-100b, 1-100c, 1-100d at a suitable height.

The use of independent spring biased positioning pins 1-100a, 1-100b, 1-100c, 1-100d at each corner of the platen 1-70 allows the height of each positioning pin 1-100a, 1-100b, 1-100c, 1-100d to be adjusted independently of the other positioning pins. The balance and spacing of the print head chassis 1-10 from the platen 1-70 can therefore be flexibly adjusted to account for manufacturing tolerances, environmental factors, and the like to achieve an ideal spacing.

Moreover, the clamp and spring arrangement of each positioning pin 1-100a, 1-100b, 1-100c, 1-100d of the fourth embodiment is mechanically simpler than the cammed system of the first embodiment, involving less mechanical parts and movement and greater flexibility.

A desired height for each positioning pin 1-100a, 1-100b, 1-100c, 1-100d is obtained by allowing each spring 22-10 to bias a respective positioning pin 1-100a, 1-100b, 1-100c, 1-100d upwards to the desired height, and then clamping the clamping plates 22-20 against the positioning pin 1-100a, 1-100b, 1-100c, 1-100d to lock the positioning pin 1-100a, 1-100b, 1-100c, 1-100d in place at the desired height.

Fifth Embodiment

Figure 25:
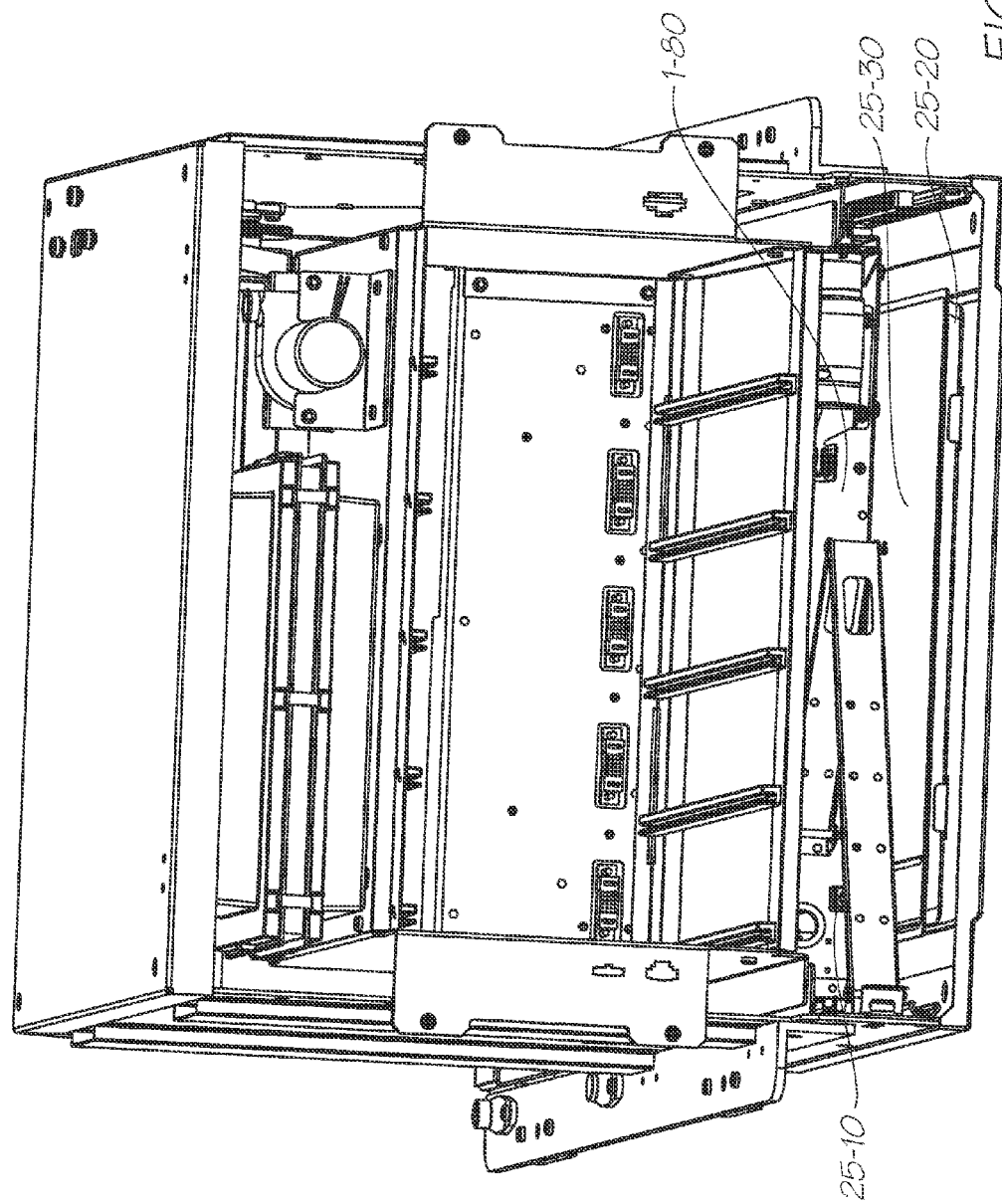
FIGS. 25 and 26 illustrate a waste ink drainage system according to a fifth embodiment of the disclosed invention
Figure 26:
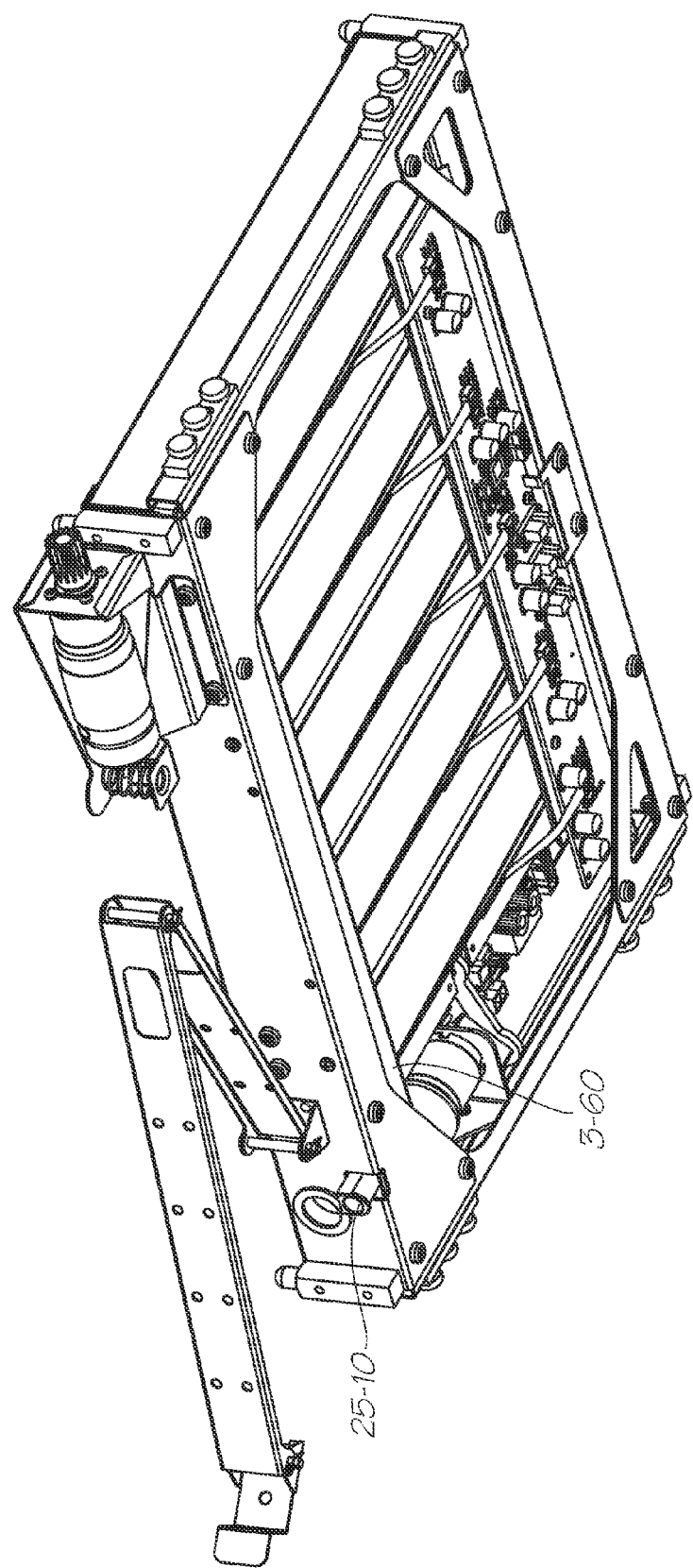

FIGS. 25 and 26 illustrates an ink drainage system of the printing system 1-1000 according to a fifth embodiment of the present invention. According to the fifth embodiment, the ink collection channel 3-60 (see FIG. 4C) of the maintenance chassis 1-80 is provided with a drainage port 25-10. Further, the waste ink tank 6-30 of the first embodiment is replaced with a flat waste ink tray 25-20 provided on a base of the printing system 1-1000. The flat waste ink tray 25-20 is lined with an absorbent material 25-30 to capture the waste ink.

The flat waste ink tray 25-20 is sized to ensure that regardless of the positioning of the maintenance chassis 1-80 (for example, whether the printing system is in the printing position, transition position, or maintenance position), the flat waste ink tray 25-20 captures ink from the drainage port 25-10.

In using a flat waste ink tray 25-20, the printing system 1-1000 is made shorter in height, and more important, has no components which extend below the print head tiles 12-10 of the print head cartridges 1-20a, 1-20b, 1-20c, 1-20d, 1-20e. That is, the print head tiles 12-10 from which ink is ejected are effectively the lowest, or equal lowest, point of the printing system 1-1000 and are closest, or equal closest, to the platen 1-70, in contrast with the embodiment illustrated in FIG. 6, for example, where the waste ink tank 6-30 is substantially below a surface of the platen 1-70.

The above arrangement and utilization of the flat waste ink tray 25-20 allows the printing system 1-1000 to be entirely supported/suspended above the platen 1-70 and used with print media of a platen that is wider than the printing system 1-1000 itself (as described in the third embodiment). This is in contrast to the printing system illustrated in FIG. 6, where it is clear that a platen that were to extend further in the negative Z-direction (as defined by the axis in FIG. 1A) would not be usable with the printing system as such a platen would be blocked and interfered with by the waste ink tank 6-30.

It would be understood that the printing system 1-1000 of the first embodiment, in having a waste ink tank and other components that are substantially lower than the print head chassis 1-10 in the printing position, prevents the printing system 1-1000 from being entirely suspended above the platen 1-70, and hence prevent the printing system 1-1000 from being used with multiple printing systems 1-1000 side-by-side to print on print media wider than the printing system 1-1000.

In contrast, the printing system 1-1000 of the fifth embodiment has no component protruding beyond the print head tiles 12-10 towards the platen 1-70, and may therefore be positioned in any location/position above a platen of any size.

The flat waste ink tank 25-20 is sized to preferably match a footprint of the maintenance chassis 1-80. At a minimum, the flat waste ink tray 25-20 is sized and shaped so as to have a portion thereof always under the drainage port 25-10, regardless of the position the maintenance chassis 1-80 is currently in (e.g. storage position, operational position, or in between a storage and operational position). The size and shape of the flat waste ink tray 25-20 must therefore cover at least a locus of movement of the drainage port 25-10 as the maintenance chassis 1-80 moves between the operational and storage port.

Mechanical Operation

An exemplary operation of the printing system 1-1000 is described with reference to FIGS. 1A to 1C.

Referring first to FIG. 1C, the printing system 1-1000 is illustrated in the maintenance position.

In the maintenance position, the print head chassis 1-10 is supported on the maintenance chassis 1-80. Specifically, the pins 3-50a, 3-50b, 3-50c, 3-50d located at the four corners on the top of the maintenance chassis 1-80 support the location bush 2-100a, the slotted location bush 2-100b, and flat pin bushes 2-100c, 2-100d respectively. In this position, the print head cartridges 1-20a-e are engaged with either the cappers 3-25 or the cleaners 3-27 of the maintenance chassis 1-80.

When the printing system 1-1000 is inactive, the print head cartridges 1-20a-e are preferably engaged with the cappers 3-25 to prevent the print head cartridges 1-20a-e from drying out and collecting contaminants, and to generally prevent damage thereto. In order to disengage the print head cartridges 1-20*a-e* from the cappers 3-25 and to instead engage the print head cartridges 1-20*a-e* with the cleaners 3-27 (or vice versa), the print head chassis 1-10 is first lifted upwards in the Y-direction by the lift mechanism 1-60 to a height, for example, of that of the transition position illustrated in FIG. 1A. With the print head cartridges 1-20*a-e* disengage from the cappers 3-25, the sub-frame movement mechanism 3-40 translates the maintenance chassis sub-frame 3-10 in the X-direction, such that the cappers 3-25 are moved out of alignment with the print head cartridges 1-20*a-e* and the cleaners 3-27 are moved into alignment with the print head cartridges 1-20*a-e*. The print head chassis 1-10 is then lowered back onto the maintenance chassis 1-80 into the maintenance position illustrated in FIG. 1C.

As the print head chassis 1-10 is lowered onto the maintenance chassis 1-80, the location bush 2-100*a* on the front-right under-corner of the print head chassis 1-10 comes into contact with the pin 3-50*a* on a front-right upper-corner of the maintenance chassis 1-80. The circular-conical depression 9-20 of the location bush 2-100*a* receives the pin 3-50*a*, and in doing so aligns the front-right corner of the print head chassis 1-10 with respect to the maintenance chassis 1-80 along the X-axis and Z-axis.

Similarly, the slotted location bush 2-100*b* on the front-left under-corner of the print head chassis 1-10 comes into contact with the pin 3-50*b* on the front-left upper-corner of the maintenance chassis 1-80. The oval-conical depression 10-20 of the slotted location bush 2-100*b* receives the pin 3-50*b*, and in doing so aligns the front-left corner of the print head chassis 1-10 with respect to the maintenance chassis 1-80 along the Z-axis. The front-left corner of the print head chassis 1-10 is already aligned along the X-axis by virtue of the location bush 2-100*a* being fixed in the X-Z plane, and further by virtue of the fact that the print head chassis 1-10 is a rigid structure.

With the front-right and front-left corners of the print head chassis 1-10 aligned and fixed along the X and Z axes, the print head chassis 1-10 as a whole, in being a rigid structure, is aligned with the maintenance chassis 1-80. Flat bushes 2-100*c* and 2-100*d* at the rear-left and rear-right lower corners of the print head chassis 1-10 may be simply supported by pins 3-50*c* and 3-50*d* respectively of the print head maintenance chassis 1-80 without requiring location slots/depressions such as present in location bush 2-100*a* and slotted location bush 2-100*b*.

With the print head chassis 1-10 again supported by the maintenance chassis 1-80, but with the maintenance chassis 1-80 now having moved the maintenance chassis sub-frame 3-10 so as to move the cappers 3-25 out of alignment with the print head cartridges 1-20*a-e* and the cleaners 3-27 into alignment with the print head cartridges 1-20*a-e*, the print head cartridges 1-20*a-e* are positioned in contact with respective first rollers 3-29 of the cleaners 3-27, which first rollers 3-29 are made of the microfiber material for wiping across a print head of the print head cartridges 1-20*a-e*.

To transition the print head chassis 1-10 from the maintenance position to the printing position, the maintenance chassis 1-80 needs to be retracted into the printer main frame 1-50 and the print head chassis 1-10 accurately lowered and positioned with respect to the platen 1-70. Accordingly, the print head chassis 1-10 is first lifted by the lifting mechanism 1-60 to the transition position illustrated in FIG. 1A.

At the transition position, the print head chassis 1-10 is not supported by the maintenance chassis 1-80, and the print head cartridges 1-20*a-e* are disengage from the maintenance cradles 3-20*a-e*. The maintenance chassis 1-80 is hence free to be retracted back into the printer main frame 1-50, as shown in FIG. 1B.

With the maintenance chassis 1-80 retracted back into the printer main frame 1-50, the printer head chassis 1-10 is free to be lowered towards the platen 1-70. Accordingly, the lifting mechanism 1-60 lowers the print head chassis 1-10 towards the platen 1-70.

In the first embodiment of the printing system, as the print head chassis 1-10 approaches the platen 1-70, the location bush 2-100*a* on the front-right bottom corner of the print head chassis 1-10 comes into contact with the pin 1-100*a* on a front right corner of the platen 1-70. In a similar manner to that described above with regards to the alignment of the print head chassis 1-10 with the maintenance chassis 1-80, the print head chassis 1-10 is aligned to the platen 1-70 by the receipt of the pin 1-100*a* into the circular-conical depression 9-20 of the locating bush-200*a*. In this manner, the front-right corner of the print head chassis 1-10 is aligned with respect to the platen 1-70 along the X-axis and Z-axis.

Similarly, the slotted location bush 2-100*b* on the front-left bottom corner of the print head chassis 1-10 comes into contact with the pin 1-100*b* on the front-left upper corner of the platen 1-70. The oval-conical depression 10-20 of the slotted locating bush 2-100*b* receives the pin 1-100*b*, and in doing so aligns the front-left corner of the print head chassis 1-10 with respect to the platen 1-70 along the Z-axis. The front-left corner of the print head chassis 1-10 is already aligned along the X-axis by virtue of the location bush 2-100*a* being fixed in the X-Z plane, and further by virtue of the fact that the print head chassis 1-10 is a rigid structure.

With the front-right and front-left corners of the print head chassis 1-10 aligned and fixed along the X and Z axes, the print head chassis 1-10 as a whole, in being a rigid structure, is aligned with the platen 1-70. Flat bushes 2-100*c* and 2-100*d* at the rear-left and rear-right lower corners of the print head chassis 1-10 may be simply supported by pins 1-100*c* and 1-100*d* respectively of the platen 1-70 without need for locating slots/depressions such as those defined in locating bush 2-100*a* and slotted locating bush 2-100*b*.

The pins 1-100*a*, 1-100*b*, 1-100*c*, 1-100*d*, of the platen 1-70, and the pins 3-50*a*, 3-50*b*, 3-50*c*, 3-50*d*, of the maintenance chassis 1-80, and the location bush 2-100*a*, slotted location bush 2-100*b*, and flat bushes 2-100*c*, 2-100*d*, in all being fabricated from a rigid, hard and durable material such as, for example, steel, ensure that accurate positioning of the print head chassis 1-10 with respect to the maintenance chassis 1-80 and platen 1-70 is consistently, and repeatedly attained.

In particular, the spacing between the print head cartridges 1-20*a-e* and the platen 1-70 is consistently achieved despite repeated movement of the print head chassis 1-10 towards and away from the platen 1-70. Similarly, alignment of the print head cartridges 1-20*a-e* with respect to the maintenance cradles 3-20*a-e* is also consistently achieved despite repeated movement of the print head chassis 1-20 towards and away from the maintenance chassis 1-80, and movement of the maintenance chassis 1-80 to and from a retracted position within the printer main frame 1-50.

Moreover, the relative spacing between the print head cartridges 1-20*a-e* is kept consistent since the print head cartridges 1-20*a-e* are not moved with respect to each other. Rather, the print head cartridges 1-20*a-e* are moved as a unitary set by moving the print head chassis 1-10. The same applies to the maintenance cradles 3-20*a-e*, in being moved as a unitary set by moving the maintenance chassis 1-80 rather than individual cradles 3-20*a-e*.

Any loss of accuracy and consistency in the alignments of the print head chassis 1-10, maintenance chassis 1-80, and platen 1-70 with respect to each other is caused mainly by a wearing of the positioning pins 1-100a, 1-100b, 1-100c, 1-100d, 3-50a, 3-50b, 3-50c, 3-50d and bushes 2-100a, 2-100b, 2-100c, 2-100d. In view, however, that such components are fabricated from a hard, durable, and rigid material such as steel, and that the movements of the print head chassis 1-10 and maintenance chassis 1-80 with respect to each other and the platen 1-70 are performed in a relatively concise and gentle manner, the wearing of such components is not considered an issue over the lifetime of the printing system 1-1000.

The mechanical operation of the printing system 1-1000 according to the third embodiment, in which support arms 21-10a, 21-10b, 21-10c, 21-10d support the print head chassis 1-10 on gantries 21-30a, 21-30b instead of the print head chassis 1-10 being supported on the platen 1-70, is similar to that described above for the first embodiment.

In the third embodiment, the print head chassis 1-10 is lowered until the positioning pins 1-100a, 1-100b, 1-100c, 1-100d of each support arm 21-10a, 21-10b, 21-10c, 21-10d are received by the pin bushes 2-100a, 2-100b, 2-100c, 2-100d on the mounting frames 21-40a, 21-40b. The interaction of the positioning pins 1-100a, 1-100b, 1-100c, 1-100d with the pin bushes 2-100a, 2-100b, 2-100c, 2-100d is identical to that described above for the mechanical operation of the first embodiment. Additionally, pin height adjusters 21-20a, 21-20b, 21-20c, 21-20d may be manipulated as necessary to adjust the height of the print head chassis 1-10 from the platen 1-70 at each corner System Alignment In a printing system utilizing multiple, spaced-apart print heads, and in particular a printing system in which the multiple, spaced-apart print heads are required to eject ink drops in very close vicinity (and preferably directly on top) of a dot ejected by another print head, consistency of positioning between the various hardware components such as the platen, the print head cartridges, and between the print head cartridges themselves, is necessary to achieve high print quality.

The above described printing system 1-1000 provides for the movement of print head cartridges as necessary to effect maintenance, sealing, and operation of the print head cartridges whilst maintaining consistency of positioning between print head cartridges and between the print head cartridges and other components of the printing system such as the platen and print media. However, whilst the above described printing system 1-1000 is able to maintain the necessary alignments between various components despite repeated movement of the various components, the various components need to first be properly aligned.

The use of multiple, spaced-apart print heads which each print a single colour, however, introduces challenges to achieving proper alignment that single print head systems and systems utilizing a scanning-type print head do not encounter. The challenges of alignment are described in greater detail below.

The printing system 1-1000 of the present disclosure utilizes multiple print head cartridges 1-20a-e, each printing a single colour. Each print head cartridge 1-20a-e is separated from a neighbouring print head cartridge in the direction of print media propagations (i.e. X-axis in FIG. 1A) and by a distance that is significantly larger than a width of a nozzle or a dot pitch. This distance is measurable in centimeters, and in one embodiment, the print head cartridges 1-20a-e have a separation pitch of around 8 centimeters.

One print head cartridge 1-20, as shown in FIG. 12 and as previously described, comprises of a number of print head tiles arranged end to end to span the width of the print media. In FIG. 12, the print head cartridge 1-20 is exemplarily illustrated with 11 print head tiles 12-10 arranged end to end. Each print head tile has a number of logical rows 12-20 of nozzles. In FIG. 12, each print head tile 12-10 is exemplarily illustrated with 5 logical rows of nozzles. In contrast to a single print head cartridge (SPHC) system, all of the 5 logical rows of nozzles eject the same coloured ink. Each logical row of nozzles is separated into a pair of sub-rows 12-30, 12-40, one sub-row for printing even dots and the other sub-row for printing odd dots. Whilst FIG. 12 shows one logical row 12-20 as being comprised of two adjacent sub-rows 12-30, 12-40, a logical row may in fact be comprised of any even dot printing sub-row 12-30 and any odd dot printing sub-row 12-40, not necessarily adjacent to each other.

In the printing system 1-1000, a nozzle of one logical row of one print head tile has to eject a drop of ink in very close vicinity (and preferably on top) of a corresponding nozzle of a corresponding row of a corresponding print head tile of another print head cartridge that may be around 32 cm away.

Similar to systems employing a single, pagewidth print head cartridge (SPHC), a multiple print head cartridge (MPHC) system must ensure that the print head tiles making up each print head cartridge are in alignment with each other. However, in addition to the need to align each of print head tiles of one print head cartridge, there is further a need to align each print head cartridge with the other print head cartridges, and still further align each print head tile of one print head cartridge with the other print head tiles of the other print head cartridges that are in the same line up/downstream along a direction of print media propagation.

Moreover, it has been found that print media that is being propagated across the paper shifts and wobbles. In an SPHC system, this shifting and wobbling of the print media was not realized, or ignored, since a possible amount of aberrant print media movement from the time the print media passes under a first nozzle row to the time it passes under a last nozzle row is small, if not negligible. Similarly, in a scanning-type system, the swathes printed by each scan iteration are relatively small, and a possible amount of aberrant print media movement in the distance the print media is moved from a first swathe to the next is small, if not negligible. The positioning of the print media with respect to the print head cartridge in an SPHC system and a scanning-type system, from the perspective of the nozzles, can therefore be seen as relatively consistent.

In the printing system 1-1000 of the present disclosure, however, the shifting and wobbling of the print media become significant and require non-trivial compensation, since a first print head cartridge may be separated from the last print head cartridge by around 32 cm. The amount of possible aberrant print media movement as the print media is propagated a distance of 32 cm is quite significant.

A view of the print media as seen by a nozzle printing Cyan in a Cyan print head cartridge may be vastly different to a view of the print media seen by a nozzle printing Yellow in the Yellow print head cartridge, which could be around 32 centimeters away. A shifting/wobbling of the print media as the print media is fed along the platen, which conventionally can be ignored due to either the closeness of the different coloured nozzles (for an SPHC system) or the small distance the paper moves between printing of swathes (for a scanning-type system), can no longer be ignored.

To firstly address the issue of alignment between one print head tile of one print head cartridge and the other print head tiles of the other print head cartridges that are in the same line up/downstream along a direction of print media propagation, a 2-D Vernier calibration method is performed.

Figure 13:
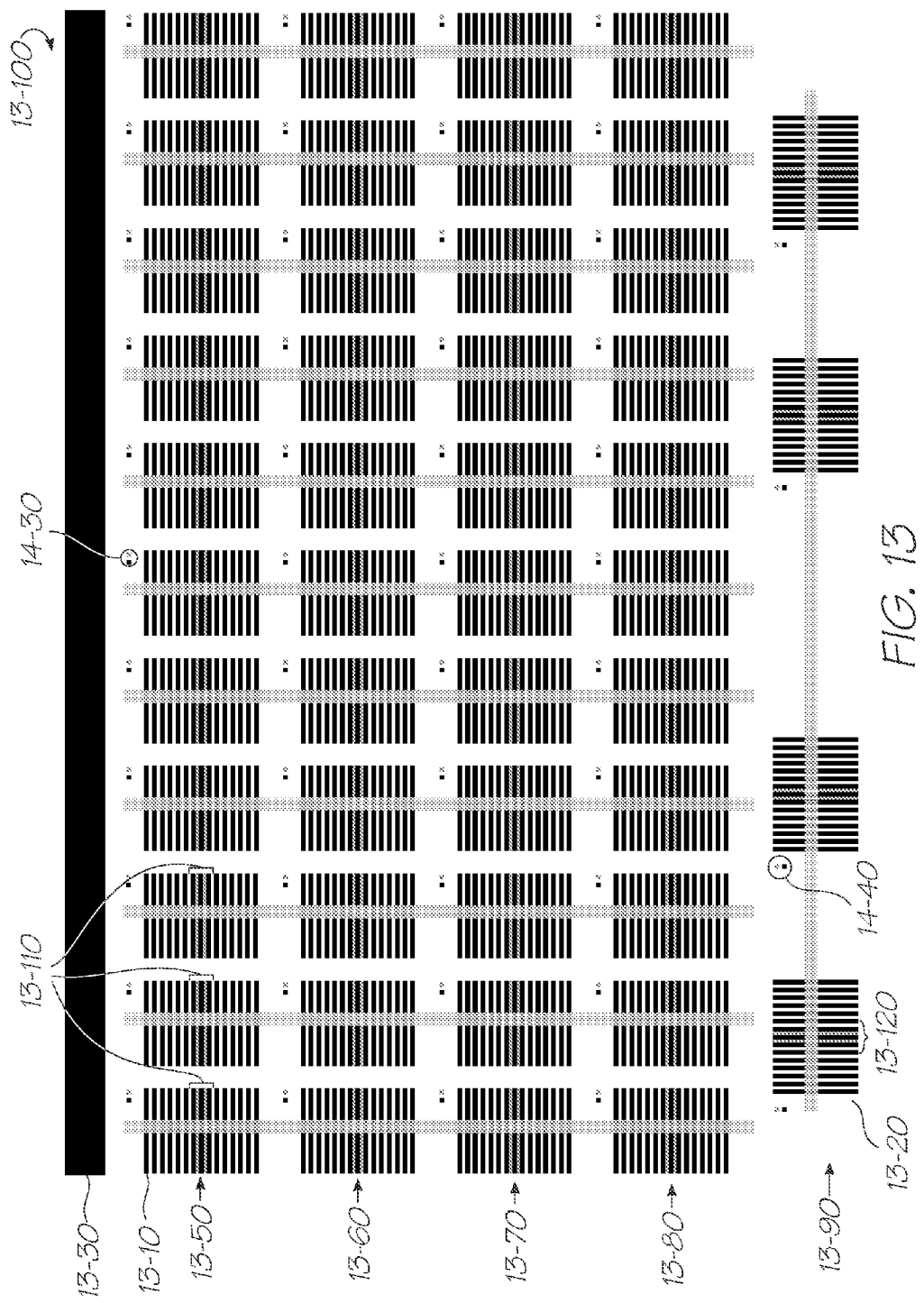
FIG. 13 illustrates a Vernier calibration map of the disclosed invention.

FIG. 13 illustrates a 2-D Vernier calibration map 13-100 according to on embodiment of the present disclosure. The 2-D Vernier calibration map 13-100 comprises rows 13-50, 13-60, 13-70, 13-80 of horizontally printed Vernier patterns 13-10 printed across the map. The 2-D Vernier calibration map 13-100 further includes a row 13-90 of vertically printed Vernier patterns 13-20 printed along the bottom of the map. A solid colour bar 13-30 may be printed at a top of the map to help ensure proper priming of the print head cartridges 1-20a-e.

Each horizontally printed Vernier pattern 13-10 comprises two overlapping patterns, one printed by a print head tile of a reference print head cartridge and the other printed by a print head tile of another (a comparison) print head cartridge. For purposes of the following description, the Black print head cartridge is used as the reference print head cartridge. It should be understood that any one of the print head cartridges 1-20a-e may alternatively be used as the reference print head cartridge.

The first row 13-50 of the Vernier calibration map 13-100 illustrates Vernier patterns 13-10 comprising of 11 patterns printed by the Black print head cartridge overlapped with 11 patterns printed by the Cyan print head cartridge. The number of Vernier patterns 13-10 printed in each row 13-50, 13-60, 13-70, 13-80 is not limited to 11, but preferably, at least one Vernier pattern is printed for each print head tile 12-10 making up a print head cartridge 1-20.

The position of a dense region 13-110 in each horizontally printed Vernier pattern 13-10 indicates a relative vertical misalignment between the print head tiles that were involve in the printing of a given scale. For example, if the Cyan print head cartridge is ideally exactly 8 cm from the reference Black print head cartridge, a 2-D Vernier calibration map 13-100 set up to measure this ideal will show a dense region 13-110 around the middle of each horizontally printed Vernier pattern 13-10 in the first row 13-50 if the Cyan print head tiles of the Cyan print head cartridge are indeed all exactly 8 cm away from the Black print head tiles of the reference Black print head cartridge.

If the first row 13-50 of the Vernier calibration map 13-100 shows a first horizontal Vernier pattern having a dense region 13-110 near a bottom of the scale, this would indicate that the left-most Cyan print head tile is further than 8 cm from a corresponding Black print head tile. If this dense region 13-110 gradually moves higher up the scale for each subsequent Vernier horizontally printed scale in the first row 13-50, it may indicate that the Cyan print head cartridge as a whole is diagonally skewed with respect to the Black print head cartridge. Other similar conclusions can be drawn from the positions of the dense regions 13-110 relative to other dense regions 13-110 in the Vernier calibration map 13-100. Included in such conclusions are recognizing when only one print head tile is misaligned, whereas the remaining print head tiles of a print head cartridge are otherwise sufficiently aligned, recognizing when an entire print head cartridge as a whole is misaligned, recognizing when a print head cartridge is structurally/mechanically bowed, and the like.

Analysis of the alignments of the other print head cartridges with respect to the reference print head cartridge is made by referring in identical fashion to the remaining rows 13-60, 13-70, 13-80 of the Vernier calibration map 13-100.

Figure 14:
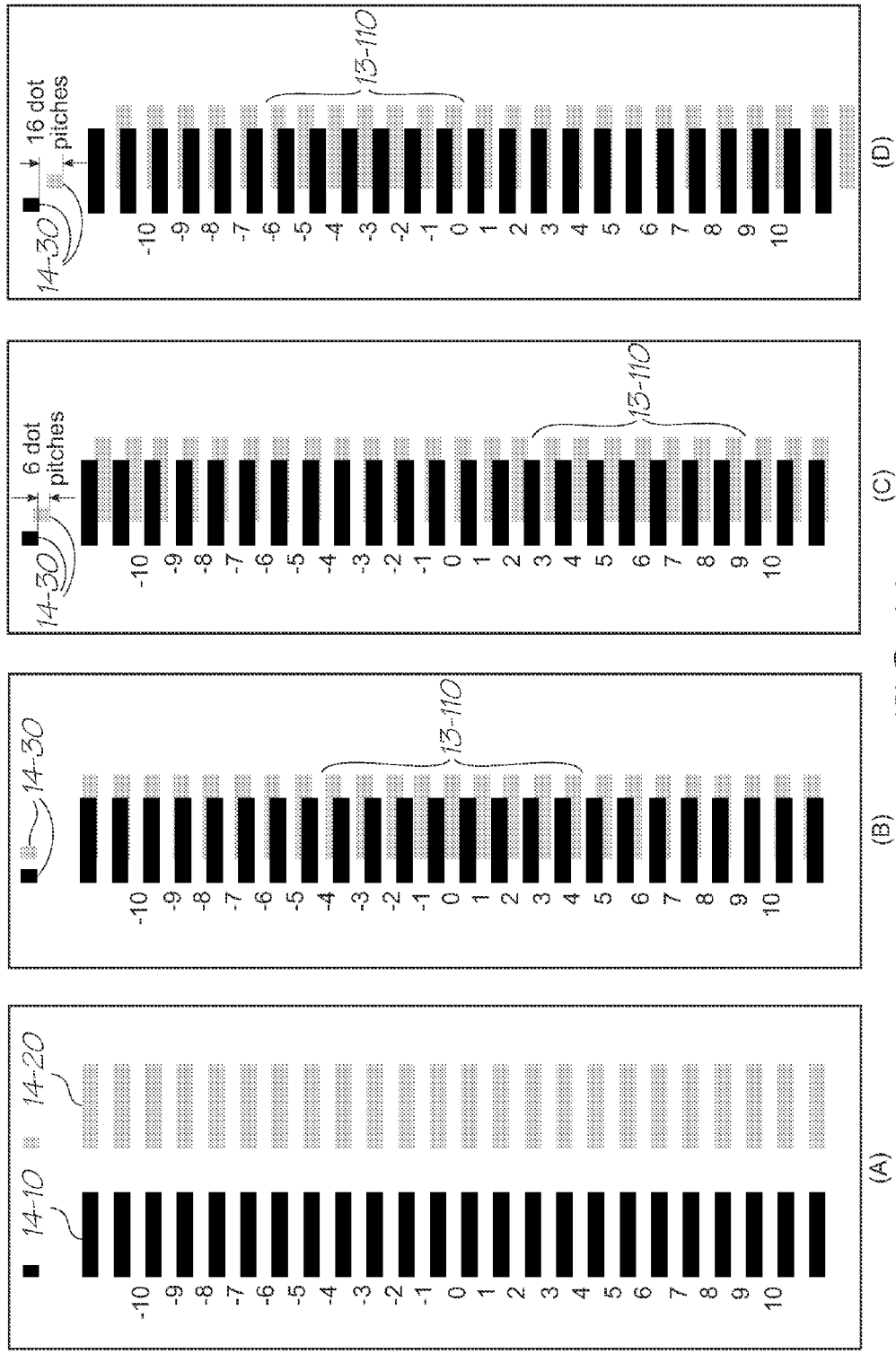
FIG. 14 illustrates a Vernier pattern.

FIG. 14 schematically illustrates in detail the components of each horizontally printed Vernier pattern 13-10. As shown in illustration (a) of FIG. 14, each horizontally printed Vernier pattern 13-10 is made up of a reference pattern 14-10 printed by the reference print head cartridge (shown as the pattern of dark/black lines) and a comparison pattern 14-20 printed by a comparison print head cartridge (shown as the pattern of lighter/grey lines).

Illustrations (b), (c) and (d) of FIG. 14 show the two patterns overlapping. For purposes of clarity, and ease of description, illustrations (b), (c), and (d) schematically show the reference pattern only partially overlapping the comparison pattern in a horizontal direction. In practice, both the reference and comparison patterns are fully overlapping such that the left and right edges of both patterns are aligned with each other, as shown in FIG. 13. The reference pattern is printed with a different vertical pitch from the comparison pattern, in accordance with the Vernier method. This produces an interference pattern as shown in illustrations (b), (c) and (d), which can be used to indicate the misalignment of the print head tiles that were involved in the printing of the pattern.

Illustration (b) illustrates a pattern where the comparison print head tile is accurately positioned with respect to the reference print head tile. If the Vernier calibration map 13-100 is set up for a system in which the print head cartridges are ideally multiples of 8 cm from the reference print head cartridge, then illustration (b) showing the dense portion 13-110 in the middle of the interference pattern indicates that the comparison print head tile that printed the grey pattern is ideally positioned.

Illustration (c) illustrates a pattern where the comparison print head tile is slightly lower or further than the ideal separation from the reference print head tile. In Illustration (c), the dense portion 13-110 is nearer to a bottom of the interference pattern.

Illustration (d), at first glance, illustrates a pattern suggesting that the comparison print head tile is higher or nearer than the ideal separation from the reference print head tile. However, coarse alignment squares 14-30 printed at the top of the pattern indicate that in actual fact, the comparison print head tile is very much lower or further than the ideal separation from the reference print head tile. Such an extreme separation causes the interference pattern to "wrap" around and appear at the top of the pattern.

By referring to the interference pattern formed for each row 13-50, 13-60, 13-70, 13-80 of the Vernier calibration map 13-100, an alignment along the direction of print media propagation (i.e. X-axis of FIG. 1A) of each print head tile of each print head cartridge with respect to a reference print head cartridge can be determined Any misalignments thus determined are accounted for, if necessary, by physically adjusting the positioning of a print head cartridge and/or manipulating the print data to be sent to the print head cartridge. In particular, the interference patterns shown by the Vernier horizontally printed scales 13-10 can be used to determine if a print head cartridge as a whole is misaligned with respect to the reference print head cartridge, or if it is just one print head tile of either the reference or comparison print head cartridge that is misaligned with everything else.

In this manner, the relative positions of each print head tile along a direction of print media propagation (i.e. X-axis of FIG. 1A) may be adjusted as necessary with respect to a corresponding reference print head tile.

The vertically printed Vernier pattern 13-20 is used for a similar purpose to that of the horizontally printed Vernier pattern 13-10. The vertically printed Vernier pattern 13-20 illustrates a horizontal (i.e. Z-axis of FIG. 1A) misalignment of one print head tile with respect to a corresponding print head tile of the reference print head cartridge.

Ideally, a print head tile of a comparison print head cartridge that is linearly upstream or downstream of a print head tile of the reference print head cartridge is exactly in line with a corresponding print head tile of the reference print head cartridge. That is, a first nozzle of a first print head tile of the comparison print head cartridge is ideally collinear with a first nozzle of a first print head tile of the reference print head tile, along a direction of print media propagation (i.e. X-axis of FIG. 1A).

It is unavoidable, however, that the print head tiles of the print head cartridges are not always so perfectly align, and are instead spaced away from the ideal line. If the X-axis indicates an imaginary line along which the first nozzle of the first print head tile of all print head cartridges should ideally be exactly positioned, and if this imaginary line is drawn from the top to bottom of this page, the nozzles of the print head cartridges are often found slightly left or right of this imaginary line.

The vertically printed Vernier pattern 13-20 is used to indicate misalignment in this direction. If a comparison print head tile is perfectly aligned with the reference print head tile, that is, if all nozzles of the comparison print head tile are perfectly collinear with corresponding nozzles of the reference print head tile along the X-axis, a dense region 13-120 is formed in the middle of the interference pattern of the vertically printed Vernier pattern 13-20. Variation of the comparison print head tile to the left or right (i.e. negative or positive Z-axis direction of FIG. 1A) relative to the reference print head tile will appear as a shift in the position of the dense region in the interference pattern of the vertically printed Vernier pattern 13-20. The vertically printed Vernier pattern 13-20 also includes coarse alignment squares 14-40 serving a similar purpose to the coarse alignment squares 14-30 of the horizontally printed Vernier pattern, but in a horizontal direction.

Apart from physically re-aligning print head cartridges, compensation for misalignment of print head tiles with corresponding reference print head tiles is also achieved by vertically and horizontally shifting dot data sent to the print head cartridges. Since the misalignment of one print head tile with the reference print head tile does not generally change over time so long as the same print head cartridges are being used, compensation for this misalignment may be performed as a once-off or infrequent event. The amount of compensation needed for each print head cartridge can therefore be statically stored in a memory of a respective print head controller module. A method of shifting dot data to compensate for misalignment of print head tiles is described in detail later below.

Recalibration of the print head cartridges is preferably performed anytime one or more of the print head cartridges is replaced. Print head cartridges may be replaced as a result of wear and tear, maintaining a certain print quality, changing ink 'colours', and so forth.

As mentioned above, in a printing system comprising multiple print head cartridges, and where the print head cartridges are spaced apart from each other by a relatively great distance (e.g. a distance far greater than a nozzle width or dot pitch, and a distance measurable in one or more whole units of centimeters) along a direction of print media propagation, the view of the print media as seen by each print head cartridge at any given instant may be quite different from one print head cartridge to the next due to a shifting and wobbling of the print media as it is propagated across the platen.

To address the issue of misalignment caused by a shifting/wobbling of the print media as the print media propagates past the print head cartridges 1-20*a-e*, the printing system 1-1000 employs a vision system 15-1000 (see FIG. 15) to track the shifting/wobbling of the print media.

Figure 15:
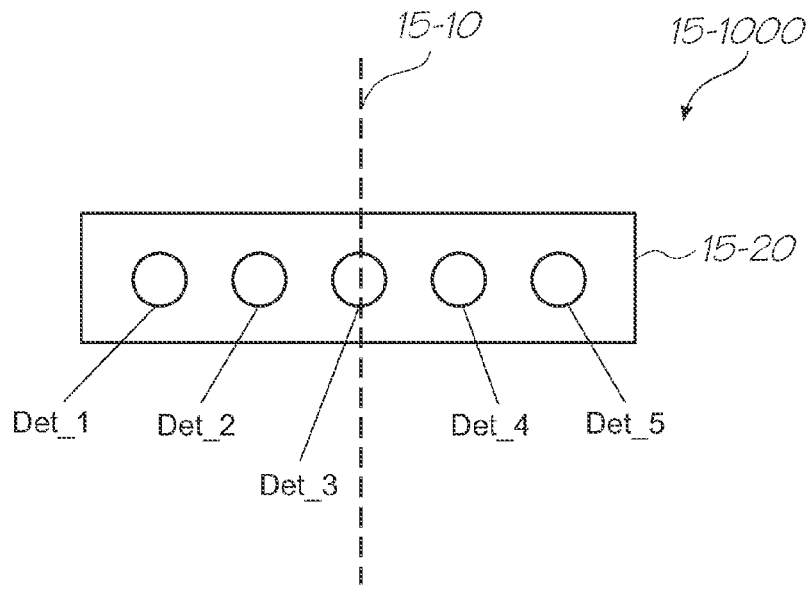
FIG. 15 is a schematic diagram of a reference line sensor.

In one embodiment, as illustrated in FIG. 15, the first print head cartridge 1-20*a* prints a reference line of dots 15-10 along an edge of the print media, parallel to a direction of print media propagation. A sensor 15-20 is provided near each of the downstream print head cartridges 1-20*b*, 1-20*c*, 1-20*d*, 1-20*e* for detecting this reference line of dots 15-10. The sensor includes a series of detectors Det_1, Det_2, Det_3, Det_4, Det_5 positioned perpendicularly to the reference line of dots printed by the first print head cartridge 1-20*a*. The shifting/wobbling of the print media is determined by determining which detector of the series of detectors Det_1, Det_2, Det_3, Det_4, Det_5 detects the reference line of dots 15-10.

For example, assume the sensor 15-20 provided with the five detectors Det_1, Det_2, Det_3, Det_4, Det_5 positioned in single file perpendicular to the reference line 15-10 of dots printed by the first print head cartridge detects the reference line of dots 15-10 at detector Det_3. This would indicate that the print media has not shifted/wobbled from the time it past under the first print head cartridge to its present position under the sensor. Or alternatively, it would indicate that the print media has shifted/wobbled back to the same position as it had when passing under the first print head cartridge. If this sensor were the sensor attached to the second print head cartridge 1-20*b*, then no compensation is necessary for the print data and firing sequence of the second print head cartridge.

Assume next that the sensor 15-20 attached to the third print head cartridge detects the reference line of dots 15-10 printed by the first print head cartridge via detector Det_1. This would indicate that the print media has shifted/wobbled in the Z-direction, using the axes defined in FIG. 1A. Accordingly, the print data supplied to the third print head cartridge needs to be shifted in the Z-direction to compensate for this shifting/wobbling of the print media.

In the above manner, a dynamic compensation is achieved allowing for the multiple, spaced-apart print head cartridges 1-20*a-e* to accurately eject dots on top (or in very close vicinity) of previously ejected dots to achieve proper alignment of each monochrome image.

The reference line of dots 15-10 printed by the first print head 1-20*a* is preferably invisible to human detection. For example, the reference line 15-10 of dots is preferably printed using infrared ink, and the sensor 15-20 comprised of infrared detectors.

In another embodiment, the edge of the print media is detected and used as a reference line. The edge of the print media is used in a similar manner to that of the above embodiment to allow the subsequent, downstream print head cartridges to compensate for the shifting/wobbling of the print media. In this embodiment, each of the print head cartridges 1-20*a-e* is provided with a sensor for detecting the edge of the print media. The first print head cartridge 1-20*a* detects the position of the edge of the print media and communicates this position to the subsequent, downstream print head cartridges. The subsequent, downstream print head cartridges 1-20*b*, 1-20*c*, 1-20*d*, 1-20*e* each detect the position of the edge of the print media as the print media passes respectively under each print head cartridge, and compares the detected position with the position detected by the first print head cartridge when that portion of the print media passed under the first print head cartridge.

The subsequent print head cartridges shift print data as necessary to compensate for any difference in the detected edge of the print media compared to the edge detected by the first print head cartridge.

A benefit of detecting the edge of the print media compared to printing a reference line is that in detecting the edge of the print media, each print head cartridge is able to perform compensation on its own print data relative to the absolute edge of the print media, to account for any shifting/wobbling of the print media. In contrast, the compensation method using a reference line printed by the first print head cartridge assumes that the first print head cartridge is consistently aligned with respect to the print media. In a case where this assumption is wrong, the image printed by print head cartridges 1-20*a-e* will still be aligned respective to each other, but may not necessarily be aligned to the print media itself. For example, a clear, high definition image will be printed, but which image may wobble or be skewed relative to the print media. A system in which the edge of the print media is detected requires, however, the use of high quality print media which has a consistent edge.

Alternatively, a hybrid dynamic compensation system may be employed, in which a combination of detecting the edge of the print media and printing of a reference line is used. The hybrid dynamic compensation system utilizes a print media edge detecting vision system for the print head cartridge printing the reference line, and utilizes the reference line vision detecting system as described above for the remaining print head cartridges.

Print Data Preparation and Misalignment Compensation

With reference to FIGS. 16A to 16D, a process by which a colour image is prepared for printing by a computer system is described.

Figure 16A:
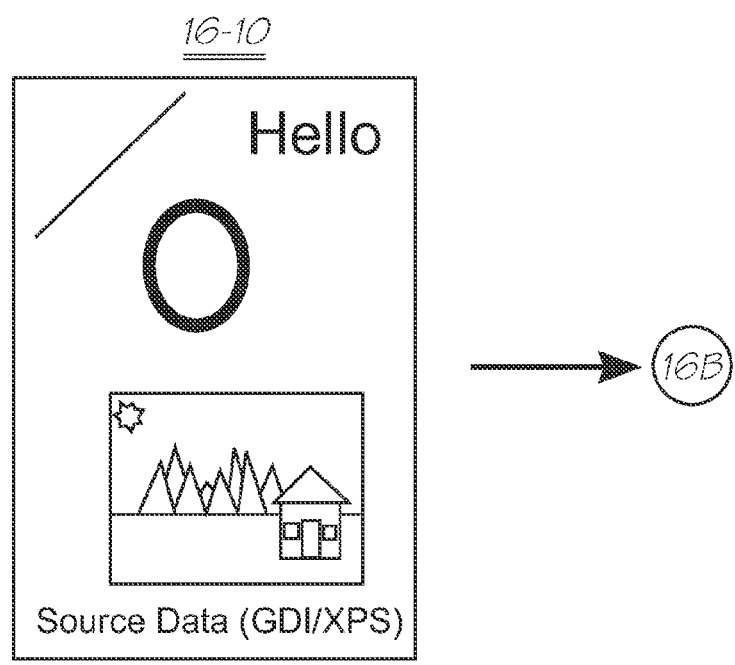
FIGS. 16A-16D are a flow chart illustrating a process for preparing an image for printing by the printing system of the disclosed invention.

At step 16-10 illustrated in FIG. 16A, a colour image is firstly provided to a computer system. The colour image may, for example, be in an XPS or GDI page description language, as is common when working with Microsoft™ applications.

Figure 16B:
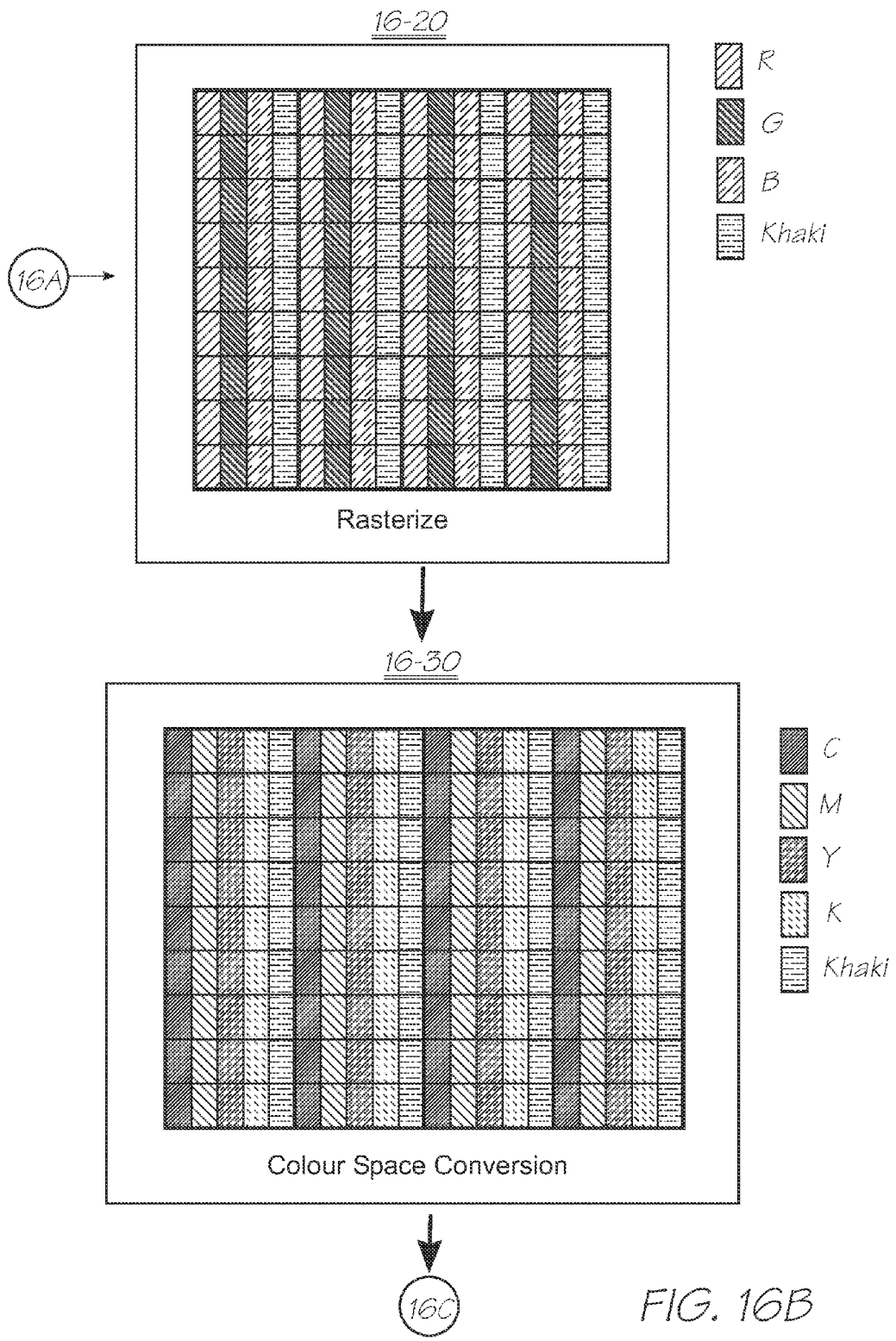

At step 16-20 illustrated in FIG. 16B, the colour image is rasterized by the computer system to obtain a bitmap of colour pixels. The bitmap describes the colour of each pixel in an image colour space, such as for example RGB, sRGB, and the like. The colour of each pixel is represented as a combination of a set of base colours in certain proportions, for examples 25% red, 32% green, 76% blue. The bitmap specifically illustrated at step 16-20 describes the source image in R, G, B and a spot colour. For purposes of description, the spot colour is exemplarily taken to be Khaki.

At step 16-30, the image colour space is converted to a printing colour space for printing. The output of this step produces a bitmap where each pixel is described by a number of values. Each value corresponds to an ink 'colour' or type that the printing system 1-1000 prints. For example, if the printing system 1-1000 has been set up such that the 5 print head cartridges respectively print Cyan, Magenta, Yellow, Black, and Spot-Khaki, the bitmap produced in 16-30 is in the 22-M-Y-K-SpKH colour space and represents each pixel as an intensity of each of these colours, with the exception of Spot-Khaki. Spot colours, which are used to print specific colours without combining inks, are binary in representation and are either printed at a given location, or not.

As another example, the printing system 1-1000 may be set up to print Spot-Khaki, Spot-Blue, and Spot-Pink, with the 2 remaining print head cartridges unused. In this case step 16-30 converts the colour bitmap generated in step 16-20 into a SpKH-SpBL-SpPK colour space. Accordingly, the actual colour space of the printing colour space depends on the setup of the printing system 1-1000 at any given time. It should be readily understood that the printing system 1-1000 is not limited only to the colours and printing colour spaces described above, but may be set up to print any combination of colours as necessary.

For ease of description, it is assumed hereinbelow that the printing system 1-1000 has been set up to print Cyan, Magenta, Yellow, Black, and Spot-Khaki. The image colour space generated in step 16-20 is hence converted into a 22-M-Y-K-SpKH colour space as the printing colour space.

Figure 16C:
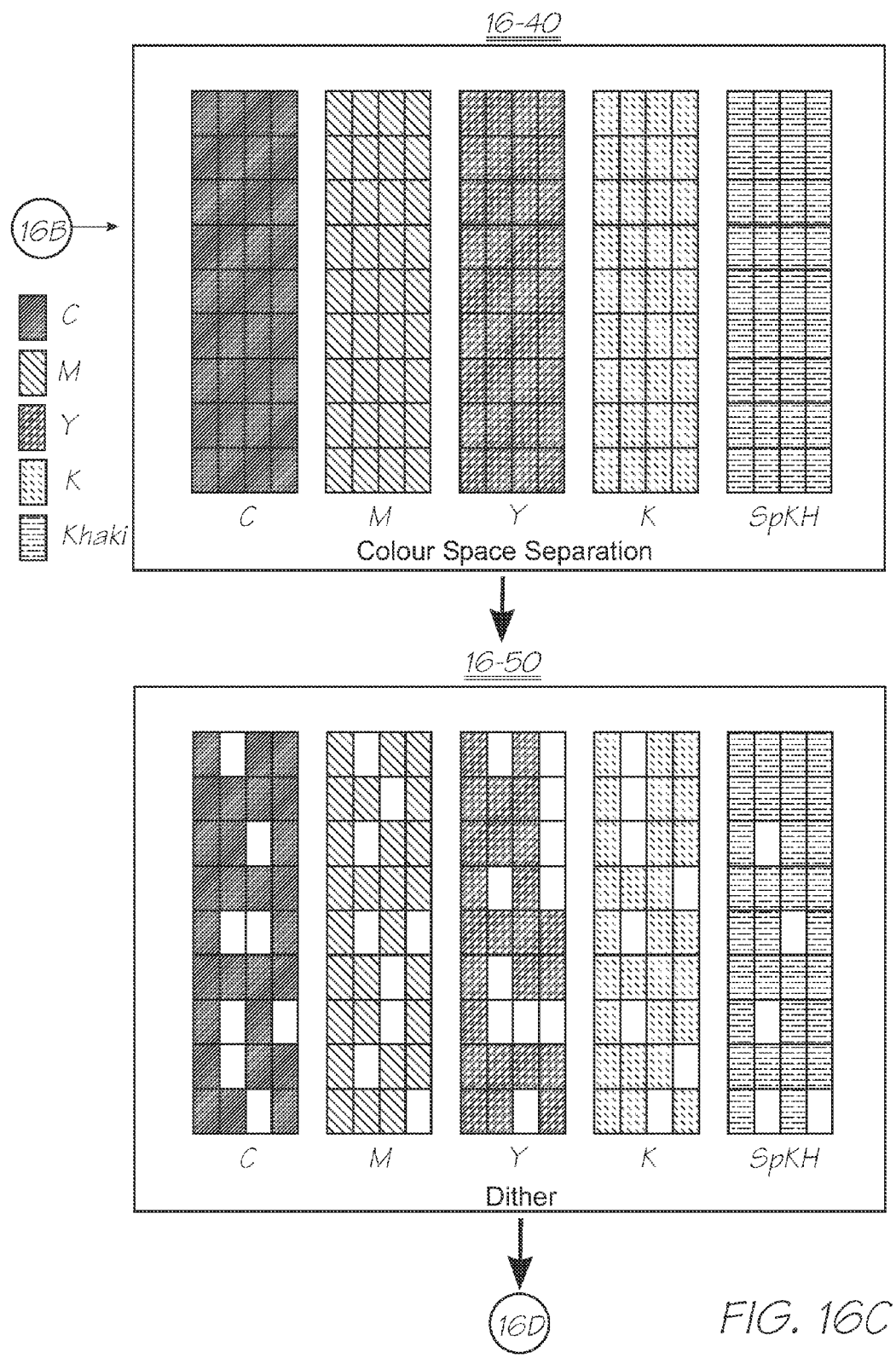

At step 16-40 illustrated in FIG. 16C, each of the colours of the 22-M-Y-K-SpKH colour space is separated into separate colour planes. Each colour plane represents the original colour image as a monochrome image containing only the colour of that plane.

At step 16-50, each monochrome image is dithered. This converts the monochrome image in which each pixel is represented by an intensity (or shade), to a binary image where each pixel is either on or off. The combination of on/off pixels in a small area approximates the intensity (or shade) of the original monochrome image. Additionally, the dithering of any given pixel in one monochrome image may be influenced by the corresponding pixels in the other monochrome images.

Figure 16D:
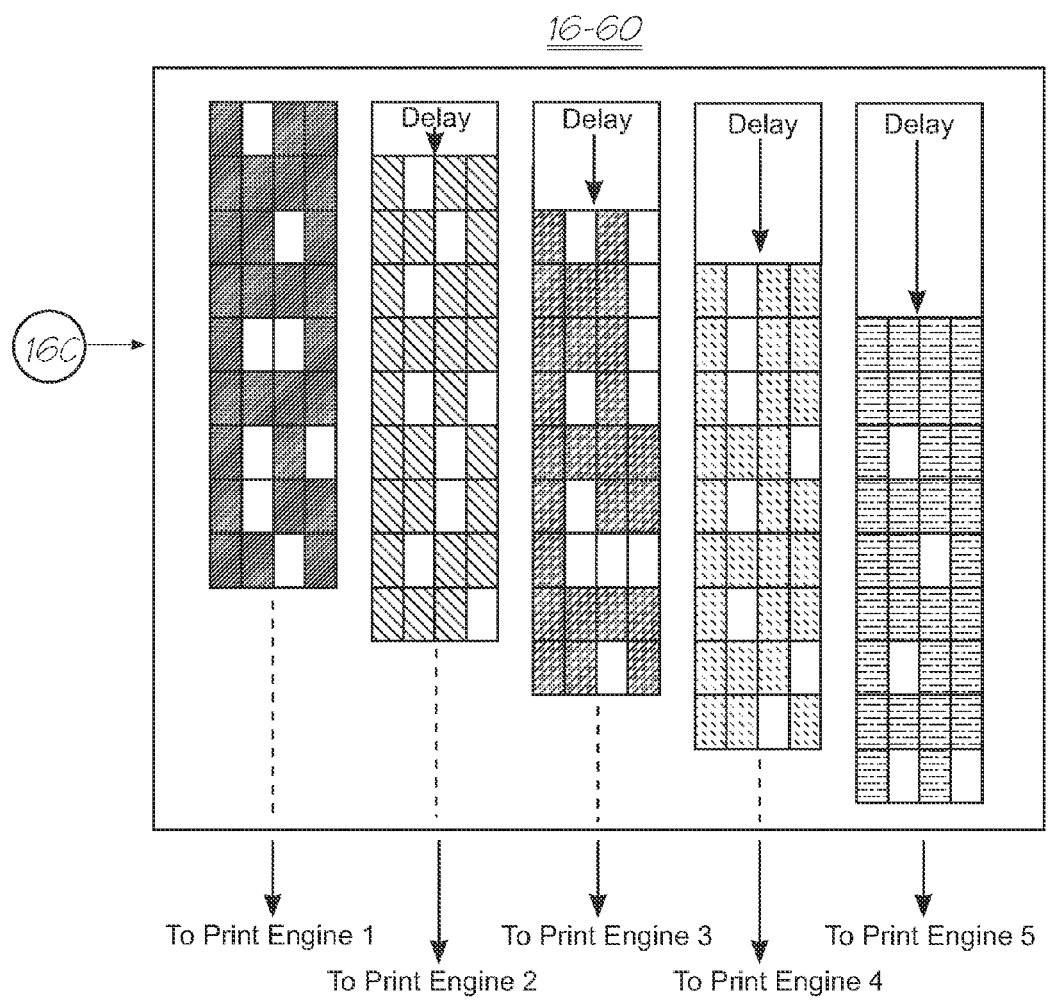

At step 16-60 illustrated in FIG. 16D, the dots of each monochrome dithered image are sent to the print engines of corresponding print head controller modules as dot data. The dot data may be compressed before being sent to the print engine. For example, the dots of the Cyan dithered image may be sent to the first print head controller module 1-25*a*, the dots of the Magenta dithered image sent to the second print head controller module 1-25*b*, and so forth. FIG. 16D also schematically illustrates a delay added to some dithered images to account for the fact that the print heads are space apart along a length of the print media and hence should commence printing at different times.

Figure 17A:
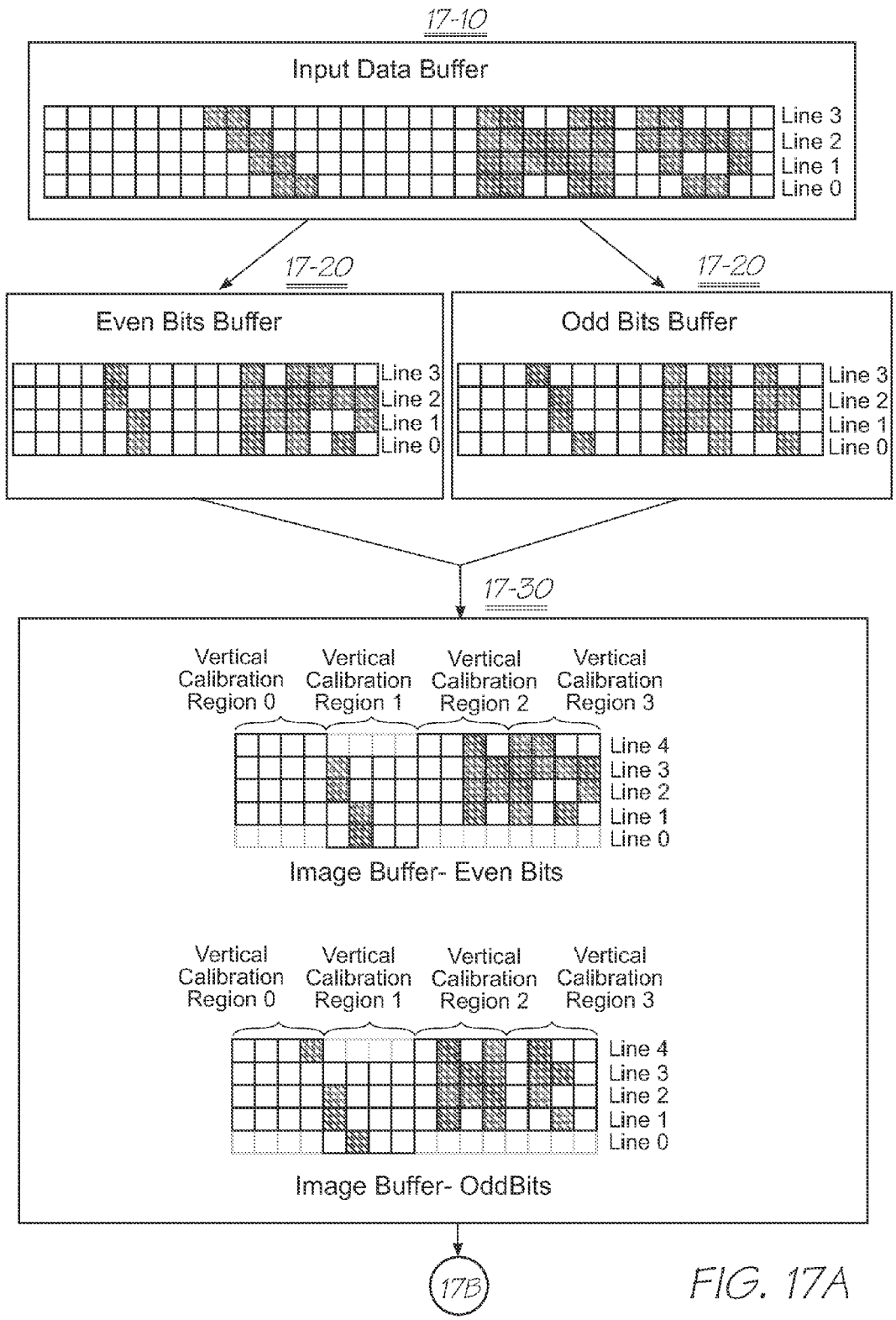
FIGS. 17A and 17B are a flow chart illustrating a process for preparing dot data for a print head cartridge of the disclosed invention.
Figure 17B:
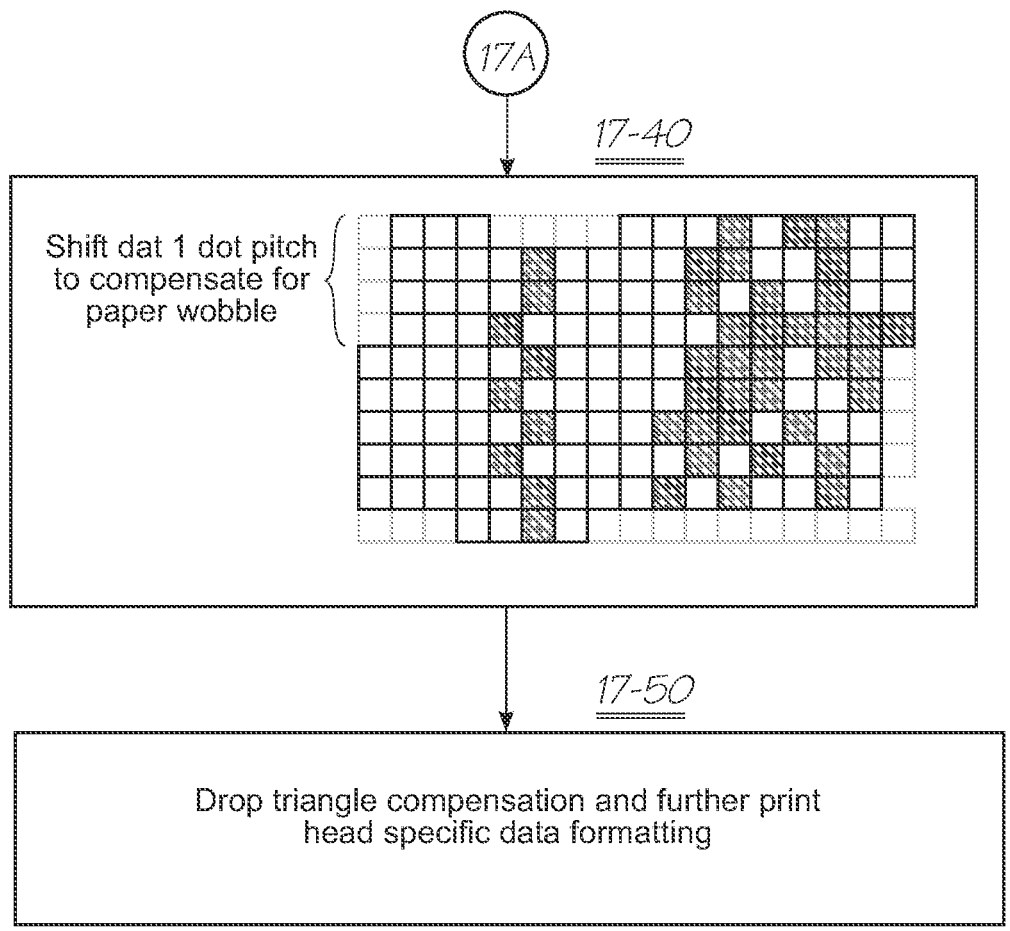

FIGS. 17A and 17B illustrate the processing of the dot data sent to each print head controller module 1-25*a-e* from the computer system in step 16-60. Each print head controller module 1-25*a-e* includes a print engine for further processing the dot data.

At step 17-10, the dot data generated at step 16-60 for a monochrome dithered image is received in an input data buffer of a print engine of a corresponding print head controller module 1-25*a-e*. The dot data is received and decompressed if necessary, then placed in the input data buffer. Data from the input buffer is then separated into even dots corresponding to dots to be ejected from even numbered nozzles, and odd dots corresponding to dots to be ejected from odd numbered nozzles (step 17-20). The even dots are received in an even bits buffer, and the odd dots are received in an odd bits buffer. Each buffer hence holds half lines of data (i.e. all even bits of a line, or all odd bits of a line).

At step 17-30, vertical calibration is performed on the data in the even bits buffer and the odd bits buffer. Data in each buffer is logically grouped into vertical calibration regions. Each vertical calibration region may be shifted up or down to effect any necessary vertical compensation of the dot data. In FIG. 17A, vertical calibration region 1 in both the even bits buffer and odd bits buffer is shown being shifted down a line. The need to shift dot data in vertical calibration region 1 down a line may be to, for example, compensate for a vertical misalignment of a particular print head tile.

At step 17-40, illustrated in FIG. 17B, the dot data from both the even bits buffer and the odd bits buffer is combined into an output buffer. The dot data from the even bits buffer and the odd bits buffer are combined in an order to achieve an ordering of dots that takes into account compensation for misalignment, the fact that not all nozzles of a print head cartridge are fired simultaneously (for heat and electrical load reasons, amongst others), and other timing and firing sequence issues.

The order of dots in the output buffer further takes into account that the first row of nozzles of a print head cartridge may be separated from the last row of nozzles by a significant number of dot pitches. In the printing system 1-1000, a first row of nozzles is separated by 44 dot pitches from the last row of nozzles. Accordingly, the first row may be printing data 44 lines ahead of the last row. The visual ordering of the dot data illustrated in the output buffer at step 17-40 is hence not readily comprehensible to humans.

Further at step 17-40, horizontal compensation of the dot data to account for paper wobble, and misalignments between print head cartridges is also performed. As illustrated in FIG. 17B, a number of rows are exemplarily shifted horizontally by 1 dot pitch to compensate for paper wobble detected by the sensors 15-1000, and the like.

At step 17-50, further compensation is applied to the dot data in the output buffer to account for specific physical arrangements of the print head cartridge, such as a drop triangle arrangement, and then the data is finally formatted into a format specific to the print head controller modules and print heads, so as to be understood, read out, and executed appropriately. Included within this formatting may be inclusions of non-ejection firing pulses to maintain the nozzles of print head tiles at certain temperatures, "keep wet" firing patterns, dead nozzle compensations, 8b10b encoding, interspersion of print commands and print data, and the like.

The above described processing of print data is suitable for a printing system employing print engines designed to work with monochrome pagewidth print head cartridges. However, as previously described, conventional page width print head cartridges used in colour printing systems are not monochrome. Instead, a single pagewidth print head cartridge prints all colours, not just one.

The following describes a modification to the above processing of print data that allows a multi-coloured pagewidth print head cartridge and corresponding multi-coloured print engine to operate in monochrome in a multiple print head cartridge colour printing system such as the printing system 1-1000. In this manner, existing multi-coloured page width print head cartridges and corresponding multi-coloured print engines maybe be used in the printing system 1-1000, thereby ameliorating the need to purchase new monochrome pagewidth print head cartridges and print engine, and accordingly saving costs.

A print engine that is originally designed to drive a multi-coloured print head cartridge receives pixel data for a number of colour planes, and generates dot data for each colour plane. The dot data for each colour plane is sent to a specific row of nozzles on the one print head cartridge, and the specific row of nozzles timed to fire such that the ink ejected by the specific row of nozzles lands on dots ejected by an upstream row of nozzles.

To cause a multi-coloured print engine and print head cartridge to instead operate in monochrome, and further, to eject ink such that each row of nozzles ejects ink to a new line on a print media rather than on top of a previously printed line, the monochrome pixel data sent to the print engine has to be disguised as if it comprised of a number of 'colour' planes, and the print media has to be made to propagate past the print head cartridge at a higher speed.

Figure 18A:
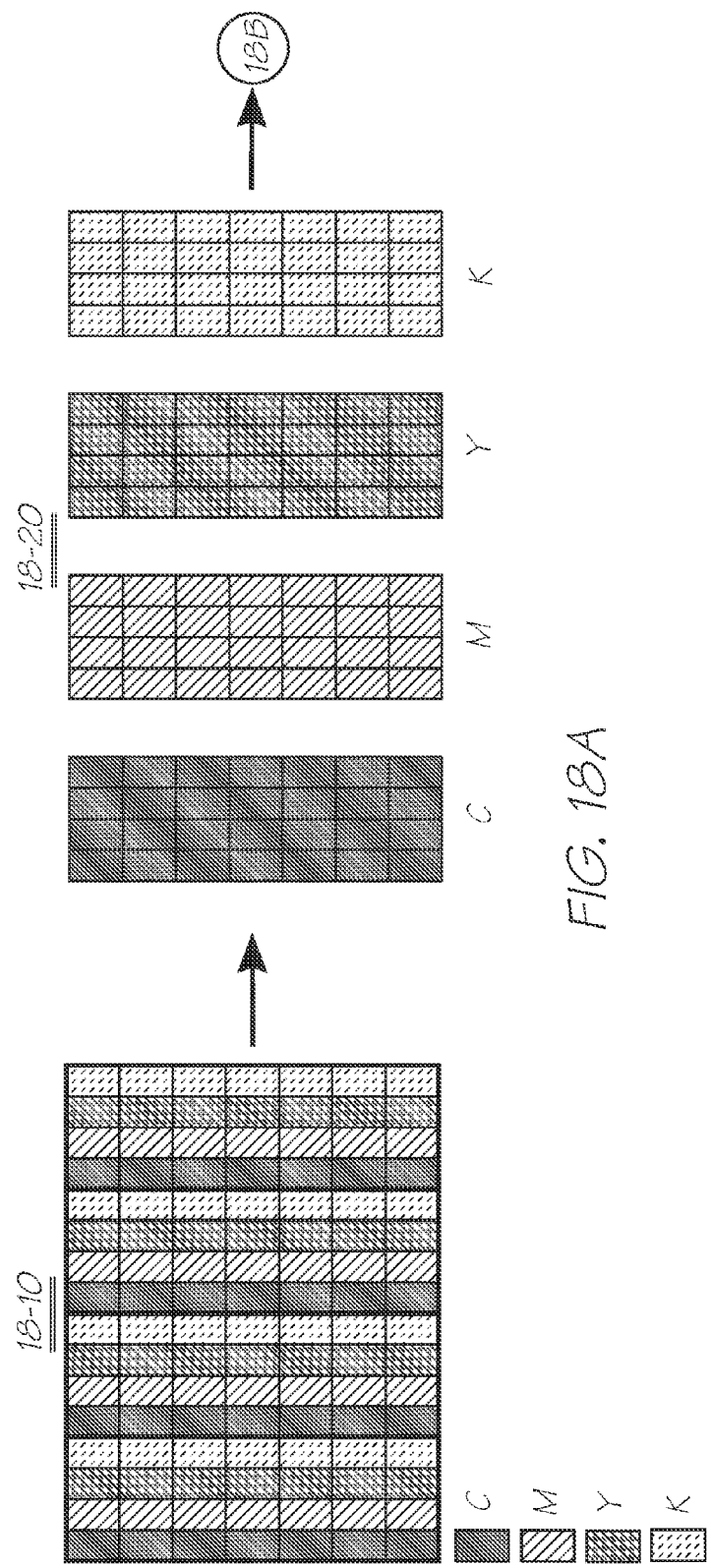
FIGS. 18A and 18B are a flow chart illustrating a process for generating fake colour images for printing by the printing system when multi-coloured print head cartridges instead of monochrome print head cartridges are employed.
Figure 18B:
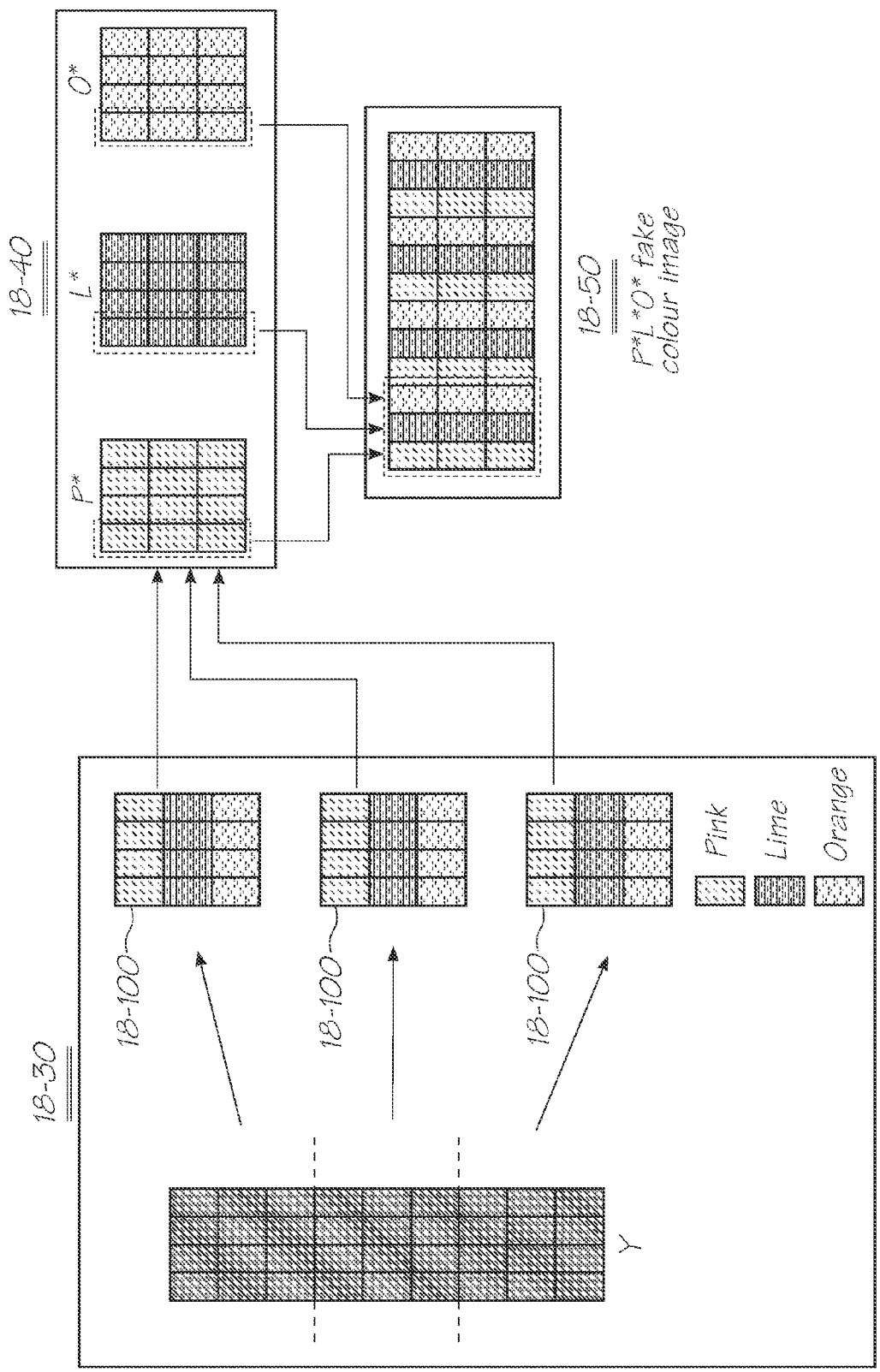

The above process is described with reference to FIGS. 18A, 18B and 19. At step 18-10, illustrated in FIG. 18A, image data representing a full colour source image is received by a computer system. For ease of description, the image data shown at step 18-10 has already been converted to a printing colour plane (e.g. CMYK). If the image data has not already been converted to a CMYK colour plane, the steps as described previously with regard to FIGS. 16A to 16D are executed to convert the image data to a CMYK colour plane.

At step 18-20, the image data is separated by the computer system into individual colour planes to obtain monochrome images of the original source image. The steps so far are similar to those of 16-10 to 16-40.

At step 18-30, each individual colour plane is treated as if it represented a multi-coloured image. For ease of description, the process is described below with respect to the yellow colour plane, but it should be understood that similar processes are performed for each of the other colour planes M, Y and K. The yellow colour plane is split into groups 18-100 of a number of vertical lines. In the embodiment illustrated by FIG. 18B, the yellow colour plane is split into groups 18-100 of 3 vertical lines each. Each line in a group is pretended to represent a different colour. For example, row 1 of each group may be considered as representing 'pink' data, row 2 as 'lime' data, and row 3 as 'orange data.

The number of vertical lines in a group determines (or depends on) the number of rows of nozzles that each print head cartridge uses (or needs). Here, each group contains 3 vertical lines and therefore 3 rows of nozzles will be used/needed. In the system of 1-1000, each print head cartridge has 5 rows of nozzles. Accordingly, 2 rows of nozzles will be unused and/or used for redundancy, for example, to compensate for dead nozzles in the other 3 rows or to increase the print density.

At step 18-40, the 'pink' lines (i.e. row 1) of each group 18-1000 are combined to form a 'pink' fake colour plane. Similarly, the 'lime' lines and the 'orange' lines of each group are combined to respectively form a 'lime' fake colour plane and an 'orange' fake colour plane. With the data of the Yellow colour plane now separated into three fake colour planes, the data from each of the three fake colour planes are combined and formatted to look like image data having 3 colour planes (step 18-50). This image data can be said to be in a P*L*O* colour space, that is a fake Pink, fake Lime, fake Orange colour space. It should be point out at this juncture that the image data in the P*L*O* colour space is still in actuality data that represents only the yellow colour plane of the original source image. The image data in the P*L*O* colour space is then sent to the multi-coloured print engine. The data may be compressed in some manner before being sent to the multi-coloured print engine.

Figure 19:
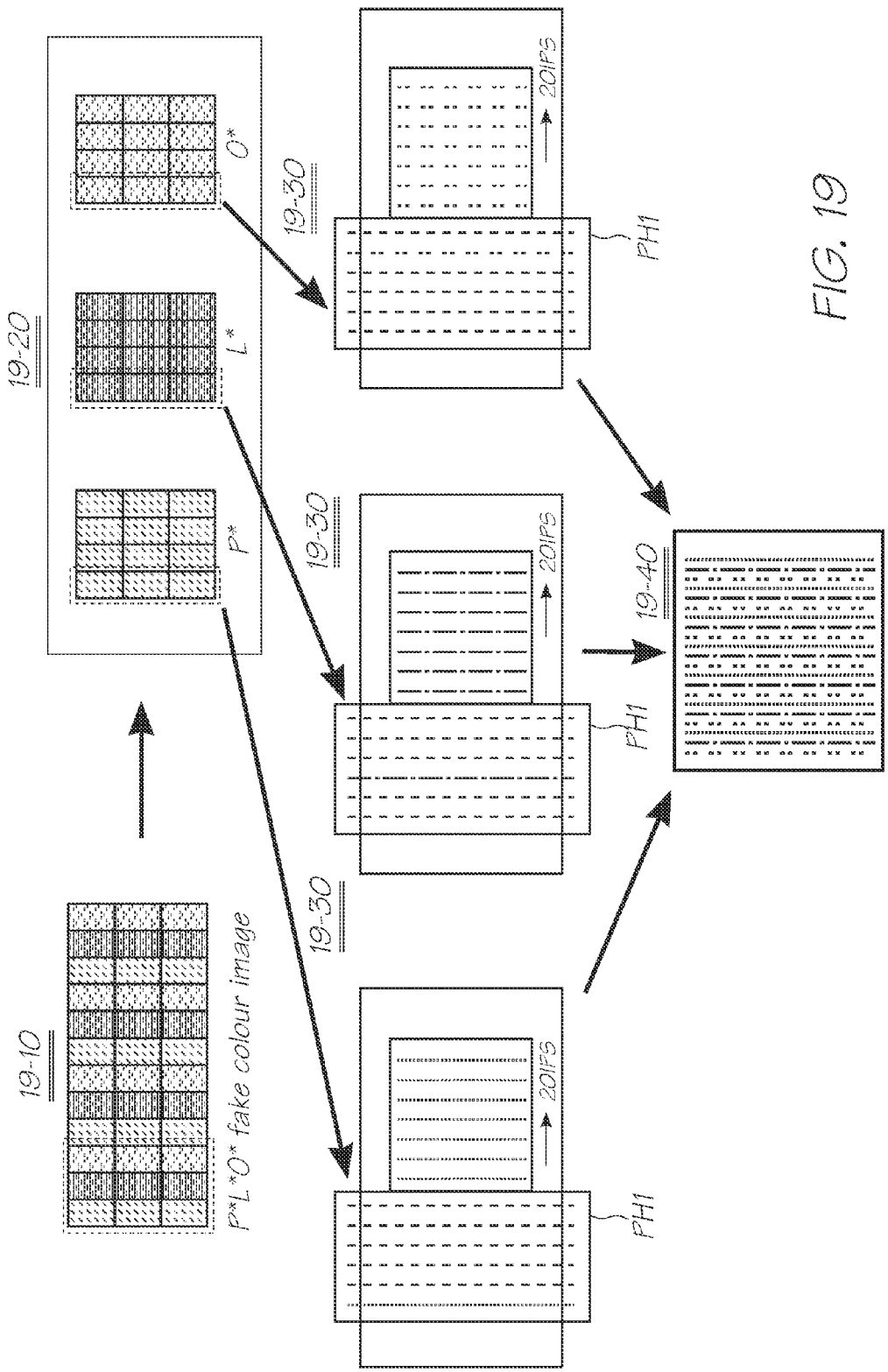
FIG. 19 is a flow chart illustrating a process for printing a fake colour image.

FIG. 19 illustrates the processing of the image data in the P*L*O* colour space by a multi-coloured print engine that is expecting multi-coloured data rather than monochrome data. At steps 19-10 and 19-20, the multi-coloured print engine decompresses the print data if necessary, then performs multi-coloured processing on the received P*L*O* colour space image. Namely, the P*L*O* colour space image is separated into a separate P* colour plane, L* colour plane, and O* colour plane. The data of the P* colour plane is then dithered and sent to, for example, row 1 of the multi-colour print head cartridge, while the data of the L* colour plane is dithered and sent to, for example, row 3, and the data of the O* colour plane is dithered and sent to, for example, row 5 (steps 19-30).

The above processes achieves the separation of a single colour plane of the original source image into a number of fake colour planes so as to fool a multi-coloured print engine and print head cartridge into treating a monochrome image as a multi-coloured image. In this manner, the monochrome image is printed by several rows of nozzles instead of one, as shown in step 19-40. However, a problem still exist in the fact that a multi-coloured print engine and print head cartridge is designed to fire each row of nozzles such that the dots ejected by each row of nozzles land over dots ejected by an upstream row of nozzles. If this is left unchanged, the monochrome Yellow image represented by the fake 'pink', fake 'lime' and fake 'orange' colour plane data will not be properly reproduced on the print media.

To have the multi-coloured print engine and print head cartridge ejects dots from different rows onto different lines of the print media, the speed of print media propagation past the print head cartridge is increased. The actual increase in print media propagation speed depends on the nozzle firing timing used by the multi-coloured print engine, but essentially causes each row of nozzle to "miss" its dot landing position by some amount determined, for example, through simulation/calculation. The simulation/calculation ensures that each row of nozzle is ejecting dots to within 0.5 dot pitch of their expected new landing position. In the example, of FIG. 19, the print media is propagated past the print head cartridges at 20 inches per second (IPS) such that the row 1 of one print head (PH1) prints every $3^{rd}$ line starting from line 1, whilst row 3 of the same print head (PH1) prints every $3^{rd}$ line starting from line 2, and row 5 of the same print head (PH1) prints every $3^{rd}$ line starting from line 3. Unused rows 2 and 4 may be used to compensate for dead nozzles in any of rows 1, 3, and 5 or to increase print density.

Step 19-40 shows the final image printed by one print head, which is an interleaving of pink, lime, and orange lines. However, in recognition that the pink, lime, and orange lines are fake colours and are in fact all lines of the original Yellow colour plane of the original source image, the final image is actually the whole Yellow monochrome image of the original source image. The printing of the Yellow monochrome image in this manner has however been executed around 3 times faster compared to the case where the above processes are not performed. Compared to the case where the above processes are not performed, 3 rows of nozzles instead of 1 have been used to print the Yellow monochrome image. Moreover, the speed of print media propagation has been increased.

The above process is performed for each of the original Cyan, Magenta, Yellow, and Black colour planes (and spot colour plane, if any), and the respective fake colour images generated for each original colour plane sent to an individual print head controller module 1-25*a-e* and corresponding print head cartridges 1-20*a-e*. In this manner, an existing multi-coloured print engine and print head cartridge may be use in the system 1-1000 without any substantial modifications to the hardware, apart from increasing a speed of print media propagation.

The same steps of further processing data to compensate for misalignments of print head cartridges and print head tiles, as described above with reference to FIGS. 17A and 17B, whilst not specifically described above with reference to FIGS. 18A, 18B, and 19 are also performed in like manner to account for vertical and horizontal misalignments, as well as paper wobbling.

Although the invention has been described herein with reference to a number of specific embodiments, it will be appreciated by those skilled in the art that the invention is not limited only to the disclosed embodiments, and that these embodiments described a best-mode/preferred embodiment, whereas the invention may be embodied in other forms encompassed within the scope of this invention.

We claim:

1. An inkjet printing system, comprising:
   a plurality of print head cartridges, each extending across a direction of print media propagation and spaced apart along the direction of print media propagation, each print head cartridge having a respective inkjet printhead;
   a print head chassis for supporting the plurality of print head cartridges;
   a lift mechanism for, lifting and lowering the print head chassis between a printing position, a transition position, and a maintenance position;
   a maintenance chassis supporting a chassis sub-frame having a corresponding plurality of maintenance cradles mounted thereon, each maintenance cradle maintaining a respective printhead, the chassis sub-frame being slidably movable relative to the maintenance chassis;
   a retraction mechanism for laterally sliding the maintenance chassis between a storage position in which the maintenance cradles are laterally displaced from the print head cartridges and an operational position in which each maintenance cradle is positioned opposite its respective print head cartridge;
   a sub-frame movement mechanism for slidably moving the chassis sub-frame relative to the maintenance chassis; and
   a platen on which the print media is supported and propagated, wherein
   each maintenance cradle comprises a capper and a wiper for maintaining a respective printhead; and
   wherein, in the operational position, the sub-frame movement mechanism is configured to slidably move the chassis sub-frame relative to the maintenance chassis so as to align each capper or each wiper with its respective printhead.

2. The inkjet printing system according to claim 1, wherein the print head chassis includes pin bushes at each corner thereof.

3. The inkjet printing system according to claim 2, wherein the platen comprises positioning pins protruding respectively from corners thereof, each positioning adapted to be received in a pin bush of the print head chassis.

4. The inkjet printing system according to claim 3, wherein each positioning pin of the platen is mechanically engaged with a cam, and the cam is mechanically engaged with an adjusting knob, whereby a height of protrusion of the positioning pins from the plate is adjustable.

5. The inkjet printing system according to claim 3, wherein each positioning pin is supported on a spring and biased by the spring to protrude from a surface of the platen, and the platen includes a clamping arrangement arranged around each positioning pin to clamp each positioning pin at a desired protruding height from the surface of the platen.

* * * * *